United States Patent
Berkovich

(10) Patent No.: US 11,910,114 B2
(45) Date of Patent: Feb. 20, 2024

(54) MULTI-MODE IMAGE SENSOR

(71) Applicant: Meta Platforms Technologies, LLC, Menlo Park, CA (US)

(72) Inventor: Andrew Samuel Berkovich, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/364,763

(22) Filed: Jun. 30, 2021

(65) Prior Publication Data

US 2022/0021833 A1    Jan. 20, 2022

Related U.S. Application Data

(60) Provisional application No. 63/053,311, filed on Jul. 17, 2020.

(51) Int. Cl.
*H04N 25/75* (2023.01)
*H04N 25/79* (2023.01)
*H04N 25/709* (2023.01)

(52) U.S. Cl.
CPC ........... *H04N 25/75* (2023.01); *H04N 25/709* (2023.01); *H04N 25/79* (2023.01)

(58) Field of Classification Search
CPC ............... H04N 5/3454; H04N 5/3698; H04N 5/37455; H04N 5/378; H04N 5/379;
(Continued)

(56) References Cited

U.S. PATENT DOCUMENTS

| 4,596,977 A | 6/1986 | Bauman et al. |
| 5,053,771 A | 10/1991 | McDermott |

(Continued)

FOREIGN PATENT DOCUMENTS

| CN | 1490878 A | 4/2004 |
| CN | 1728397 A | 2/2006 |

(Continued)

OTHER PUBLICATIONS

Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.

(Continued)

*Primary Examiner* — Lin Ye
*Assistant Examiner* — Chriss S Yoder, III
(74) *Attorney, Agent, or Firm* — Kilpatrick Townsend & Stockton LLP

(57) ABSTRACT

In some examples, an apparatus comprises: an array of pixel cells, each pixel cell of the array of pixel cells configured to output a voltage; first analog-to-digital converters (ADCs), each first ADC being associated with a pixel cell or a block of pixel cells; second ADCs, each second ADC being associated with a column of pixel cells of the array of pixel cells; and a controller configured to: in a first mode, enable at least a subset of the first ADCs to perform a quantization operation of the voltages output by at least a subset of the pixel cells in parallel to generate a first image frame; and in a second mode, enable at least a subset of the second ADCs to perform quantization operations sequentially of the voltages output by pixel cells within at least a subset of the columns of pixel cells to generate a second image frame.

18 Claims, 31 Drawing Sheets

(58) Field of Classification Search
CPC .... H04N 25/443; H04N 25/709; H04N 25/75; H04N 25/772; H04N 25/79
See application file for complete search history.

(56) References Cited

U.S. PATENT DOCUMENTS

| | | | |
|---|---|---|---|
| 5,844,512 A | 12/1998 | Gorin et al. | |
| 5,963,369 A | 10/1999 | Steinthal et al. | |
| 6,057,586 A | 5/2000 | Bawolek et al. | |
| 6,384,905 B1 | 5/2002 | Barrows | |
| 6,522,395 B1 | 2/2003 | Bamji et al. | |
| 6,529,241 B1 | 3/2003 | Clark | |
| 6,864,817 B1 | 3/2005 | Salvi et al. | |
| 6,963,369 B1 | 11/2005 | Olding | |
| 6,970,195 B1 | 11/2005 | Bidermann et al. | |
| 6,972,791 B1* | 12/2005 | Yomeyama | H04N 5/3765 348/304 |
| 6,992,706 B2* | 1/2006 | Mabuchi | H04N 5/3765 348/E3.019 |
| 7,038,820 B1 | 5/2006 | Kindt et al. | |
| 7,326,903 B2 | 2/2008 | Ackland | |
| 7,362,365 B1 | 4/2008 | Reyneri et al. | |
| 7,659,772 B2 | 2/2010 | Nomura et al. | |
| 7,659,925 B2 | 2/2010 | Krymski | |
| 7,719,589 B2 | 5/2010 | Turchetta et al. | |
| 7,956,914 B2 | 6/2011 | Xu | |
| 8,134,623 B2 | 3/2012 | Purcell et al. | |
| 8,144,227 B2 | 3/2012 | Kobayashi | |
| 8,369,458 B2 | 2/2013 | Wong et al. | |
| 8,426,793 B1 | 4/2013 | Barrows | |
| 8,754,798 B2 | 6/2014 | Lin | |
| 8,773,562 B1 | 7/2014 | Fan | |
| 8,779,346 B2 | 7/2014 | Fowler et al. | |
| 8,946,610 B2 | 2/2015 | Iwabuchi et al. | |
| 9,001,251 B2 | 4/2015 | Smith et al. | |
| 9,094,629 B2 | 7/2015 | Ishibashi | |
| 9,185,273 B2 | 11/2015 | Beck et al. | |
| 9,274,151 B2 | 3/2016 | Lee et al. | |
| 9,282,264 B2 | 3/2016 | Park et al. | |
| 9,332,200 B1 | 5/2016 | Hseih et al. | |
| 9,343,497 B2 | 5/2016 | Cho | |
| 9,363,454 B2 | 6/2016 | Ito et al. | |
| 9,478,579 B2 | 10/2016 | Dai et al. | |
| 9,497,396 B2 | 11/2016 | Choi | |
| 9,531,990 B1 | 12/2016 | Wilkins et al. | |
| 9,800,260 B1 | 10/2017 | Banerjee | |
| 9,819,885 B2 | 11/2017 | Furukawa et al. | |
| 9,832,370 B2 | 11/2017 | Cho et al. | |
| 9,909,922 B2 | 3/2018 | Schweickert et al. | |
| 9,935,618 B1 | 4/2018 | Fenigstein | |
| 9,948,316 B1 | 4/2018 | Yun et al. | |
| 9,955,091 B1 | 4/2018 | Dai et al. | |
| 9,967,496 B2 | 5/2018 | Ayers et al. | |
| 10,003,759 B2 | 6/2018 | Fan | |
| 10,015,416 B2 | 7/2018 | Borthakur et al. | |
| 10,090,342 B1 | 10/2018 | Gambino et al. | |
| 10,096,631 B2 | 10/2018 | Ishizu | |
| 10,103,193 B1 | 10/2018 | Manabe et al. | |
| 10,154,221 B2 | 12/2018 | Ogino et al. | |
| 10,157,951 B2 | 12/2018 | Kim et al. | |
| 10,321,081 B2 | 6/2019 | Watanabe et al. | |
| 10,345,447 B1 | 7/2019 | Hicks | |
| 10,419,701 B2 | 9/2019 | Liu | |
| 10,574,925 B2 | 2/2020 | Otaka | |
| 10,594,974 B2 | 3/2020 | Ivarsson et al. | |
| 10,598,546 B2 | 3/2020 | Liu | |
| 10,608,101 B2 | 3/2020 | Liu | |
| 10,686,996 B2 | 6/2020 | Liu | |
| 10,726,627 B2 | 7/2020 | Liu | |
| 10,750,097 B2 | 8/2020 | Liu | |
| 10,764,526 B1 | 9/2020 | Liu et al. | |
| 10,804,926 B2 | 10/2020 | Gao et al. | |
| 10,812,742 B2 | 10/2020 | Chen et al. | |
| 10,825,854 B2 | 11/2020 | Liu | |
| 10,834,344 B2 | 11/2020 | Chen et al. | |
| 10,897,586 B2 | 1/2021 | Liu et al. | |
| 10,903,260 B2 | 1/2021 | Chen et al. | |
| 10,917,589 B2 | 2/2021 | Liu | |
| 10,923,523 B2 | 2/2021 | Liu et al. | |
| 10,931,884 B2 | 2/2021 | Liu et al. | |
| 10,951,849 B2 | 3/2021 | Liu | |
| 10,969,273 B2 | 4/2021 | Berkovich et al. | |
| 11,004,881 B2 | 5/2021 | Liu et al. | |
| 11,057,581 B2 | 7/2021 | Liu | |
| 11,089,210 B2 | 8/2021 | Berkovich et al. | |
| 11,089,241 B2 | 8/2021 | Chen et al. | |
| 11,146,753 B2* | 10/2021 | Shimura | H04N 5/378 |
| 11,218,660 B1 | 1/2022 | Xinqiao et al. | |
| 11,233,085 B2 | 1/2022 | Chen et al. | |
| 11,393,867 B2 | 7/2022 | Chen et al. | |
| 11,463,636 B2 | 10/2022 | Berkovich et al. | |
| 11,595,602 B2 | 2/2023 | Gao et al. | |
| 2002/0067303 A1 | 6/2002 | Lee et al. | |
| 2002/0113886 A1 | 8/2002 | Hynecek | |
| 2003/0001080 A1 | 1/2003 | Kummaraguntla et al. | |
| 2003/0020100 A1 | 1/2003 | Guidash | |
| 2003/0049925 A1 | 3/2003 | Layman et al. | |
| 2004/0095495 A1 | 5/2004 | Inokuma et al. | |
| 2004/0118994 A1 | 6/2004 | Mizuno | |
| 2004/0251483 A1 | 12/2004 | Ko et al. | |
| 2005/0046715 A1 | 3/2005 | Lim et al. | |
| 2005/0057389 A1 | 3/2005 | Krymski | |
| 2005/0104983 A1 | 5/2005 | Raynor | |
| 2005/0206414 A1 | 9/2005 | Cottin et al. | |
| 2005/0237380 A1 | 10/2005 | Kakii et al. | |
| 2005/0280727 A1 | 12/2005 | Sato et al. | |
| 2006/0023109 A1 | 2/2006 | Mabuchi et al. | |
| 2006/0146159 A1 | 7/2006 | Farrier | |
| 2006/0158541 A1 | 7/2006 | Ichikawa | |
| 2007/0013983 A1 | 1/2007 | Kitamura et al. | |
| 2007/0014019 A1 | 1/2007 | Mouli | |
| 2007/0035653 A1 | 2/2007 | Hong et al. | |
| 2007/0076109 A1 | 4/2007 | Krymski | |
| 2007/0076481 A1 | 4/2007 | Tennant | |
| 2007/0092244 A1 | 4/2007 | Pertsel et al. | |
| 2007/0102740 A1 | 5/2007 | Ellis-Monaghan et al. | |
| 2007/0131991 A1 | 6/2007 | Sugawa | |
| 2007/0208526 A1 | 9/2007 | Staudt et al. | |
| 2007/0222881 A1 | 9/2007 | Mentzer | |
| 2007/0225560 A1 | 9/2007 | Avni et al. | |
| 2008/0001065 A1 | 1/2008 | Ackland | |
| 2008/0007731 A1 | 1/2008 | Botchway et al. | |
| 2008/0042046 A1 | 2/2008 | Mabuchi | |
| 2008/0042888 A1 | 2/2008 | Danesh | |
| 2008/0068478 A1 | 3/2008 | Watanabe | |
| 2008/0088014 A1 | 4/2008 | Adkisson et al. | |
| 2008/0191791 A1 | 8/2008 | Nomura et al. | |
| 2008/0226170 A1 | 9/2008 | Sonoda | |
| 2008/0226183 A1 | 9/2008 | Lei et al. | |
| 2009/0002528 A1 | 1/2009 | Manabe et al. | |
| 2009/0033588 A1 | 2/2009 | Kajita et al. | |
| 2009/0040364 A1 | 2/2009 | Rubner | |
| 2009/0066820 A1 | 3/2009 | Jiang et al. | |
| 2009/0091645 A1 | 4/2009 | Trimeche et al. | |
| 2009/0128640 A1 | 5/2009 | Yumiki | |
| 2009/0224139 A1 | 9/2009 | Buettgen et al. | |
| 2009/0244328 A1 | 10/2009 | Yamashita | |
| 2009/0244346 A1 | 10/2009 | Funaki | |
| 2009/0245637 A1 | 10/2009 | Barman et al. | |
| 2009/0261235 A1 | 10/2009 | Lahav et al. | |
| 2009/0303371 A1 | 12/2009 | Watanabe et al. | |
| 2009/0321615 A1 | 12/2009 | Sugiyama et al. | |
| 2010/0013969 A1 | 1/2010 | Ui | |
| 2010/0140732 A1 | 6/2010 | Eminoglu et al. | |
| 2010/0194956 A1* | 8/2010 | Yuan | H04N 5/35527 348/308 |
| 2010/0232227 A1 | 9/2010 | Lee | |
| 2010/0245647 A1 | 9/2010 | Honda et al. | |
| 2010/0276572 A1 | 11/2010 | Iwabuchi et al. | |
| 2011/0049589 A1 | 3/2011 | Chuang et al. | |
| 2011/0122304 A1 | 5/2011 | Sedelnikov | |
| 2011/0149116 A1 | 6/2011 | Kim | |
| 2011/0155892 A1 | 6/2011 | Neter et al. | |
| 2011/0254986 A1 | 10/2011 | Nishimura et al. | |

(56) References Cited

U.S. PATENT DOCUMENTS

| | | | |
|---|---|---|---|
| 2011/0267533 A1* | 11/2011 | Hirose | H04N 5/232122 |
| | | | 348/E5.024 |
| 2011/0298074 A1 | 12/2011 | Funao | |
| 2012/0016817 A1 | 1/2012 | Smith et al. | |
| 2012/0039548 A1 | 2/2012 | Wang et al. | |
| 2012/0068051 A1 | 3/2012 | Ahn et al. | |
| 2012/0075511 A1 | 3/2012 | Tay | |
| 2012/0092677 A1 | 4/2012 | Suehira et al. | |
| 2012/0105475 A1 | 5/2012 | Tseng | |
| 2012/0105668 A1 | 5/2012 | Velarde et al. | |
| 2012/0113119 A1 | 5/2012 | Massie | |
| 2012/0127284 A1 | 5/2012 | Bar-Zeev et al. | |
| 2012/0133807 A1 | 5/2012 | Wu et al. | |
| 2012/0138775 A1 | 6/2012 | Cheon et al. | |
| 2012/0153123 A1 | 6/2012 | Mao et al. | |
| 2012/0188420 A1 | 7/2012 | Black et al. | |
| 2012/0200499 A1 | 8/2012 | Osterhout et al. | |
| 2012/0212465 A1 | 8/2012 | White et al. | |
| 2012/0241591 A1 | 9/2012 | Wan et al. | |
| 2012/0262616 A1 | 10/2012 | Sa et al. | |
| 2012/0267511 A1 | 10/2012 | Kozlowski | |
| 2012/0273654 A1 | 11/2012 | Hynecek et al. | |
| 2012/0273906 A1 | 11/2012 | Mackey et al. | |
| 2012/0305751 A1 | 12/2012 | Kusuda | |
| 2012/0327279 A1 | 12/2012 | Hashimoto et al. | |
| 2013/0020466 A1 | 1/2013 | Ayers et al. | |
| 2013/0056809 A1 | 3/2013 | Mao et al. | |
| 2013/0057742 A1 | 3/2013 | Nakamura et al. | |
| 2013/0068929 A1 | 3/2013 | Solhusvik et al. | |
| 2013/0069787 A1 | 3/2013 | Petrou | |
| 2013/0082313 A1 | 4/2013 | Manabe | |
| 2013/0113969 A1 | 5/2013 | Manabe et al. | |
| 2013/0120615 A1 | 5/2013 | Hirooka et al. | |
| 2013/0120625 A1 | 5/2013 | Ishii et al. | |
| 2013/0126710 A1 | 5/2013 | Kondo | |
| 2013/0141619 A1 | 6/2013 | Lim et al. | |
| 2013/0148013 A1 | 6/2013 | Shiohara | |
| 2013/0187027 A1 | 7/2013 | Qiao et al. | |
| 2013/0207219 A1 | 8/2013 | Ahn | |
| 2013/0214371 A1 | 8/2013 | Asatsuma et al. | |
| 2013/0218728 A1 | 8/2013 | Hashop et al. | |
| 2013/0221194 A1 | 8/2013 | Manabe | |
| 2013/0229543 A1 | 9/2013 | Hashimoto et al. | |
| 2013/0229560 A1 | 9/2013 | Kondo | |
| 2013/0234029 A1 | 9/2013 | Bikumandla | |
| 2013/0248685 A1 | 9/2013 | Ahn | |
| 2013/0293752 A1 | 11/2013 | Peng et al. | |
| 2013/0299674 A1 | 11/2013 | Fowler et al. | |
| 2013/0300906 A1 | 11/2013 | Yan | |
| 2014/0021574 A1 | 1/2014 | Egawa | |
| 2014/0042299 A1 | 2/2014 | Wan et al. | |
| 2014/0042582 A1 | 2/2014 | Kondo | |
| 2014/0078336 A1 | 3/2014 | Beck et al. | |
| 2014/0085523 A1 | 3/2014 | Hynecek | |
| 2014/0176770 A1 | 6/2014 | Kondo | |
| 2014/0211052 A1 | 7/2014 | Choi | |
| 2014/0232890 A1 | 8/2014 | Yoo et al. | |
| 2014/0247382 A1 | 9/2014 | Moldovan et al. | |
| 2014/0306276 A1 | 10/2014 | Yamaguchi | |
| 2014/0313387 A1 | 10/2014 | Vogelsang et al. | |
| 2014/0368687 A1 | 12/2014 | Yu et al. | |
| 2015/0048427 A1 | 2/2015 | Hu et al. | |
| 2015/0083895 A1 | 3/2015 | Hashimoto et al. | |
| 2015/0085134 A1 | 3/2015 | Novotny et al. | |
| 2015/0090863 A1 | 4/2015 | Mansoorian et al. | |
| 2015/0097951 A1 | 4/2015 | Barrows | |
| 2015/0172574 A1 | 6/2015 | Honda et al. | |
| 2015/0189209 A1 | 7/2015 | Yang et al. | |
| 2015/0201142 A1 | 7/2015 | Smith et al. | |
| 2015/0208009 A1 | 7/2015 | Oh et al. | |
| 2015/0229859 A1 | 8/2015 | Guidash et al. | |
| 2015/0237274 A1 | 8/2015 | Yang et al. | |
| 2015/0279884 A1 | 10/2015 | Kusumoto | |
| 2015/0287766 A1 | 10/2015 | Kim et al. | |
| 2015/0309311 A1 | 10/2015 | Cho | |
| 2015/0309316 A1 | 10/2015 | Osterhout et al. | |
| 2015/0312461 A1 | 10/2015 | Kim et al. | |
| 2015/0312502 A1 | 10/2015 | Borremans | |
| 2015/0312557 A1 | 10/2015 | Kim | |
| 2015/0350582 A1 | 12/2015 | Korobov et al. | |
| 2015/0358569 A1 | 12/2015 | Egawa | |
| 2015/0358571 A1 | 12/2015 | Dominguez Castro et al. | |
| 2015/0358593 A1 | 12/2015 | Sato | |
| 2015/0381907 A1 | 12/2015 | Boettiger et al. | |
| 2015/0381911 A1 | 12/2015 | Shen et al. | |
| 2016/0011422 A1 | 1/2016 | Thurber et al. | |
| 2016/0018645 A1 | 1/2016 | Haddick et al. | |
| 2016/0021302 A1 | 1/2016 | Cho et al. | |
| 2016/0028974 A1 | 1/2016 | Guidash et al. | |
| 2016/0028980 A1 | 1/2016 | Kameyama et al. | |
| 2016/0035770 A1 | 2/2016 | Ahn et al. | |
| 2016/0037111 A1 | 2/2016 | Dai et al. | |
| 2016/0078614 A1 | 3/2016 | Ryu et al. | |
| 2016/0088253 A1 | 3/2016 | Tezuka | |
| 2016/0093659 A1 | 3/2016 | Nakamura et al. | |
| 2016/0100115 A1 | 4/2016 | Kusano | |
| 2016/0111457 A1 | 4/2016 | Sekine | |
| 2016/0112626 A1 | 4/2016 | Shimada | |
| 2016/0118992 A1 | 4/2016 | Milkov | |
| 2016/0165160 A1 | 6/2016 | Hseih et al. | |
| 2016/0181298 A1 | 6/2016 | Wan et al. | |
| 2016/0197117 A1 | 7/2016 | Nakata et al. | |
| 2016/0198114 A1 | 7/2016 | Zhang et al. | |
| 2016/0204150 A1 | 7/2016 | Oh et al. | |
| 2016/0210785 A1 | 7/2016 | Balachandreswaran et al. | |
| 2016/0225813 A1 | 8/2016 | Liao et al. | |
| 2016/0240570 A1 | 8/2016 | Barna et al. | |
| 2016/0249004 A1 | 8/2016 | Saeki et al. | |
| 2016/0255293 A1 | 9/2016 | Gesset | |
| 2016/0276394 A1 | 9/2016 | Chou et al. | |
| 2016/0307945 A1 | 10/2016 | Madurawe | |
| 2016/0337605 A1 | 11/2016 | Ito | |
| 2016/0353045 A1 | 12/2016 | Kawahito et al. | |
| 2016/0360127 A1 | 12/2016 | Dierickx et al. | |
| 2017/0013215 A1 | 1/2017 | McCarten | |
| 2017/0038504 A1 | 2/2017 | Tsai | |
| 2017/0039906 A1 | 2/2017 | Jepsen | |
| 2017/0041525 A1 | 2/2017 | Liu et al. | |
| 2017/0041571 A1 | 2/2017 | Tyrrell et al. | |
| 2017/0053962 A1 | 2/2017 | Oh et al. | |
| 2017/0059399 A1 | 3/2017 | Suh et al. | |
| 2017/0062501 A1 | 3/2017 | Velichko et al. | |
| 2017/0069363 A1 | 3/2017 | Baker | |
| 2017/0070691 A1 | 3/2017 | Nishikido | |
| 2017/0099422 A1 | 4/2017 | Goma et al. | |
| 2017/0099446 A1 | 4/2017 | Cremers et al. | |
| 2017/0104021 A1 | 4/2017 | Park et al. | |
| 2017/0104946 A1 | 4/2017 | Hong | |
| 2017/0110493 A1 | 4/2017 | Yokogawa | |
| 2017/0111600 A1 | 4/2017 | Wang et al. | |
| 2017/0141147 A1 | 5/2017 | Raynor | |
| 2017/0154909 A1 | 6/2017 | Ishizu | |
| 2017/0163924 A1 | 6/2017 | Wan | |
| 2017/0170223 A1 | 6/2017 | Hynecek et al. | |
| 2017/0201693 A1 | 7/2017 | Sugizaki et al. | |
| 2017/0207268 A1 | 7/2017 | Kurokawa | |
| 2017/0228345 A1 | 8/2017 | Gupta et al. | |
| 2017/0264364 A1 | 9/2017 | Aoyama et al. | |
| 2017/0270664 A1 | 9/2017 | Hoogi et al. | |
| 2017/0272667 A1 | 9/2017 | Hynecek | |
| 2017/0272768 A1 | 9/2017 | Tall et al. | |
| 2017/0280031 A1 | 9/2017 | Price et al. | |
| 2017/0293799 A1 | 10/2017 | Skogo et al. | |
| 2017/0295338 A1 | 10/2017 | Geurts | |
| 2017/0310910 A1 | 10/2017 | Smith et al. | |
| 2017/0324917 A1 | 11/2017 | Mlinar et al. | |
| 2017/0338262 A1 | 11/2017 | Hirata | |
| 2017/0339327 A1 | 11/2017 | Koshkin et al. | |
| 2017/0346579 A1 | 11/2017 | Barghi | |
| 2017/0350755 A1 | 12/2017 | Geurts | |
| 2017/0359497 A1 | 12/2017 | Mandelli et al. | |
| 2017/0366766 A1 | 12/2017 | Geurts et al. | |
| 2018/0019269 A1 | 1/2018 | Klipstein | |
| 2018/0077368 A1 | 3/2018 | Suzuki | |

(56) References Cited

U.S. PATENT DOCUMENTS

| | | | |
|---|---|---|---|
| 2018/0084164 A1 | 3/2018 | Hynecek et al. | |
| 2018/0115725 A1 | 4/2018 | Zhang et al. | |
| 2018/0115730 A1 | 4/2018 | Velichko | |
| 2018/0136471 A1 | 5/2018 | Miller et al. | |
| 2018/0143701 A1 | 5/2018 | Suh et al. | |
| 2018/0152650 A1 | 5/2018 | Sakakibara et al. | |
| 2018/0167575 A1 | 6/2018 | Watanabe et al. | |
| 2018/0176545 A1 | 6/2018 | Aflaki Beni | |
| 2018/0204867 A1 | 7/2018 | Kim et al. | |
| 2018/0213205 A1 | 7/2018 | Oh | |
| 2018/0220093 A1 | 8/2018 | Murao et al. | |
| 2018/0224658 A1 | 8/2018 | Teller | |
| 2018/0227516 A1 | 8/2018 | Mo et al. | |
| 2018/0241953 A1 | 8/2018 | Johnson | |
| 2018/0270436 A1 | 9/2018 | Ivarsson et al. | |
| 2018/0276841 A1 | 9/2018 | Krishnaswamy et al. | |
| 2018/0286896 A1 | 10/2018 | Kim et al. | |
| 2018/0348494 A1 | 12/2018 | Isono | |
| 2018/0376046 A1 | 12/2018 | Liu | |
| 2018/0376090 A1 | 12/2018 | Liu | |
| 2019/0035154 A1 | 1/2019 | Liu | |
| 2019/0046044 A1 | 2/2019 | Tzvieli et al. | |
| 2019/0052788 A1 | 2/2019 | Liu | |
| 2019/0056264 A1 | 2/2019 | Liu | |
| 2019/0057995 A1 | 2/2019 | Liu | |
| 2019/0058058 A1 | 2/2019 | Liu | |
| 2019/0098232 A1 | 3/2019 | Mori et al. | |
| 2019/0104263 A1 | 4/2019 | Ochiai et al. | |
| 2019/0104265 A1 | 4/2019 | Totsuka et al. | |
| 2019/0104283 A1 | 4/2019 | Wakeyama et al. | |
| 2019/0110039 A1 | 4/2019 | Linde et al. | |
| 2019/0123088 A1 | 4/2019 | Kwon | |
| 2019/0124285 A1 | 4/2019 | Otaka | |
| 2019/0141270 A1 | 5/2019 | Otaka et al. | |
| 2019/0149751 A1 | 5/2019 | Wise | |
| 2019/0157330 A1 | 5/2019 | Sato et al. | |
| 2019/0172227 A1 | 6/2019 | Kasahara | |
| 2019/0172868 A1 | 6/2019 | Chen et al. | |
| 2019/0191116 A1 | 6/2019 | Madurawe | |
| 2019/0246036 A1 | 8/2019 | Wu et al. | |
| 2019/0253650 A1 | 8/2019 | Kim | |
| 2019/0327439 A1 | 10/2019 | Chen et al. | |
| 2019/0331914 A1 | 10/2019 | Lee et al. | |
| 2019/0335151 A1 | 10/2019 | Rivard et al. | |
| 2019/0348460 A1 | 11/2019 | Chen et al. | |
| 2019/0355782 A1 | 11/2019 | Do et al. | |
| 2019/0363118 A1 | 11/2019 | Berkovich et al. | |
| 2019/0371845 A1 | 12/2019 | Chen et al. | |
| 2019/0379827 A1 | 12/2019 | Berkovich et al. | |
| 2019/0379846 A1 | 12/2019 | Chen et al. | |
| 2020/0007800 A1 | 1/2020 | Berkovich et al. | |
| 2020/0053299 A1 | 2/2020 | Zhang et al. | |
| 2020/0059589 A1 | 2/2020 | Liu et al. | |
| 2020/0068189 A1 | 2/2020 | Chen et al. | |
| 2020/0186731 A1 | 6/2020 | Chen et al. | |
| 2020/0195875 A1 | 6/2020 | Berkovich et al. | |
| 2020/0217714 A1 | 7/2020 | Liu | |
| 2020/0228745 A1 | 7/2020 | Otaka | |
| 2020/0374475 A1 | 11/2020 | Fukuoka et al. | |
| 2020/0396399 A1 | 12/2020 | Tsai et al. | |
| 2021/0026796 A1 | 1/2021 | Graif et al. | |
| 2021/0099659 A1 | 4/2021 | Miyauchi et al. | |
| 2021/0185264 A1 | 6/2021 | Wong et al. | |
| 2021/0227159 A1 | 7/2021 | Sambonsugi | |
| 2021/0368124 A1 | 11/2021 | Berkovich et al. | |

FOREIGN PATENT DOCUMENTS

| | | |
|---|---|---|
| CN | 1812506 A | 8/2006 |
| CN | 103207716 A | 7/2013 |
| CN | 103730455 A | 4/2014 |
| CN | 104125418 A | 10/2014 |
| CN | 104204904 A | 12/2014 |
| CN | 104469195 A | 3/2015 |
| CN | 104704812 A | 6/2015 |
| CN | 104733485 A | 6/2015 |
| CN | 104754255 A | 7/2015 |
| CN | 105706439 A | 6/2016 |
| CN | 106255978 A | 12/2016 |
| CN | 106791504 A | 5/2017 |
| CN | 207184624 U | 4/2018 |
| CN | 109298528 A | 2/2019 |
| DE | 202016105510 | 10/2016 |
| EP | 0675345 A2 | 10/1995 |
| EP | 1681856 A2 | 7/2006 |
| EP | 1732134 A1 | 12/2006 |
| EP | 1746820 A1 | 1/2007 |
| EP | 1788802 A1 | 5/2007 |
| EP | 2037505 A1 | 3/2009 |
| EP | 2063630 A1 | 5/2009 |
| EP | 2538664 A2 | 12/2012 |
| EP | 2804074 A2 | 11/2014 |
| EP | 2833619 A1 | 2/2015 |
| EP | 3032822 A1 | 6/2016 |
| EP | 3229457 A1 | 10/2017 |
| EP | 3258683 A1 | 12/2017 |
| EP | 3425352 A1 | 1/2019 |
| EP | 3425353 A1 | 1/2019 |
| EP | 3439039 A1 | 2/2019 |
| EP | 3744085 A2 | 12/2020 |
| JP | 2002199292 A | 7/2002 |
| JP | 2002314875 A | 10/2002 |
| JP | 2003319262 A | 11/2003 |
| JP | 2005328493 A | 11/2005 |
| JP | 2006203736 A | 8/2006 |
| JP | 2007074447 A | 3/2007 |
| JP | 2010239337 A | 10/2010 |
| JP | 2010283525 A | 12/2010 |
| JP | 2011216966 A | 10/2011 |
| JP | 2012095349 A | 5/2012 |
| JP | 2013009087 A | 1/2013 |
| JP | 2013090127 A | 5/2013 |
| JP | 2013172203 A | 9/2013 |
| JP | 2014165733 A | 9/2014 |
| JP | 2015103998 A | 6/2015 |
| JP | 2016092661 A | 5/2016 |
| JP | 2017139820 A | 8/2017 |
| JP | 2017227686 A | 12/2017 |
| JP | 2017536780 A | 12/2017 |
| JP | 2018082261 A | 5/2018 |
| KR | 100574959 B1 | 4/2006 |
| KR | 20110050351 A | 5/2011 |
| KR | 20120058337 A | 6/2012 |
| KR | 20140041492 A | 4/2014 |
| KR | 20150095841 A | 8/2015 |
| KR | 20160008267 A | 1/2016 |
| KR | 20160008287 A | 1/2016 |
| TW | 648962 B | 8/2003 |
| TW | 201106691 A | 2/2011 |
| TW | 201242353 A | 10/2012 |
| TW | 201705755 A | 2/2017 |
| TW | 201717381 A | 5/2017 |
| TW | 201720138 A | 6/2017 |
| TW | 201737696 A | 10/2017 |
| TW | 201921660 A | 6/2019 |
| TW | I774803 | 8/2022 |
| WO | 2006124592 A2 | 11/2006 |
| WO | 2013145753 A1 | 10/2013 |
| WO | WO-2014055391 A2 | 4/2014 |
| WO | WO-2016095057 A1 | 6/2016 |
| WO | 2017003477 A1 | 1/2017 |
| WO | WO-2017013806 A1 | 1/2017 |
| WO | 2017018215 A1 | 2/2017 |
| WO | 2017047010 A1 | 3/2017 |
| WO | 2017058488 A1 | 4/2017 |
| WO | 2017069706 A1 | 4/2017 |
| WO | 2017169882 A1 | 10/2017 |
| WO | WO-2017169446 A1 | 10/2017 |
| WO | 2019018084 A1 | 1/2019 |
| WO | 2019111528 A1 | 6/2019 |

(56) References Cited

FOREIGN PATENT DOCUMENTS

| WO | 2019145578 A1 | 8/2019 |
|---|---|---|
| WO | 2019168929 A1 | 9/2019 |

OTHER PUBLICATIONS

Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Feb. 3, 2021 for U.S. Appl. No. 16/566,583, filed Sep. 10, 2019, 2 Pages.
Corrected Notice of Allowability dated Apr. 9, 2021 for U.S. Appl. No. 16/255,528, filed Jan. 23, 2019, 5 Pages.
Corrected Notice of Allowability dated Dec. 11, 2020 for U.S. Appl. No. 16/566,583, filed Sep. 10, 2019, 2 Pages.
Corrected Notice of Allowability dated Jul. 26, 2021 for U.S. Appl. No. 16/707,988, filed Dec. 9, 2019, 2 Pages.
Extended European Search Report for European Application No. 19743908.6, dated Sep. 30, 2020, 9 Pages.
Final Office Action dated Dec. 3, 2021 for U.S. Appl. No. 17/072,840, filed Oct. 16, 2020, 23 pages.
Final Office Action dated Jul. 12, 2021 for U.S. Appl. No. 16/435,451, filed Jun. 7, 2019, 13 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Preliminary Report on Patentability for International Application No. PCT/US2018/039352, dated Jan. 9, 2020, 7 pages.
International Preliminary Report on Patentability for International Application No. PCT/US2019/014044, dated Oct. 1, 2020, 8 Pages.
International Preliminary Report on Patentability for International Application No. PCT/US2019/019756, dated Dec. 17, 2020, 10 Pages.
International Preliminary Report on Patentability for International Application No. PCT/US2019/019765, dated Sep. 17, 2020, 8 Pages.
International Preliminary Report on Patentability for International Application No. PCT/US2019/025170, dated Oct. 15, 2020, 9 Pages.
International Preliminary Report on Patentability for International Application No. PCT/US2019/048241, dated Mar. 11, 2021, 13 Pages.
International Preliminary Report on Patentability for International Application No. PCT/US2020/014904, dated Aug. 6, 2020, 6 Pages.
International Search Report and Written Opinion for International Application No. PCT/US2019/014904, dated Aug. 5, 2019, 7 Pages.
International Search Report and Written Opinion for International Application No. PCT/US2019/019765, dated Jun. 14, 2019, 9 Pages.
International Search Report and Written Opinion for International Application No. PCT/US2020/058097, dated Feb. 12, 2021, 09 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Feb. 1, 2021 for U.S. Appl. No. 16/435,451, filed Jun. 7, 2019, 14 Pages.
Non-Final Office Action dated Jul. 2, 2021 for U.S. Appl. No. 16/820,594, filed Mar. 16, 2020, 8 Pages.
Non-Final Office Action dated Sep. 2, 2021 for U.S. Appl. No. 16/910,844, filed Jun. 24, 2020, 7 Pages.
Non-Final Office Action dated Dec. 4, 2020 for U.S. Appl. No. 16/436,137, filed Jun. 10, 2019, 12 Pages.
Non-Final Office Action dated May 7, 2021 for U.S. Appl. No. 16/421,441, filed May 23, 2019, 17 Pages.
Non-Final Office Action dated Jun. 8, 2021 for U.S. Appl. No. 17/072,840, filed Oct. 16, 2020, 7 Pages.
Non-Final Office Action dated Jul. 10, 2020 for U.S. Appl. No. 16/255,528, filed Jan. 23, 2019, 27 Pages.
Non-Final Office Action dated Mar. 15, 2021 for U.S. Appl. No. 16/896,130, filed Jun. 8, 2020, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated Jul. 25, 2019 for U.S. Appl. No. 15/909,162, filed Mar. 1, 2018, 20 Pages.
Notice of Allowance dated Apr. 1, 2021 for U.S. Appl. No. 16/255,528, filed Jan. 23, 2019, 7 Pages.
Notice of Allowance dated Nov. 2, 2021 for U.S. Appl. No. 16/453,538, filed Jun. 26, 2019, 8 Pages.
Notice of Allowance dated May 5, 2021 for U.S. Appl. No. 16/707,988, filed Dec. 9, 2019, 14 Pages.
Notice of Allowance dated Jan. 7, 2022 for U.S. Appl. No. 16/899,908, filed Jun. 12, 2020, 10 pages.
Notice of Allowance dated Dec. 8, 2021 for U.S. Appl. No. 16/829,249, filed Mar. 25, 2020, 6 pages.
Notice of Allowance dated Jul. 8, 2021 for U.S. Appl. No. 17/150,925, filed Jan. 15, 2021, 10 Pages.
Notice of Allowance dated Jul. 13, 2021 for U.S. Appl. No. 16/896,130, filed Jun. 8, 2020, 8 Pages.
Notice of Allowance dated Apr. 16, 2021 for U.S. Appl. No. 16/715,792, filed Dec. 16, 2019, 10 Pages.
Notice of Allowance dated Nov. 17, 2021 for U.S. Appl. No. 16/899,908, filed Jun. 12, 2020, 7 Pages.
Notice of Allowance dated Sep. 17, 2021 for U.S. Appl. No. 16/899,908, filed Jun. 12, 2020, 11 Pages.
Notice of Allowance dated Mar. 18, 2020 for U.S. Appl. No. 15/909,162, filed Mar. 1, 2018, 9 Pages.
Notice of Allowance dated Dec. 21, 2021 for U.S. Appl. No. 16/550,851, filed Aug. 26, 2019, 10 pages.
Notice of Allowance dated Dec. 22, 2021 for U.S. Appl. No. 16/910,844, filed Jun. 24, 2020, 7 pages.
Notice of Allowance dated Nov. 22, 2021 for U.S. Appl. No. 16/820,594, filed Mar. 16, 2020, 18 pages.
Notice of Allowance dated Nov. 22, 2021 for U.S. Appl. No. 16/820,594, filed Mar. 16, 2020, 8 Pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Oct. 25, 2021 for U.S. Appl. No. 16/435,451, filed Jun. 7, 2019, 8 Pages.
Notice of Allowance dated Oct. 26, 2021 for U.S. Appl. No. 16/896,130, filed Jun. 8, 2020, 8 Pages.
Notice of Allowance dated Aug. 30, 2021 for U.S. Appl. No. 16/829,249, filed Mar. 25, 2020, 8 pages.
Notice of Reason for Rejection dated Nov. 16, 2021 for Japanese Application No. 2019-571699, filed Jun. 25, 2018, 13 pages.
Office Action dated Jul. 3, 2020 for Chinese Application No. 201810821296, filed Jul. 24, 2018, 17 Pages.

(56) References Cited

OTHER PUBLICATIONS

Office Action dated Jul. 7, 2021 for European Application No. 19737299.8, filed Jun. 11, 2019, 5 Pages.
Office Action dated Mar. 9, 2021 for Chinese Application No. 201810821296, filed Jul. 24, 2018, 10 Pages.
Office Action dated Dec. 14, 2021 for Japanese Application No. 2019571598, filed Jun. 26, 2018, 12 pages.
Office Action dated Jun. 28, 2020 for Chinese Application No. 201810821296, filed Jul. 24, 2018, 2 Pages.
Office Action dated Sep. 30, 2021 for Taiwan Application No. 107124385, 17 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power Column-Parallel 12-bit ADC for CMOS Imagers," XP007908033, Jun. 1, 2005, pp. 169-172.
Corrected Notice of Allowability dated Dec. 1, 2021 for U.S. Appl. No. 16/210,748, filed Dec. 5, 2018, 3 pages.
Corrected Notice of Allowability dated Dec. 7, 2021 for U.S. Appl. No. 16/210,748, filed Dec. 5, 2018, 3 pages.
Corrected Notice of Allowability dated Jan. 25, 2021 for U.S. Appl. No. 16/384,720, filed Apr. 15, 2019, 4 Pages.
Corrected Notice of Allowability dated Jan. 29, 2021 for U.S. Appl. No. 16/544,136, filed Aug. 19, 2019, 2 Pages.
Extended European Search Report for European Application No. 18886564.6, dated Jan. 26, 2021, 6 Pages.
Final Office Action dated Nov. 3, 2021 for U.S. Appl. No. 16/560,665, filed Sep. 4, 2019, 19 Pages.
Final Office Action dated Jul. 8, 2021 for U.S. Appl. No. 16/672,427, filed Nov. 1, 2019, 10 Pages.
International Preliminary Report on Patentability for International Application No. PCT/US2019/027727, dated Oct. 29, 2020, 8 Pages.
Non-Final Office Action dated Feb. 2, 2021 for U.S. Appl. No. 16/210,748, filed Dec. 5, 2018, 8 Pages.
Non-Final Office Action dated Dec. 7, 2020 for U.S. Appl. No. 16/672,427, filed Nov. 1, 2019, 9 Pages.
Non-Final Office Action dated Jan. 8, 2020 for U.S. Appl. No. 16/285,873, filed Feb. 26, 2019, 14 Pages.
Non-Final Office Action dated Feb. 11, 2022 for U.S. Appl. No. 16/672,427, filed Nov. 1, 2019, 9 pages.
Non-Final Office Action dated Dec. 24, 2020 for U.S. Appl. No. 16/407,072, filed May 8, 2019, 15 Pages.
Non-Final Office Action dated Apr. 29, 2021 for U.S. Appl. No. 16/560,665, filed Sep. 4, 2019, 17 Pages.
Notice of Allowance dated Apr. 1, 2021 for U.S. Appl. No. 16/436,049, filed Jun. 10, 2019, 8 Pages.
Notice of Allowance dated Dec. 1, 2021 for U.S. Appl. No. 16/210,748, filed Dec. 5, 2018, 11 pages.
Notice of Allowance dated Jun. 1, 2021 for U.S. Appl. No. 16/407,072, filed May 8, 2019, 11 Pages.
Notice of Allowance dated Dec. 7, 2021 for U.S. Appl. No. 16/210,748, filed Dec. 5, 2018, 11 pages.
Notice of Allowance dated Jul. 9, 2021 for U.S. Appl. No. 16/210,748, filed Dec. 5, 2018, 6 Pages.
Notice of Allowance dated Nov. 10, 2021 for U.S. Appl. No. 16/672,427, filed Nov. 1, 2019, 6 Pages.
Notice of Allowance dated Sep. 13, 2021 for U.S. Appl. No. 16/407,072, filed May 8, 2019, 10 Pages.
Notice of Allowance dated Dec. 16, 2021 for U.S. Appl. No. 16/407,072, filed May 8, 2019, 2 pages.
Notice of Allowance dated Jun. 18, 2020 for U.S. Appl. No. 16/285,873, filed Feb. 26, 2019, 10 Pages.
Notice of Allowance dated Apr. 19, 2022 for U.S. Appl. No. 16/550,851, filed Aug. 26, 2019, 08 pages.
Notice of Allowance dated Sep. 24, 2020 for U.S. Appl. No. 15/668,241, filed Aug. 3, 2017, 13 Pages.
Notice of Allowance dated Oct. 27, 2021 for U.S. Appl. No. 16/210,748, filed Dec. 5, 2018, 6 Pages.
Notice of Allowance dated Oct. 29, 2021 for U.S. Appl. No. 16/672,427, filed Nov. 1, 2019, 9 Pages.
Supplemental Notice of Allowability dated Jul. 8, 2021 for U.S. Appl. No. 16/436,049, filed Jun. 10, 2019, 2 Pages.
Notice of Allowance dated Jun. 14, 2022 for U.S. Appl. No. 16/453,538, filed Jun. 26, 2019, 8 pages.
Office Action dated May 10, 2022 for Taiwan Application No. 108122610, 19 pages.
Advisory Action dated Oct. 1, 2021 for U.S. Appl. No. 17/083,920, filed Oct. 29, 2020, 4 pages.
Corrected Notice of Allowance dated Mar. 7, 2022 for U.S. Appl. No. 17/150,925, filed Jan. 15, 2021, 2 Pages.
International Search Report and Written Opinion for International Application No. PCT/US2021/054327, dated Feb. 14, 2022, 8 pages.
International Search Report and Written Opinion for International Application No. PCT/US2021/057966, dated Feb. 22, 2022, 15 pages.
Non-Final Office Action dated Mar. 2, 2022 for U.S. Appl. No. 17/127,670, filed Dec. 18, 2020, 18 pages.
Notice of Allowance dated Mar. 2, 2022 for U.S. Appl. No. 16/453,538, filed Jun. 26, 2019, 8 pages.
Notice of Allowance dated Mar. 7, 2022 for U.S. Appl. No. 16/421,441, filed May 23, 2019, 18 pages.
Notice of Allowance dated Mar. 11, 2022 for U.S. Appl. No. 16/716,050, filed Dec. 16, 2019, 13 pages.
Notice of Allowance dated Feb. 14, 2022 for U.S. Appl. No. 16/715,792, filed Dec. 16, 2019, 9 pages.
Notice of Allowance dated Feb. 22, 2022 for U.S. Appl. No. 17/083,920, filed Oct. 29, 2020, 10 pages.
Notification of the First Office Action dated Oct. 28, 2021 for Chinese Application No. 2019800218483, filed Jan. 24, 2019, 17 pages.
U.S. Appl. No. 15/668,241, "Advisory Action", dated Oct. 23, 2019, 5 pages.
U.S. Appl. No. 15/668,241, "Final Office Action", dated Jun. 17, 2019, 19 pages.
U.S. Appl. No. 15/668,241, "Non-Final Office Action", dated Dec. 21, 2018, 3 pages.
U.S. Appl. No. 15/668,241, "Notice of Allowance", dated Jun. 29, 2020, 8 pages.
U.S. Appl. No. 15/668,241, "Notice of Allowance", dated Mar. 5, 2020, 8 pages.
U.S. Appl. No. 15/668,241, "Supplemental Notice of Allowability", dated Apr. 29, 2020, 5 pages.
U.S. Appl. No. 15/719,345, "Final Office Action", dated Apr. 29, 2020, 14 pages.
U.S. Appl. No. 15/719,345, "Non- Final Office Action", dated Nov. 25, 2019, 14 pages.
U.S. Appl. No. 15/719,345, "Notice of Allowance", dated Aug. 12, 2020, 10 pages.
U.S. Appl. No. 15/719,345, "Notice of Allowance", dated Sep. 3, 2020, 12 pages.
U.S. Appl. No. 15/801,216, "Advisory Action", dated Apr. 7, 2020, 3 pages.
U.S. Appl. No. 15/801,216, "Final Office Action", dated Dec. 26, 2019, 5 pages.
U.S. Appl. No. 15/801,216, "Non-Final Office Action", dated Jun. 27, 2019, 13 pages.
U.S. Appl. No. 15/801,216, "Notice of Allowance", dated Jun. 23, 2020, 5 pages.
U.S. Appl. No. 15/847,517, "Non-Final Office Action", dated Nov. 23, 2018, 21 pages.

(56) References Cited

OTHER PUBLICATIONS

U.S. Appl. No. 15/847,517, "Notice of Allowance", dated May 1, 2019, 11 pages.
U.S. Appl. No. 15/861,588, "Non-Final Office Action", dated Jul. 10, 2019, 11 pages.
U.S. Appl. No. 15/861,588, "Notice of Allowance", dated Nov. 26, 2019, 9 pages.
U.S. Appl. No. 15/876,061, "Corrected Notice of Allowability", dated Apr. 28, 2020, 2 pages.
U.S. Appl. No. 15/876,061, "Non-Final Office Action", dated Sep. 18, 2019, 23 pages.
U.S. Appl. No. 15/876,061, "Notice of Allowability", dated May 6, 2020, 2 pages.
U.S. Appl. No. 15/876,061, "Notice of Allowance", dated Feb. 4, 2020, 13 pages.
U.S. Appl. No. 15/927,896, "Non-Final Office Action", dated May 1, 2019, 10 pages.
U.S. Appl. No. 15/983,379, "Notice of Allowance", dated Oct. 18, 2019, 9 pages.
U.S. Appl. No. 15/983,391, "Non-Final Office Action", dated Aug. 29, 2019, 12 pages.
U.S. Appl. No. 15/983,391, "Notice of Allowance", dated Apr. 8, 2020, 8 pages.
U.S. Appl. No. 16/177,971, "Final Office Action", dated Feb. 27, 2020, 9 pages.
U.S. Appl. No. 16/177,971, "Non-Final Office Action", dated Sep. 25, 2019, 9 pages.
U.S. Appl. No. 16/177,971, "Notice of Allowance", dated Apr. 24, 2020, 6 pages.
U.S. Appl. No. 16/210,748, "AdvisoryAction", dated Oct. 8, 2020, 4 pages.
U.S. Appl. No. 16/210,748, "Final Office Action", dated Jul. 7, 2020, 11 pages.
U.S. Appl. No. 16/210,748, "Non-Final Office Action", dated Jan. 31, 2020, 11 pages.
U.S. Appl. No. 16/249,420, "Non-Final Office Action", dated Jul. 22, 2020, 9 pages.
U.S. Appl. No. 16/249,420, "Notice of Allowance", dated Nov. 18, 2020, 8 pages.
U.S. Appl. No. 16/286,355, "Non-Final Office Action", dated Oct. 1, 2019, 6 pages.
U.S. Appl. No. 16/286,355, "Notice of Allowance", dated Feb. 12, 2020, 7 pages.
U.S. Appl. No. 16/286,355, "Notice of Allowance", dated Jun. 4, 2020, 7 pages.
U.S. Appl. No. 16/369,763, "Non-Final Office Action", dated Jul. 22, 2020, 15 pages.
U.S. Appl. No. 16/369,763, "Notice of Allowance", dated Jan. 22, 2021, 8 pages.
U.S. Appl. No. 16/382,015, "Notice of Allowance", dated Jun. 11, 2020, 11 pages.
U.S. Appl. No. 16/384,720, "Non-Final Office Action", dated May 1, 2020, 6 pages.
U.S. Appl. No. 16/384,720, "Notice of Allowance", dated Aug. 26, 2020, 8 pages.
U.S. Appl. No. 16/384,720, "Notice of Allowance", dated Oct. 14, 2020, 8 pages.
U.S. Appl. No. 16/431,693, "Non-Final Office Action", dated Jan. 30, 2020, 6 pages.
U.S. Appl. No. 16/431,693, "Notice of Allowance", dated Jun. 24, 2020, 7 pages.
U.S. Appl. No. 16/435,449, "Notice of Allowance", dated Sep. 16, 2020, 7 pages.
U.S. Appl. No. 16/435,449, "Notice of Allowance", dated Jul. 27, 2020, 8 pages.
U.S. Appl. No. 16/436,049, "Non-Final Office Action", dated Jun. 30, 2020, 11 pages.
U.S. Appl. No. 16/436,049, "Non-Final Office Action", dated Mar. 4, 2020, 9 pages.
U.S. Appl. No. 16/436,049, "Notice of Allowance", dated Oct. 21, 2020, 8 pages.
U.S. Appl. No. 16/453,538, "Non-Final Office Action", dated Apr. 21, 2021, 16 pages.
U.S. Appl. No. 16/454,787, "Notice of Allowance", dated Apr. 22, 2020, 10 pages.
U.S. Appl. No. 16/454,787, "Notice of Allowance", dated Jul. 9, 2020, 9 pages.
U.S. Appl. No. 16/454,787, "Notice of Allowance", dated Sep. 9, 2020, 9 pages.
U.S. Appl. No. 16/544,136, "Notice of Allowance", dated Oct. 15, 2020, 11 pages.
U.S. Appl. No. 16/566,583, "Final Office Action", dated Apr. 15, 2020, 24 pages.
U.S. Appl. No. 16/566,583, "Non-Final Office Action", dated Oct. 1, 2019, 10 pages.
U.S. Appl. No. 16/566,583, "Non-Final Office Action", dated Jul. 27, 2020, 11 pages.
U.S. Appl. No. 16/566,583, "Notice of Allowance", dated Nov. 3, 2020, 11 pages.
U.S. Appl. No. 16/707,988, "Non-Final Office Action", dated Sep. 22, 2020, 15 pages.
U.S. Appl. No. 16/715,792, "Non-Final Office Action", dated Jan. 1, 2021, 15 pages.
U.S. Appl. No. 16/716,050, "Non-Final Office Action", dated May 14, 2021, 16 pages.
U.S. Appl. No. 16/829,249, "Non-Final Office Action", dated Apr. 27, 2021, 9 pages.
Cho et al., "A Low Power Dual CDS for a Column-Parallel CMOS Image Sensor", Journal of Semiconductor Technology and Science, vol. 12, No. 4, Dec. 30, 2012, pp. 388-396.
EP18179838.0, "Extended European Search Report", dated May 24, 2019, 17 pages.
EP18179838.0, "Partial European Search Report", dated Dec. 5, 2018, 14 pages.
EP18179846.3, "Extended European Search Report", dated Dec. 7, 2018, 10 pages.
EP18179851.3, "Extended European Search Report", dated Dec. 7, 2018, 8 pages.
EP18188684.7, "Extended European Search Report", dated Jan. 16, 2019, 10 pages.
EP18188684.7, "Office Action", dated Nov. 26, 2019, 9 pages.
EP18188962.7, "Extended European Search Report", dated Oct. 23, 2018, 8 pages.
EP18188962.7, "Office Action", dated Aug. 28, 2019, 6 pages.
EP18188968.4, "Extended European Search Report", dated Oct. 23, 2018, 8 pages.
EP18188968.4, "Office Action", dated Aug. 14, 2019, 5 pages.
EP18189100.3, "Extended European Search Report", dated Oct. 9, 2018, 8 pages.
EP19723902.3, "Office Action", dated Jul. 7, 2021, 3 pages.
Kavusi et al., "Quantitative Study of High-Dynamic-Range Image Sensor Architectures", Proceedings of Society of Photo-Optical Instrumentation Engineers—The International Society for Optical Engineering, vol. 5301, Jun. 7, 2004, pp. 264-275.
PCT/US2018/039350, "International Preliminary Report on Patentability", dated Jan. 9, 2020, 10 pages.
PCT/US2018/039350, "International Search Report and Written Opinion", dated Nov. 15, 2018, 13 pages.
PCT/US2018/039352, "International Search Report and Written Opinion", dated Oct. 26, 2018, 10 pages.
PCT/US2018/039431, "International Search Report and Written Opinion", dated Nov. 7, 2018, 14 pages.
PCT/US2018/045661, "International Search Report and Written Opinion", dated Nov. 30, 2018, 11 Pages.
PCT/US2018/045666, "International Preliminary Report on Patentability", dated Feb. 27, 2020, 11 pages.
PCT/US2018/045666, "International Search Report and Written Opinion", dated Dec. 3, 2018, 13 pages.
PCT/US2018/045673, "International Search Report and Written Opinion", dated Dec. 4, 2018, 13 pages.
PCT/US2018/046131, "International Search Report and Written Opinion", dated Dec. 3, 2018, 10 pages.

(56) References Cited

OTHER PUBLICATIONS

PCT/US2018/064181, "International Preliminary Report on Patentability", dated Jun. 18, 2020, 9 pages.
PCT/US2018/064181, "International Search Report and Written Opinion", dated Mar. 29, 2019, 12 pages.
PCT/US2019/014044, "International Search Report and Written Opinion", dated May 8, 2019, 11 pages.
PCT/US2019/019756, "International Search Report and Written Opinion", dated Jun. 13, 2019, 11 pages.
PCT/US2019/025170, "International Search Report and Written Opinion", dated Jul. 9, 2019, 11 pages.
PCT/US2019/027727, "International Search Report and Written Opinion", dated Jun. 27, 2019, 11 pages.
PCT/US2019/027729, "International Search Report and Written Opinion", dated Jun. 27, 2019, 10 pages.
PCT/US2019/031521, "International Search Report and Written Opinion", dated Jul. 11, 2019, 11 pages.
PCT/US2019/034007, "International Search Report and Written Opinion", dated Oct. 28, 2019, 19 pages.
PCT/US2019/035724, "International Search Report and Written Opinion", dated Sep. 10, 2019, 12 pages.
PCT/US2019/036484, "International Search Report and Written Opinion", dated Sep. 19, 2019, 10 pages.
PCT/US2019/036492, "International Search Report and Written Opinion", dated Sep. 25, 2019, 9 pages.
PCT/US2019/036536, "International Search Report and Written Opinion", dated Sep. 26, 2019, 14 pages.
PCT/US2019/036575, "International Search Report and Written Opinion", dated Sep. 30, 2019, 16 pages.
PCT/US2019/039410, "International Search Report and Written Opinion", dated Sep. 30, 2019, 11 pages.
PCT/US2019/039758, "International Search Report and Written Opinion", dated Oct. 11, 2019, 13 pages.
PCT/US2019/047156, "International Search Report and Written Opinion", dated Oct. 23, 2019, 9 pages.
PCT/US2019/048241, "International Search Report and Written Opinion", dated Jan. 28, 2020, 16 pages.
PCT/US2019/049756, "International Search Report and Written Opinion", dated Dec. 16, 2019, 8 pages.
PCT/US2019/059754, "International Search Report and Written Opinion", dated Mar. 24, 2020, 15 pages.
PCT/US2019/065430, "International Search Report and Written Opinion", dated Mar. 6, 2020, 13 pages.
PCT/US2019/066805, "International Search Report and Written Opinion", dated Mar. 6, 2020, 13 pages.
PCT/US2019/066831, "International Search Report and Written Opinion", dated Feb. 27, 2020, 15 pages.
PCT/US2020/044807, "International Search Report and Written Opinion", dated Sep. 30, 2020, 12 pages.
PCT/US2020/059636, "International Search Report and Written Opinion", dated Feb. 11, 2021, 18 pages.
Snoeij, "A Low Power Column-Parallel 12-Bit ADC for CMOS Imagers", Institute of Electrical and Electronics Engineers Workshop on Charge-Coupled Devices and Advanced Image Sensors, Jun. 1, 2005, pp. 169-172.
Tanner et al., "Low-Power Digital Image Sensor for Still Picture Image Acquisition", Visual Communications and Image Processing, vol. 4306, Jan. 22, 2001, 8 pages.
Xu et al., "A New Digital-Pixel Architecture for CMOS Image Sensor with Pixel-Level ADC and Pulse Width Modulation using a 0.18 Mu M CMOS Technology", Institute of Electrical and Electronics Engineers Conference on Electron Devices and Solid-State Circuits, Dec. 16-18, 2003, pp. 265-268.
International Search Report and Written Opinion for International Application No. PCT/US2022/044519, dated Dec. 8, 2022, 12 pages.
Non-Final Office Action dated Jan. 10, 2023 for U.S. Appl. No. 17/591,300, filed Feb. 2, 2022, 15 pages.
Non-Final Office Action dated Jan. 11, 2023 for U.S. Appl. No. 17/180,207, filed Feb. 19, 2021, 19 pages.
Non-Final Office Action dated Oct. 13, 2022 for U.S. Appl. No. 17/538,092, filed Nov. 30, 2021, 10 pages.
Notice of Allowance dated Oct. 5, 2022 for U.S. Appl. No. 16/672,427, filed Nov. 1, 2019, 13 pages.
Office Action dated Dec. 19, 2022 for Taiwan Patent Application No. 108130644, filed Aug. 27, 2019, 23 pages.
Office Action dated Oct. 20, 2022 for European Application No. 19740456.9, filed Jun. 27, 2019, 6 pages.
Office Action dated Oct. 26, 2022 for Taiwan Application No. 108122610, 9 pages.
Non-Final Office Action dated Aug. 1, 2022 for U.S. Appl. No. 16/550,851, filed Aug. 26, 2019, 7 pages.
Notice of Allowance dated Aug. 16, 2022 for U.S. Appl. No. 16/453,538, filed Jun. 26, 2019, 2 pages.
Notice of Allowance dated Aug. 26, 2022 for U.S. Appl. No. 16/672,427, filed Nov. 1, 2019, 3 pages.
Notice of Allowance dated Jun. 29, 2022 for U.S. Appl. No. 16/672,427, filed Nov. 1, 2019, 8 pages.
Notice of Allowance dated Aug. 31, 2022 for U.S. Appl. No. 16/453,538, filed Jun. 26, 2019, 2 pages.
Office Action dated Jul. 6, 2022 for Chinese Application No. 201980024435.0, filed Apr. 1, 2019, 16 pages.
Non-Final Office Action dated May 3, 2023 for U.S. Appl. No. 16/550,851, filed Aug. 26, 2019, 7 pages.
Notice of Allowance dated Jan. 12, 2023 for U.S. Appl. No. 16/550,851, filed Aug. 26, 2019, 7 pages.
Notice of Allowance dated Feb. 14, 2023 for U.S. Appl. No. 17/538,092, filed Nov. 30, 2021, 8 pages.
Office Action dated Jan. 13, 2023 for Taiwan Application No. 108111979, filed Apr. 3, 2019, 38 pages.
Office Action dated Feb. 14, 2023 for Japanese Patent Application No. 2020-547367, filed Apr. 1, 2019, 12 pages.
Office Action dated Jan. 17, 2023 for Taiwan Patent Application No. 108129677, filed Aug. 20, 2019, 12 pages.
Notice of Allowance dated Jul. 6, 2023 for U.S. Appl. No. 17/591,300, filed Feb. 2, 2022, 8 pages.
Notice of Allowance dated Jun. 9, 2023 for U.S. Appl. No. 17/538,092, filed Nov. 30, 2021, 8 pages.
Office Action dated Jun. 20, 2023 for Japanese Patent Application No. 2020-569765, filed on Dec. 14, 2020, 10 pages.
Office Action dated May 9, 2023 for Japanese Patent Application No. 2020-564441, filed on Nov. 16, 2020, 13 pages.
Advisory Action dated Feb. 8, 2022 for U.S. Appl. No. 16/560,665, filed Sep. 4, 2019, 3 pages.
Final Office Action dated Oct. 12, 2022 for U.S. Appl. No. 16/560,665, filed Sep. 4, 2019, 17 pages.
Non-Final Office Action dated May 4, 2023 for U.S. Appl. No. 17/849,264, filed Jun. 24, 2022, 9 pages.
Non-Final Office Action dated Mar. 16, 2022 for U.S. Appl. No. 16/560,665, filed Sep. 4, 2019, 19 pages.
Non-Final Office Action dated Apr. 26, 2023 for U.S. Appl. No. 16/560,665, filed Sep. 4, 2019, 22 pages.
Notice of Allowance dated Sep. 13, 2023 for U.S. Appl. No. 17/591,300, filed Feb. 2, 2022, 8 pages.
Notice of Allowance dated Sep. 15, 2023 for U.S. Appl. No. 17/538,092, filed Nov. 30, 2021, 9 pages.
Notice of Allowance dated Mar. 16, 2022 for U.S. Appl. No. 16/210,748, filed Dec. 5, 2018, 6 pages.
Notice of Allowance dated Aug. 23, 2023 for U.S. Appl. No. 17/180,207, filed Feb. 19, 2021, 11 pages.
Office Action dated Jul. 4, 2023 for Japanese Patent Application No. 2020-569903, filed on Dec. 14, 2020, 05 pages.
Office Action dated Aug. 8, 2023 for Japanese Patent Application No. 2020-547367, filed on Apr. 1, 2019, 6 pages.
Office Action dated Aug. 8, 2023 for Korean Application No. 10-2020-7030391, filed Apr. 1, 2019, 5 pages.

* cited by examiner

MULTI-MODE IMAGE SENSOR

RELATED APPLICATION

This patent application claims priority to U.S. Provisional Patent Application Ser. No. 63/053,311, filed Jul. 17, 2020, entitled "MULTI-MODE IMAGE SENSOR," which is assigned to the assignee hereof and are incorporated herein by reference in their entirety for all purposes.

BACKGROUND

A typical image sensor includes an array of pixel cells. Each pixel cell may include a photodiode to sense light by converting photons into charge (e.g., electrons or holes). To reduce image distortion, a global shutter operation can be performed in which each photodiode of the array of photodiodes senses the incident light simultaneously to generate charge. The charge generated by the array of photodiodes can then be quantized by an analog-to-digital converter (ADC) into digital values to generate the image. In addition, many applications may require the image sensor to provide high-resolution images and/or at high frame rates.

SUMMARY

The present disclosure relates to image sensors. More specifically, and without limitation, this disclosure relates to an image sensor having multi-modes of operations.

In some examples, an apparatus is provided. The apparatus includes: an array of pixel cells, each pixel cell of the array of pixel cells including one or more photodiodes configured to generate charge in response to light, and a charge storage device to convert the charge to output a voltage; first analog-to-digital converters (ADCs), each first ADC being associated with a pixel cell or a block of pixel cells of the array of pixel cells; second ADCs, each second ADC being associated with a column of pixel cells or a column of blocks of pixel cells of the array of pixel cells; and a controller. The controller is configured to: in a first mode, enable at least a subset of the first ADCs to perform a quantization operation of the voltages output by at least a subset of the pixel cells or the blocks of pixel cells associated with the at least the subset of the first ADCs in parallel to generate a first image frame; and in a second mode, enable at least a subset of the second ADCs to perform quantization operations sequentially of the voltages output by pixel cells or blocks of pixel cells within at least a subset of the columns of pixel cells or the columns of blocks of pixel cells associated with the at least the subset of the second ADCs to generate a second image frame.

In some aspects, the controller is configured to enable a subset of the array of pixel cells to generate voltages, and to enable a subset of the first ADCs or the second ADCs to generate the first image frame or the second image frame as a sparse image frame.

In some aspects, the array of pixel cells are formed in a first semiconductor layer. The first processing circuits are formed in a second semiconductor layer. The first semiconductor layer and the second semiconductor layer form a stack. The first processing circuits are positioned directly below the array of pixel cells.

In some aspects, the first processing circuits are connected to the array of pixel cells via vertical interconnects.

In some aspects, the second processing circuits are formed in the second semiconductor layer and on a periphery of the first processing circuits.

In some aspects, the apparatus further comprises: column signal lines, each column signal line being connected to a second ADC of the second ADCs and associated with a column of pixel cells or a column of blocks of pixel cells; and row selection switches, wherein each row selection switch connects between a column signal line and a pixel cell of the column of pixel cells associated with the column signal line.

In some aspects, the controller is configured to, in the second mode, transmit row selection signals to the row selection switches to select one pixel cell from each of the at least a subset of the columns of pixel cells to access one second ADC of the at least a subset of the second ADCs.

In some aspects, the controller is configured to, in the second mode, transmit the row selection signals to the row selection switches to select one row of pixel cells from the at least a subset of the associated columns of pixel cells to access the at least a subset of the second ADCs in parallel.

In some aspects, the apparatus further comprises column selection switches forming pairs of serial switches with row selection switches. A pair of a row selection switch and a column selection switch connects between a column signal line and a pixel cell of a block of pixel cells.

In some aspects, the controller is configured to: in the first mode, transmit a first sequence of row selection signals and column selection signals to the pairs of serial switches to enable each pixel cell within a block of pixel cells to sequentially access the first ADC associated with the block of pixel cells; and in the second mode, transmit a second sequence of row selection signals and column selection signals to the pairs of serial switches to enable pixel cells within the at least a subset of the columns of blocks of pixel cells to sequentially access the second ADCs associated with the subset of the columns of blocks of pixel cells.

In some aspects, the apparatus further comprises: first switches controllable by the controller to connect the first ADCs to the pairs of serial switches in the first mode and to disconnect the first ADCs from the pairs of serial switches in the second mode; and second switches controllable by the controller to connect the second ADCs to the pairs of serial switches in the second mode and to disconnect the second ADCs from the pairs of serial switches in the first mode.

In some aspects, the controller is configured to switch between the first mode and the second mode based on one or more operation conditions.

In some aspects, the one or more operation conditions comprise at least one of: a sparsity of an image frame to be generated, a frame period in which the image frame is to be generated, or a constraint for resources to be used in generating and transmitting the image frame.

In some aspects, the controller is configured to operate in the second mode based on the sparsity of the image frame exceeding a threshold.

In some aspects, the controller is configured to operate in the second mode such that a power consumption of the apparatus is within the constraint.

In some aspects, the controller is configured to operate in the first mode based on a frame period being below a threshold.

In some aspects, the apparatus further comprises analog pre-processing circuits, each analog pre-processing circuit being interposed between a column signal line and a second ADC.

In some aspects, each analog pre-processing circuit is configured to perform at least one of: a summation or filtering of analog outputs received from the column signal line, or a detection of changes in the analog outputs received from the column signal line between image frames.

In some aspects, each analog pre-processing circuit is configured to transmit a start signal to the second ADC to start a quantization operation of the analog outputs based on the detected changes exceeding a threshold.

In some examples, a method comprises: operating each pixel cell of at least a subset of an array of pixel cells to generate charge in response to light, and to convert the charge to output a voltage; in a first mode, enabling at least a subset of first ADCs to perform a quantization operation of the voltages output by at least the subset of the pixel cells or blocks of pixel cells in parallel to generate a first image frame, each first ADC being associated with a pixel cell or a block of pixel cells of the array of pixel cells; and in a second mode, enabling at least a subset of second ADCs to perform quantization operations sequentially for voltages output by pixel cells or blocks of pixel cells within at least a subset of columns of pixel cells or columns of blocks of pixel cells to generate a second image frame, each second ADC being associated with a column of pixel cells or a column of blocks of pixel cells of the array of pixel cells.

BRIEF DESCRIPTION OF THE DRAWINGS

Illustrative embodiments are described with reference to the following figures.

Figure 1A:
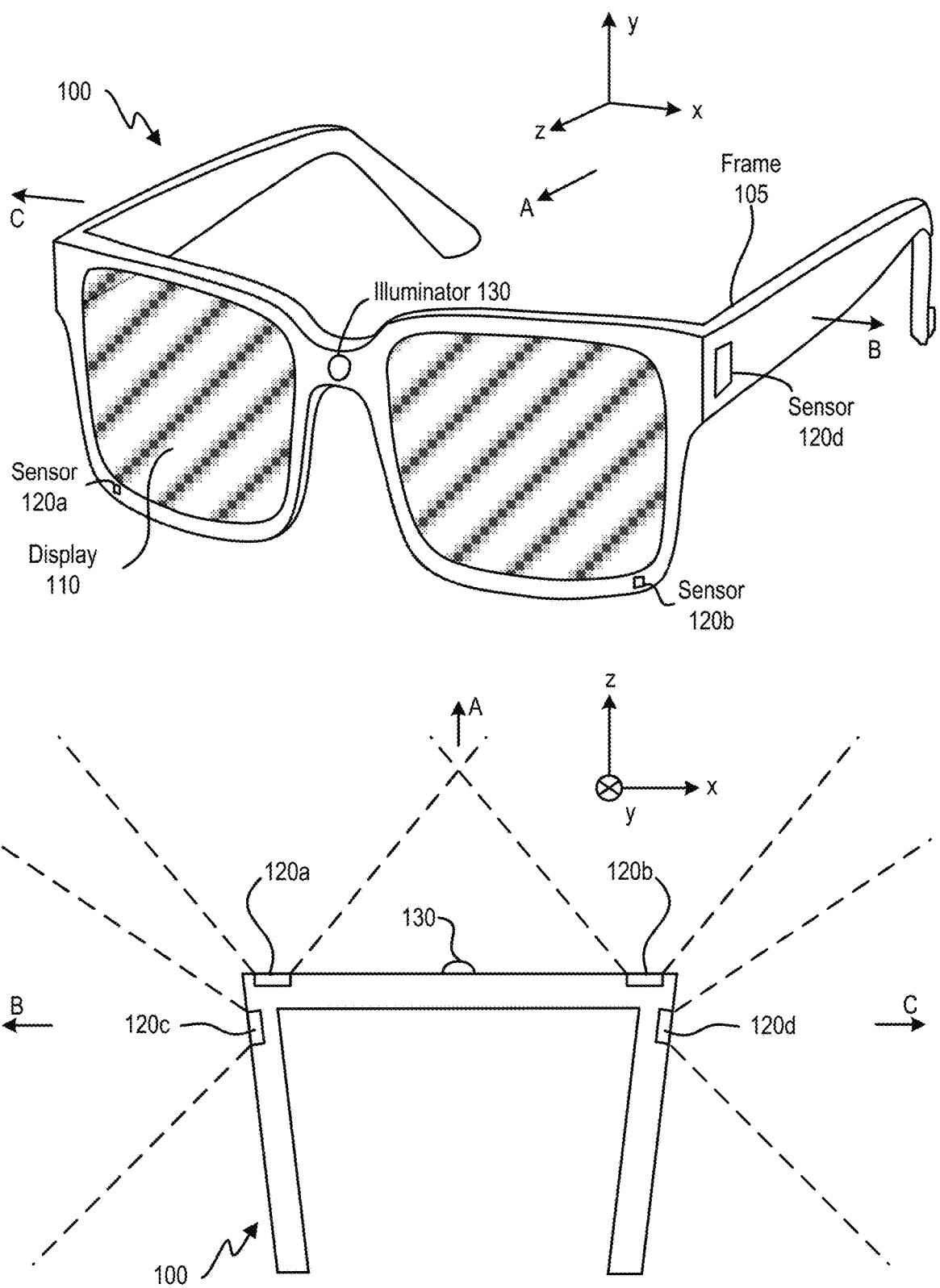
FIG. 1A and FIG. 1B are diagrams of an embodiment of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes an array of pixel cells. Each pixel cell includes a photodiode to sense incident light by converting photons into charge (e.g., electrons or holes). The charge generated by photodiodes of the array of pixel cells can then be quantized by an analog-to-digital converter (ADC) into digital values. The ADC can quantize the charge by, for example, using a comparator to compare a voltage representing the charge with one or more quantization levels, and a digital value can be generated based on the comparison result. The digital values can then be stored in a memory to generate the image.

The image data from an image sensor can support various wearable applications, such as fusion of 2D and 3D sensing, object recognition and tracking, or location tracking. These applications can extract feature information from a subset of pixels of the image to perform computations. For example, to perform 3D sensing, an application can identify pixels of reflected structured light (e.g., dots), compare a pattern extracted from the pixels with the transmitted structured light, and perform depth computation based on the comparison. The application can also identify 2D pixel data from the same pixel cells that provide the extracted pattern of structured light to perform fusion of 2D and 3D sensing. To perform object recognition and tracking, an application can also identify pixels of image features of the object, extract the image features from the pixels, and perform the recognition and tracking based on the extraction results. These applications are typically executed on a host processor, which can be electrically connected with the image sensor and receive the pixel data via interconnects. The host processor, the image sensor, and the interconnects can be part of a wearable device.

All these applications can benefit from high-resolution images and/or high frame rates. Higher-resolution images allow the application to extract more detailed features/patterns (e.g., more refined patterns of reflected structured light, more detailed image features), whereas providing images generated at a higher frame rate enables an application to track the location of an object, the location of the wearable device, etc., at a higher sampling rate, both of which can improve the performances of the applications.

To reduce power and chip area, at least some of the pixel cells may share an ADC and a memory. A rolling shutter operation can be performed to accommodate the sharing of the ADC and the memory among the pixel cells. For example, the array of pixel cells can be divided into multiple groups (e.g., rows or columns of pixel cells), with the pixels of each group sharing a row-level or column-level ADC and the memory. To accommodate the sharing of the ADC and the memory, a rolling shutter operation can be performed in which each pixel cell within the group can take a turn to be exposed to incident light to generate the charge, followed by accessing the ADC to perform the quantization of the charge into a digital value, and storing the digital value into the memory, to generate an image frame. As the rolling shutter operation exposes different pixel cells to incident light at different times, an image generated from the rolling shutter operation can experience distortion, especially for images of a moving object and/or images captured when the image sensor is moving.

To reduce image distortion, a global shutter operation can be performed in which each pixel cell of the array of pixel cells is exposed to incident light to generate charge simultaneously within a global shutter period (or a global integration period). Each pixel cell can include a charge sensing device to temporarily store the charge generated by the photodiode. Each pixel cell, or a block of pixel cells (e.g., a 2×2 array of pixel cells, a 4×4 array of pixel cells), can include a dedicated pixel-level ADC or a dedicated block-level ADC. At the end of the global shutter operation, each pixel cell (or block of pixel cells) can perform a quantization operation of the stored charge in parallel, and store the quantization result at the pixel-level (or block-level) memory. With a global shutter operation, all pixel cells can be exposed to incident light at the same time to measure the light intensity, which can reduce distortion caused by imaging a moving object. Moreover, as the pixel-level ADCs (or block-level ADCs) perform the quantization operation for each pixel cell (or block of pixel cells) in parallel, rather than having each pixel cell in a row/column taking turns in accessing a shared row-level or column-level ADC to perform the quantization, the quantization operations for an image frame in a global shutter operation can complete within a shorter time than in a rolling shutter operation, which can reduce the frame period and increase the frame rate at which the image frames are captured.

While it is desirable to generate high quality image frames with high resolution, low distortion, and at a high frame rate, these can lead to generation, transmission, and processing of a large volume of pixel data, which can present numerous challenges. For example, generating, transmitting and processing a large volume of pixel data at a high data rate can lead to high power consumption at the image sensor, the interconnect, and the host processor. Moreover, the image sensor and the host processor may impose bandwidth limitations on and add latency to the generation and processing of large volumes of pixel data. The high power and high bandwidth requirement can be especially problematic for a wearable device which tends to operate with relatively low power and at a relatively low speed due to form factor and safety considerations.

One way to reduce the power and bandwidth requirement is by performing a sparse image sensing operation. As part of the sparse image sensing operation, only a subset of pixel cells and the associated pixel-level or block-level ADCs are enabled to generate full resolution pixel data, while the rest of the pixel cells and their pixel-level or block-level ADCs are either disabled or enabled to generate low resolution pixel data. The subset of pixel cells can be selected based on, for example, a sub-sampling operation, or based on identifying a region of interest (ROI) that includes an object of interest. With such arrangements, at least some of the pixel-level or block-level ADCs can be disabled or can operate at a low power/low resolution mode, while pixel cells that produce relevant pixel data (e.g., for tracking an object of an interest) can be enabled to generate the relevant pixel data at full resolution to support the various wearable applications. All these can reduce the power consumption by the pixel-level or block-level ADCs as well as the volume of pixel data generated for an image frame, while maintaining the resolution of relevant pixel data in the image frame, thereby improving the efficiency of the image sensing operation.

While a sparse-image sensing operation can reduce the power and bandwidth requirement, having pixel-level or block-level ADCs to perform the quantization operations for the sparse-image sensing operation can still lead to inefficient use of power. Specifically, while some of the pixel-level or block-level ADCs are disabled, high speed control signals, such as clocks and other signals may still be transmitted to each pixel-level or block-level ADCs, which can consume a substantial amount of power and increase the average power consumption for generation of each pixel. The inefficiency can be further exacerbated when the sparsity of the image frame increases (e.g., containing fewer pixels), but the high speed control signals are transmitted to each pixel cell, such that the power consumption in transmitting the high speed control signals remains the same and the average power consumption for generation of each pixel increases due to fewer pixels being generated.

This disclosure relates to a multi-mode image sensor that can address at least some of the issues above. The image sensor comprises an array of pixel cells arranged in rows and columns, a set of in-array processing circuits, a set of off-array processing circuits, and a controller. Each pixel cell can include one or more photodiodes to detect light and convert the light to a charge, as well as charge measurement circuits including a charge storage device (e.g., a floating diffusion, an auxiliary capacitor) to convert the charge to a voltage, and a source follower to buffer the voltage. The set of in-array processing circuits can include pixel-level ADCs and pixel-level memory devices, or block-level ADCs and block-level memory devices. In some examples, each pixel cell can be associated with a pixel-level ADC and a pixel-level memory to store a pixel value generated by the pixel-level ADC. In some examples, each block of pixel cells can be associated with a block-level ADC and a block-level memory to store pixel values generated by the block-level ADC. In addition, the set of off-array processing circuits can include off-array ADCs and off-array memory positioned external to the array of pixel cells. Each off-array ADC can include, for example, a column-level ADC associated with and to be shared by a column of pixel cells, or a column of blocks of pixel cells.

In some examples, the array of pixel cells (including photodiodes, floating diffusions, source followers, etc.) can be formed in a first semiconductor layer, whereas the in-array ADCs and in-array memory can be formed in a second semiconductor layer that forms a stack with the first semiconductor layer. The in-array ADCs and in-array memory can be directly below the array of pixel cells and can be within the footprint of the array of pixel cells. Moreover, the off-array ADCs and off-array memory can also be formed as peripheral circuits on the peripheral of the in-array ADCs and memory and can be outside the footprint of the array of pixel cells. In some examples, the off-array ADCs and off-array memory can also be formed in a third semiconductor layer that forms a stack with the first and second semiconductor layers. The semiconductor layers can be connected by vertical interconnects, such as chip-to-chip copper bonding or through silicon vias (TSV). Each off-array ADC can be shared by a column (or row) of pixel cells to perform quantization operations to generate a pixel value for one or more pixel cells in the column, whereas the off-array memory can store the pixel values generated by one or more of the pixel cells to generate an image frame.

In some examples, the in-array and off-array ADCs can be ramp-based ADCs that perform quantization operations using an analog ramp and a digital ramp. An analog ramp can include a varying voltage that increases or decreases with time, whereas a digital ramp can include a counter value that increases or decreases with time. The ramp-based ADC can include a comparator to continuously compare the voltage output by a pixel cell with the analog ramp to generate a comparator output. At the time when the output intersects the analog ramp, the comparator output can switch, which causes a counter value of the digital ramp to be stored in an in-array memory or an off-array memory. The counter value stored in the memory can represent a result of the quantization operation. The image sensor can include support circuits to generate controls signals to support the quantization operation by the in-array and off-array ADCs. For example, the image sensor can include clocking circuits, analog and digital ramp generators, and a buffer network to distribute the analog and digital ramps to the in-array processing circuits so that at any given time each in-array ADC receives the same analog ramp voltage, and each in-array memory receives the same digital ramp counter value.

The controller can operate the array of pixel cells, the in-array processing circuits, the off-array processing circuits, and the support circuits to operate in one of an analog mode or a digital mode. In the analog mode, the controller can disable all in-array processing circuits as well as the buffer network that distributes the analog and digital ramps to the in-array processing circuits. The controller can control each pixel cell in a column to take turn in accessing an off-array ADC to perform quantization operations, and to store the quantization results at the off-array memory. In a case where the image sensor includes an off-array processing circuit for each column of pixel cells, the off-array processing circuits can perform quantization operations and store the quantization results for one row of pixel cells in parallel. In some examples, a global shutter operation can be performed in the analog mode, in which each pixel cell of the array of pixel cells is exposed to incident light to generate charge simultaneously within the same global shutter period, and each pixel cell in a column to take turn in accessing an off-array ADC after the global shutter period ends. In some examples, a rolling shutter operation can also be performed, in which pixel cells that share the same off-array ADC have staggered exposure periods that ends at different times, such that each pixel cell can wait for the same duration after its exposure periods to access the off-array ADC.

On the other hand, in the digital mode, the controller can disable the off-array processing circuits and enable the in-array processing circuits as well as the buffer network that distributes the analog and digital ramps to the in-array processing circuits. A global shutter operation can be performed, in which each pixel cell of the array of pixel cells is exposed to incident light to generate charge simultaneously within the same global shutter period. After the global shutter period ends, the controller can enable the pixel-level or block-level ADCs to perform quantization operations on the voltages output by the array of pixel cells in parallel.

The image sensor can include various circuits to support the analog and digital modes operations. Specifically, each column of pixel cells can be associated with a column signal line connected to the column-level ADC. The column signal line can include a bus on the first semiconductor layer and a vertical interconnect from the first semiconductor layer to the semiconductor layer that includes the column-level ADCs. In a case where each pixel cell includes a pixel-level ADC, the analog output of each pixel cell (from source follower, charge storage device, etc.) can be connected to the pixel-level ADC. The source follower output of each pixel cell within the column can be connected to the column signal line via a row selection switch. The row selection switch of each pixel cell can be controlled by a row selection signal to select a particular row of pixel cells. Moreover, the source follower output of each pixel cell is connected to a switchable pixel-level current source, whereas the column signal line is connected to a switchable column-level current source.

When operating the pixel-level processing circuits in the digital mode, in addition to disabling/powering off the column-level ADCs, the controller can transmit the row selection signals to disable each row selection switch and to disconnect the source follower output of each pixel cell of each column from the associated column signal line. The controller can also disable the column-level current source connected to each column signal line, and enable the pixel-level current source of each pixel cell, to enable the source follower of each pixel cell to drive the pixel-level ADC.

When operating the off-array processing circuits in the analog mode, the controller can transmit a sequence of row selection signals to sequentially connect pixel cells of different rows within the same column to the associated column signal line and to the column-level ADC. The controller can also enable the column-level current source to enable the source followers of the pixel cells to drive (at different times) the column-level ADC. The controller can also disable the pixel-level ADC and pixel-level current source of each pixel cell as they are not used for quantization operations in the analog mode.

In addition, in a case where the image sensor includes block-level ADCs and memory shared by a blocks of pixel cells (e.g., 2×2 array of pixel cells, 4×4 array of pixel cells), each block of pixel cells can be associated with a block signal line that supplies an input to a block-level ADC. The source follower output of each pixel cell of a block can be connected to the block signal line and the column signal line via a row selection switch and a column selection switch connected in series. The block signal line is connected to a switchable block-level current source, whereas the column signal line is connected to a switchable column-level current source. In some examples, the image sensor may further include additional switches to selectively connect the block signal line and the column signal line to the row selection switch and column selection switch.

When operating the block-level processing circuits in the digital mode, in addition to disabling/powering off the column-level ADCs, the controller can transmit a sequence of row selection signals and column selection signals to the row selection switches and column selection switches of each block of pixel cells, to sequentially select each pixel cell from each block of pixel cells to access the block-level ADCs. In some examples, the same sequence of row selection signals and column selection signals can be transmitted to each block of pixel cells (e.g., through sharing of signal lines that transmit row selection signals and column signals) so that the pixel cell in the same row/column position in each block is selected at each time. In some examples, different sequences of row selection signals and column selection signals can be transmitted to different blocks of pixel cells, such that pixel cells associated with different row/column positions within a block can access the block-level ADCs at each time. The controller can also disable the column-level current source connected to each column signal line, and enable the block-level current source of each block of pixel cells, to enable the source followers of the pixel cells of each block to drive the block-level ADC. The controller may also disconnect the column signal line from each block of pixel cells, to avoid the loading of the column signal line, which can include vertical interconnect between two semiconductor layers, on the source followers of the pixel cells.

When operating the off-array processing circuits in the analog mode, the controller can transmit column selection signals to enable column selection switches of each block of pixel cells. The controller can then transmit row selection signals to sequentially connect each row of pixel cells of each column to the associated column signal line to access the column-level ADC of each column. In some examples, pixel cells from the same row across different columns can be selected to access the column-level ADC of each column. In some examples, pixel cells from the different rows across different columns can also be selected to access the column-level ADC of each column. The controller can also enable the column-level current source, and disable the block-level ADC and block-level current sources. The controller may also disconnect the block signal line from each block of pixel cells, to avoid the loading of the block signal line, which can include vertical interconnect between two semiconductor layers, on the source followers of the pixel cells.

In some examples, the image sensor can support a sparse-image sensing operation in both the analog mode and the digital mode. The controller can receive a programming map identifying the row and column positions of a subset of the pixel cells to be enabled, and enable the subset of pixel cells based on the programming map. In the analog mode, the controller can determine which column(s) of pixel cells are to be enabled, and within each column, which row(s) of pixel cells are to be enabled. The controller can enable the column-level ADCs and memory for the enabled columns, and transmit row selection signals to the row selection switches to enable one or more row of pixels for in each enabled column. On the other hand, in the digital mode, the controller can individually store an enable/disable signal in the pixel-level memory/block-level memory of each pixel cell or each block of pixel cells based on the programming map. Each pixel cell can then be individually enabled/disabled based on the enable/disable signal stored in the pixel-level/block-level memory.

In some examples, the controller can select between the digital mode and analog mode based on an operation condition of the image sensor. The operation condition may include, for example, a degree of sparsity of the sparse-image sensing operation to be performed by the image sensor, frame rate, resource constraints, etc. For example, in a case where a full frame image is to be generated, or a sparse-image sensing operation having at least certain percentage of pixel cells being enabled, the controller may select digital mode, to maintain a low average power consumption for generation of each pixel. On the other hand, in a case where the degree of sparsity is high, such that a relatively low percentage of pixel cells is enabled, the controller may select analog mode as it is more efficient and can keep the average power consumption for generation of each pixel at a low value. As another example, the controller may also determine that the analog mode cannot support a requested frame rate and switch to the digital mode. As yet another example, the controller may also determine that the digital mode for a certain degree of sparsity and/or frame rate cannot satisfy the resource constraint, and switch to analog mode as a result. The controller may switch between the digital mode and the analog mode even within the same scene. For example, the image sensor may initially start at a digital mode to capture detailed image frames of a scene. Afterwards, the image sensor may switch to the analog mode to capture only portions of the scene that experience change with time. The image sensor may then switch back to the digital mode if a different scene is captured due to, for example, a movement of the image sensor (e.g., due to a movement of the wearable device that houses the image sensor).

In some examples, the image sensor can include analog processing circuits to perform pre-processing of the analog output from the pixel cells prior to forwarding the analog outputs to the column-level ADCs. For example, analog summation and/or filtering can be performed in the analog processing circuits. As another example, the analog processing circuits can support various types of processing, such as compressive sensing, high-speed tracking, or motion estimation, and enable column-level ADC based on a result of the processing. For example, the analog processing circuits can detect whether there are changes in the pixel cells outputs with respect to time, and control the column-level ADC to quantize the analog outputs of the pixel cells only when certain degree of changes is detected, to reduce power consumption and downstream processing of the images.

With the disclosed techniques, an image sensor can include circuit components to support both a digital mode operation and an analog mode operation. The digital mode operation can include using pixel-level or block-level ADCs to perform quantization operations for the analog outputs of each pixel cell (or each block of pixel cells), whereas the analog mode operation include having each pixel cell in a column sharing a column-level ADC to perform quantization operations. The digital mode can be performed to support high frame rate and global shutter operation, whereas the analog mode can be performed to support high-sparsity image sensing operation to improve efficiency. The image sensor can also switch between the analog mode and the digital mode based on various operation conditions, such as a degree of sparsity, frame rate, or power constraint. These can improve the operational flexibility of the image sensor and allow the operations of the image sensor to be adapted to dynamically changing operation conditions. All these can improve the performance of the image sensor.

The disclosed techniques may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infrared light, ultraviolet light), and can serve various purposes. For example, illuminator 130 may project light in a dark environment (or in an environment with low intensity of infrared light, ultraviolet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
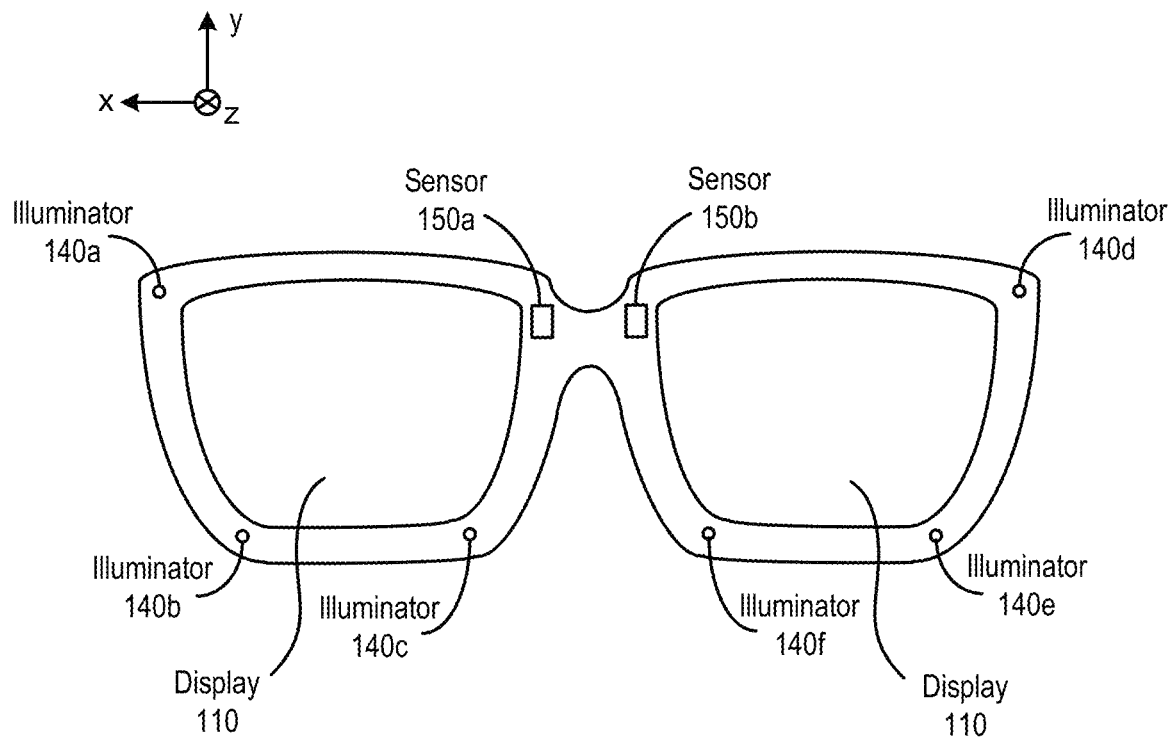

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
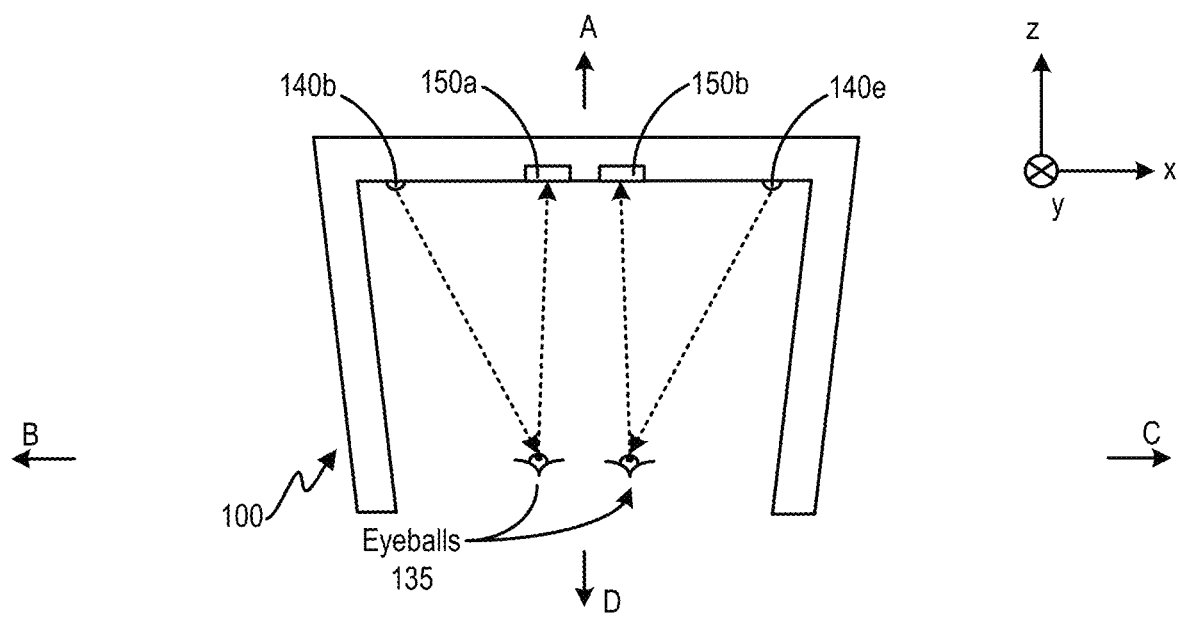
Figure 2:
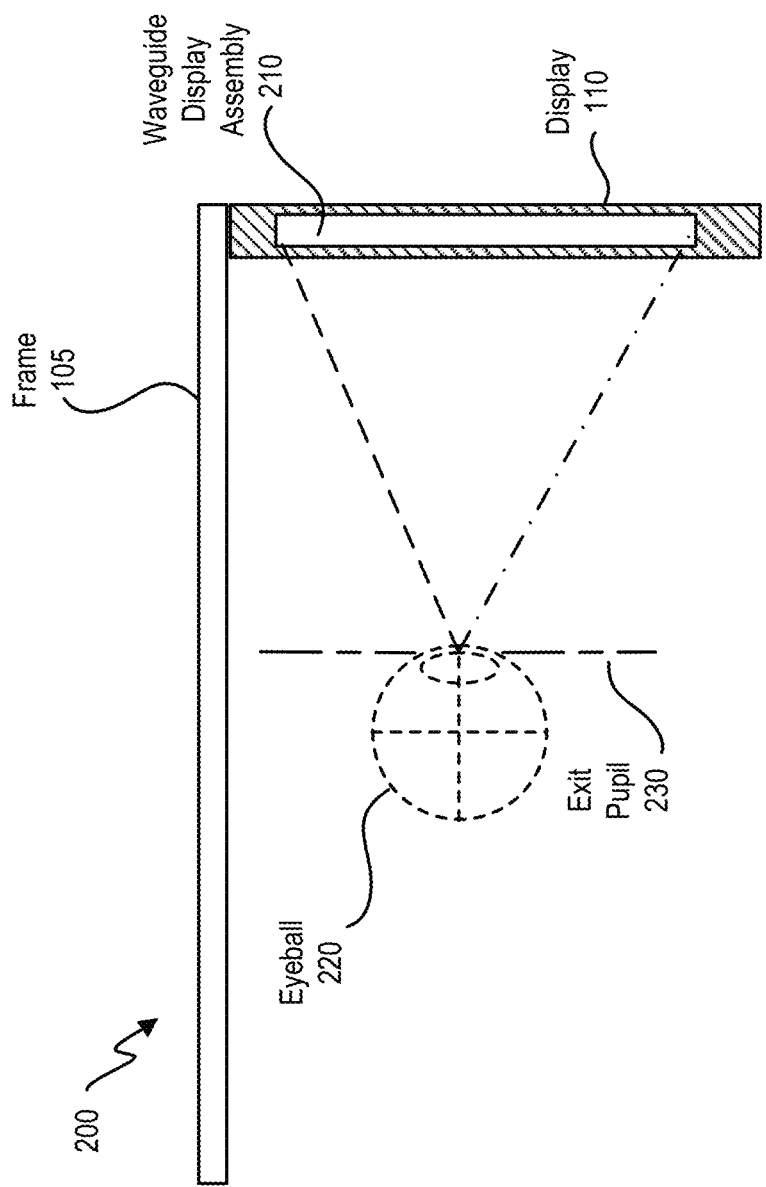
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
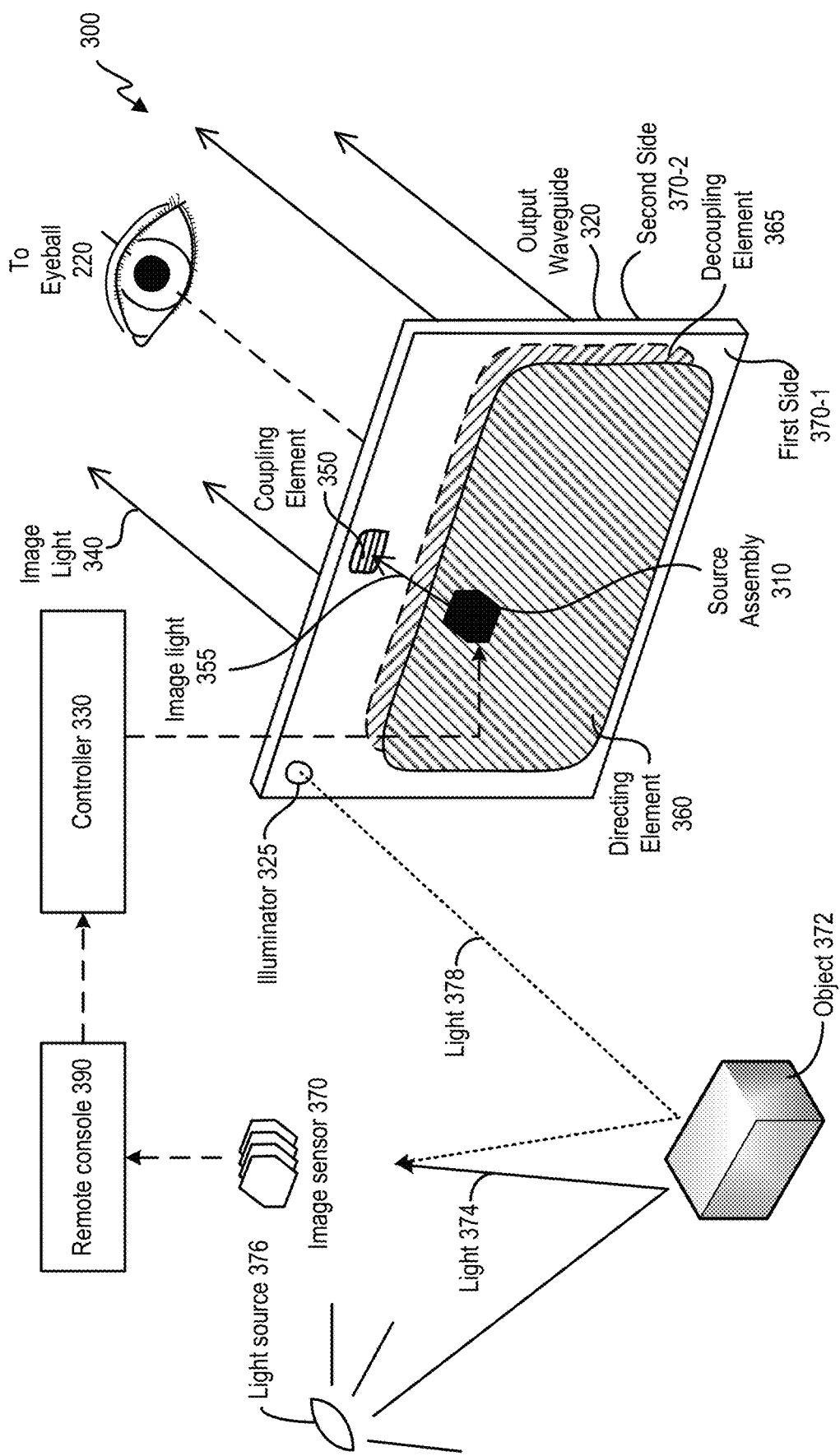
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, for example, a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, for example, a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of, for example, silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user or a gaze point of the user, and determine the content of the images to be displayed to the user. The remote console can transmit instructions to controller 330 related to the determined content. Based on the instructions, controller 330 can control the generation and outputting of image light 355 by source assembly 310.

Figure 4:
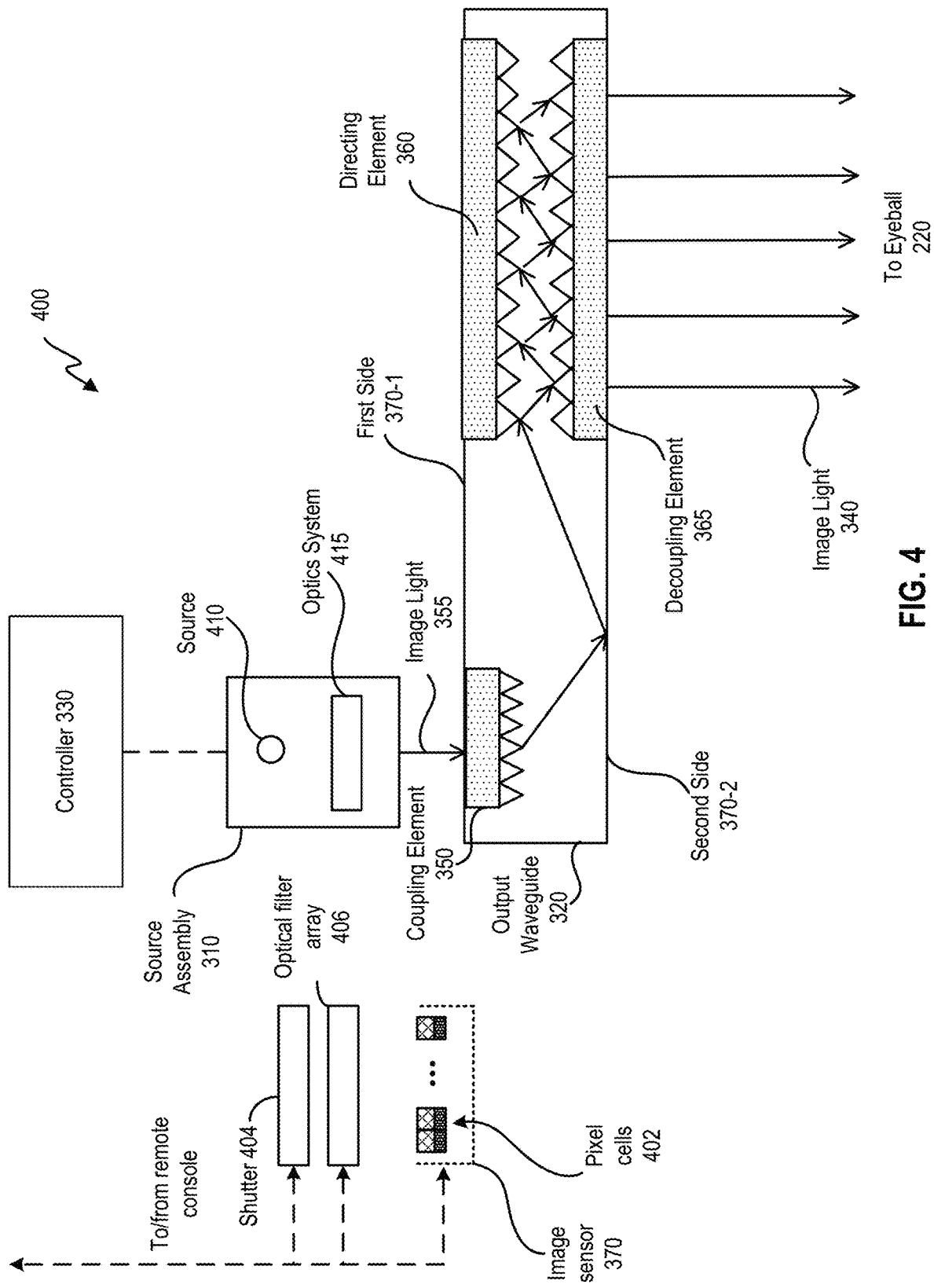
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter switch, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, for example, a laser diode, a vertical cavity surface emitting laser, and/or a light emitting diode.

Optics system 415 includes one or more optical components that condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
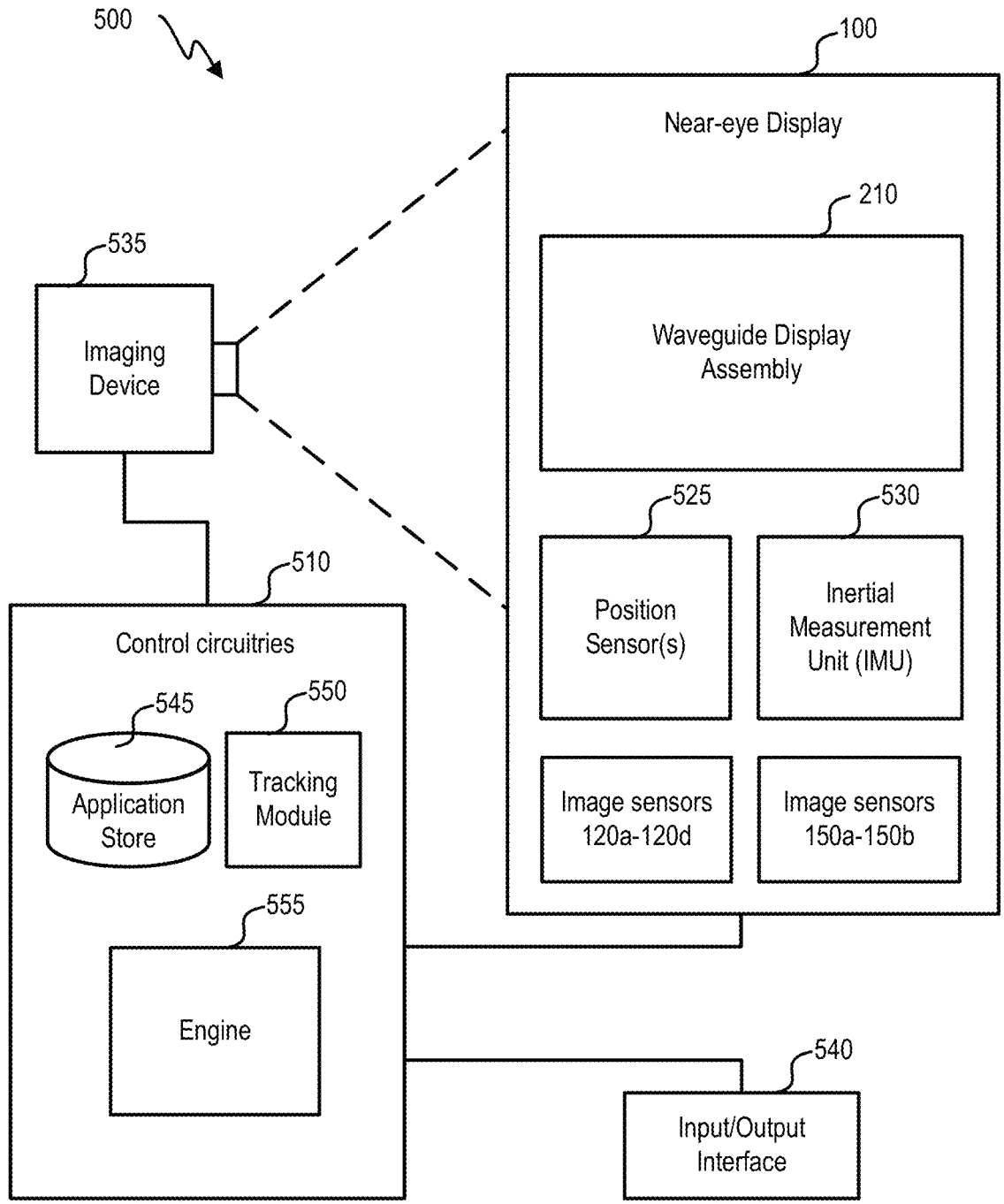
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
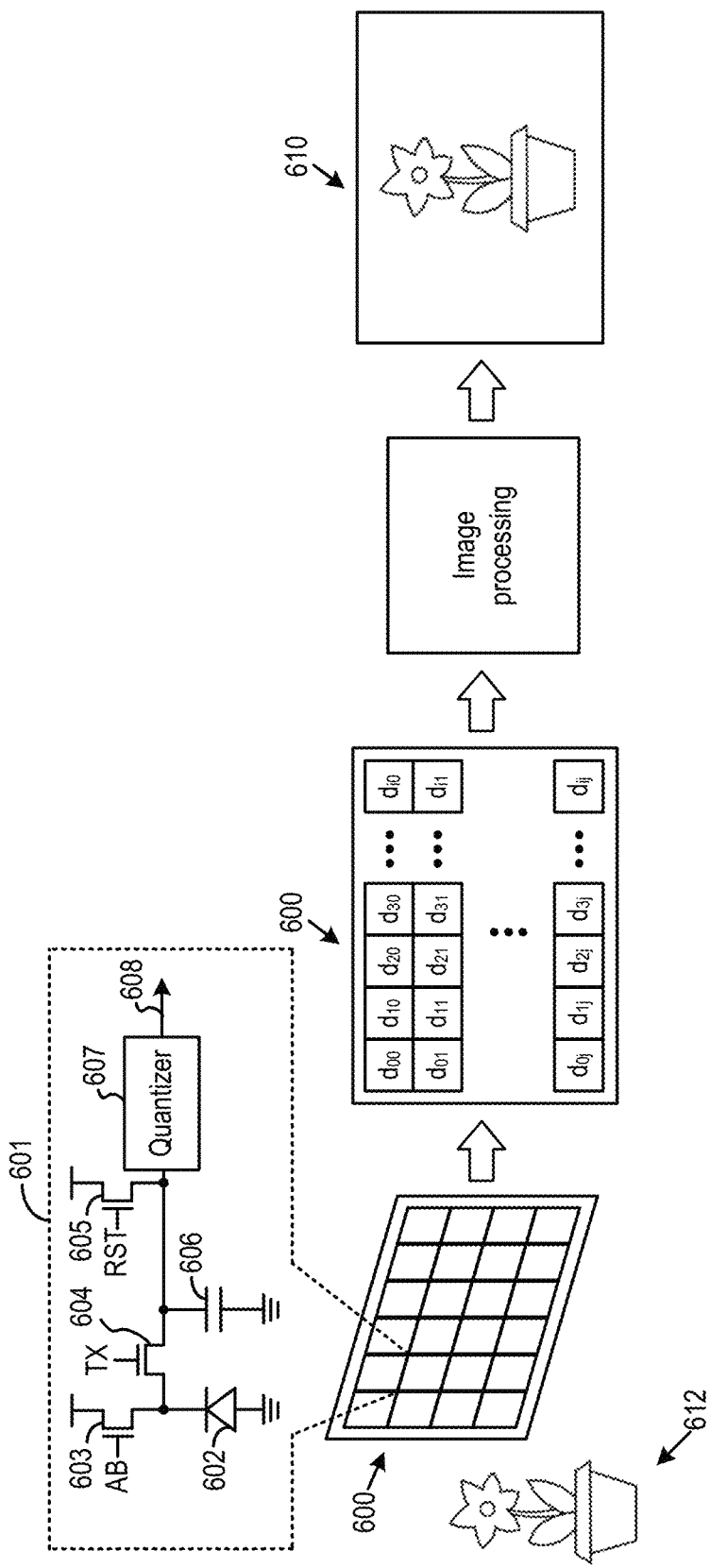
FIG. 6A, FIG. 6B, FIG. 6C, FIG. 6D, FIG. 6E, and FIG. 6F illustrate examples of an image sensor and its operations.
Figure 6B:
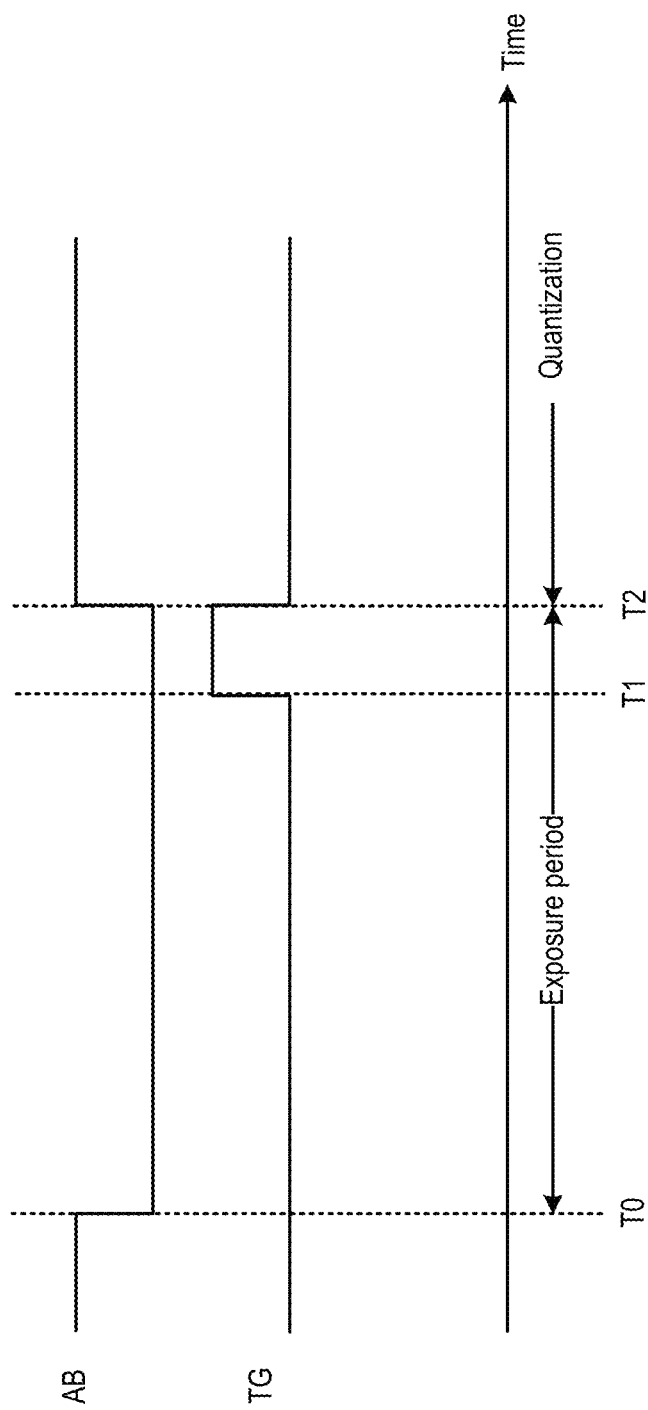

FIG. 6A, FIG. 6B, FIG. 6C, FIG. 6D, FIG. 6E, and FIG. 6F illustrate examples of an image sensor 600 and its operations. As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include one or more photodiodes 602, an electronic shutter switch 603, a transfer switch 604, a reset switch 605, a charge storage device 606, and a quantizer 607. Quantizer 607 can be a pixel-level ADC that is accessible only by pixel cell 601. Photodiode 602 may include, for example, a P-N diode, a P-I-N diode, or a pinned diode, whereas charge storage device 606 can be a floating diffusion node of transfer switch 604. Photodiode 602 can generate and accumulate charge upon receiving light within an exposure period, and the quantity of charge generated within the exposure period can be proportional to the intensity of the light. The exposure period can be defined based on the timing of AB signal controlling electronic shutter switch 603, which can steer the charge generated by photodiode 602 away when enabled, and based on the timing of the TX signal controlling transfer switch 604, which can transfer the charge generated by photodiode 602 to charge storage device 606 when enabled. For example, referring to FIG. 6B, the AB signal can be de-asserted at time T0 to allow photodiode 602 to generate charge and accumulate at least some of the charge as residual charge until photodiode 602 saturates. T0 can mark the start of the exposure period. The TX signal can set transfer switch 604 at a partially-on state to transfer additional charge (e.g., overflow charge) generated by photodiode 602 after saturation to charge storage device 606. At time T1, the TG signal can be asserted to transfer the residual charge to charge storage device 606, so that charge storage device 606 can store all of the charge generated by photodiode 602 since the beginning of the exposure period at time T0. At the time T2, the TX signal can be de-asserted to isolate charge storage device 606 from photodiode 602, whereas the AB signal can be asserted to steer charge generated by photodiode 602 away. The time T2 can mark the end of the exposure period. An analog voltage across charge storage device 606 at time T2 can represent the total quantity of charge stored in charge storage device 606, which can correspond to the total quantity of charge generated by photodiode 602 within the exposure period. Both TX and AB signals can be generated by a controller (not shown in FIG. 6A) which can be part of pixel cell 601. After the analog voltage is quantized, reset switch 605 can be enabled by an RST signal to remove the charge in charge storage device 606 to prepare for the next measurement.

Figure 6C:
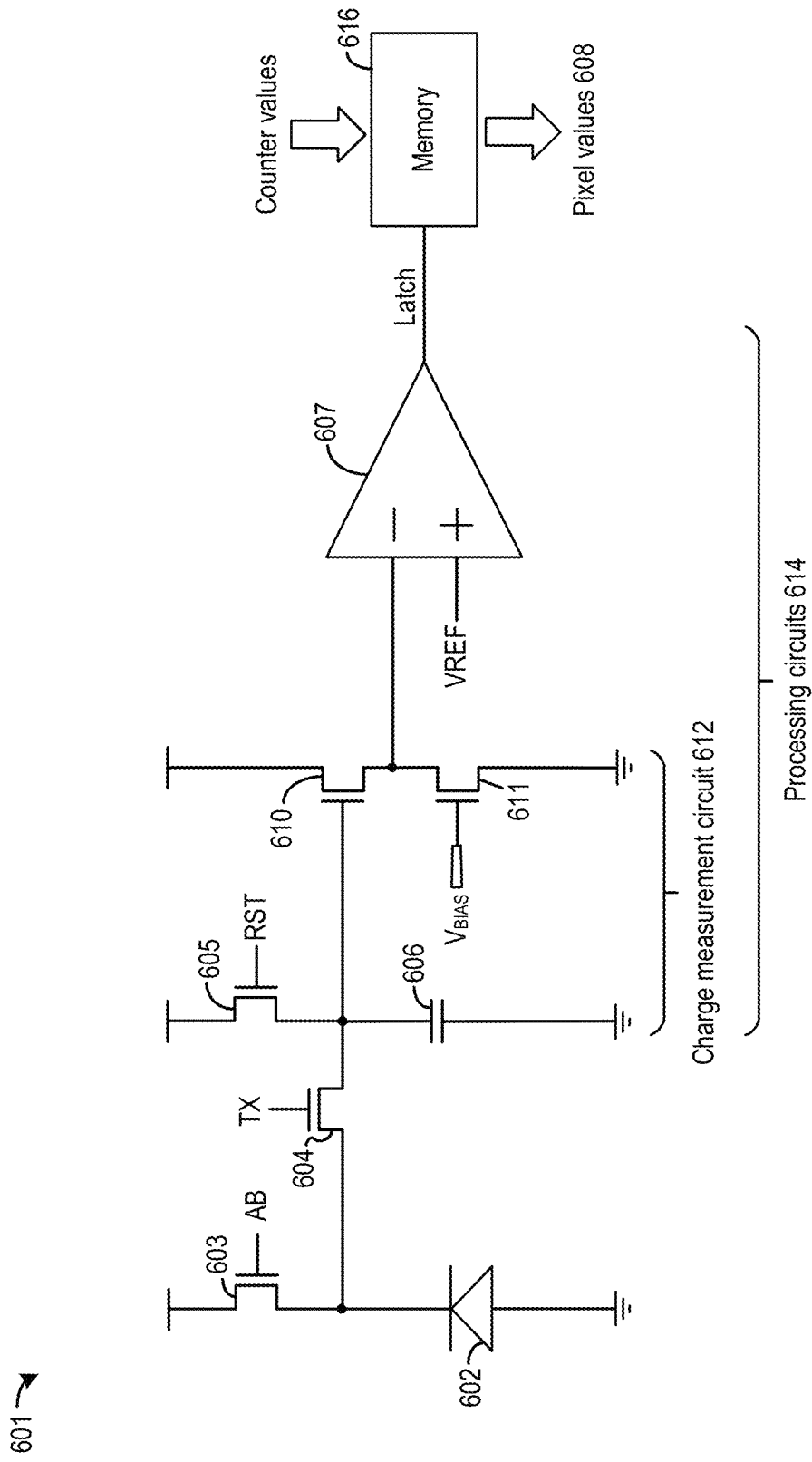

FIG. 6C illustrates additional components of pixel cell 601. As shown in FIG. 6C, pixel cell 601 can include a source follower 610 that can buffer the voltage at charge storage device 606, and output the voltage to quantizer 607. Charge storage device 606 and source follower 610 can form a charge measurement circuit 612. Source follower 610 can include a current source 611 controlled by a bias voltage $V_{BIAS}$, which sets the current that flows through source follower 610. Quantizer 607 can include a comparator. Charge measurement circuit 612 and quantizer 607 together can form a processing circuits 614. The comparator is further coupled with a memory 616 to store a quantization output as pixel value 608. Memory 616 can include a bank of memory devices, such as static random-access memory (SRAM) devices, with each memory device configured as a bit cell. The number of memory devices in the bank can be based on a resolution of the quantization output. For example, if the quantization output has a 10-bit resolution, memory 616 can include a bank of ten SRAM bit cells. In a case where pixel cell 601 includes multiple photodiodes to detect light of different wavelength channels, memory 616 may include multiple banks of SRAM bit cells.

Figure 6D:
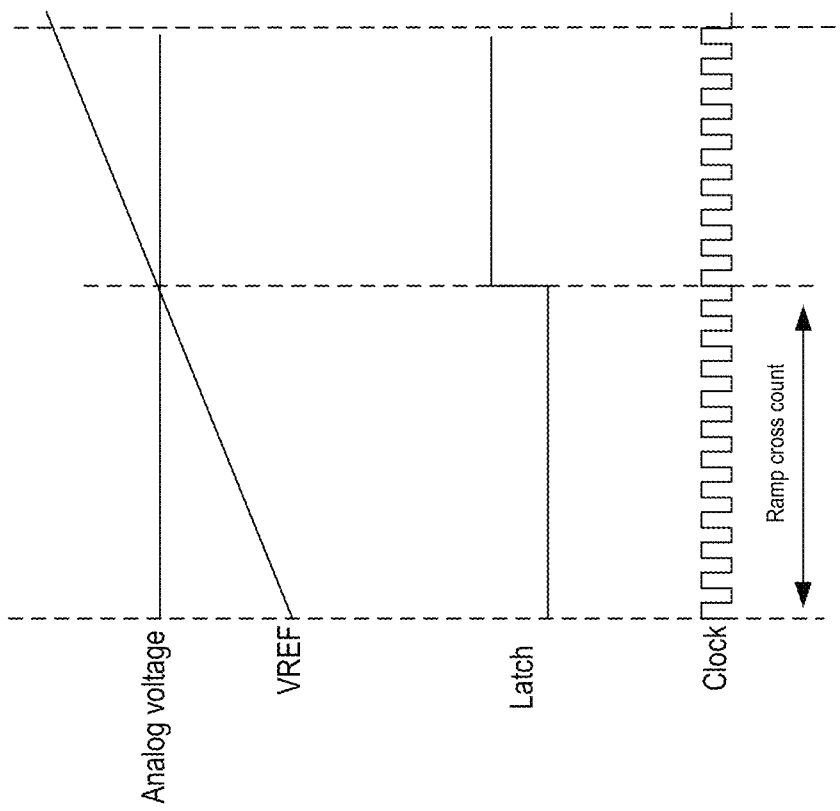

Quantizer 607 can be controlled by the controller to quantize the analog voltage after time T2 to generate a pixel value 608. FIG. 6D illustrates an example quantization operation performed by quantizer 607. As shown in FIG. 6D, quantizer 607 can compare the analog voltage output by source follower 610 with a ramping reference voltage (labelled "VREF" in FIG. 6C and FIG. 6D) to generate a comparison decision (labelled "Latch" in FIG. 6C and FIG. 6D). The time it takes for the decision to trip can be measured by a counter to represent a result of quantization of the analog voltage. In some examples, the time can be measured by a free-running counter that starts counting when the ramping reference voltage is at the start point. The free-running counter can periodically updates its count value based on a clock signal (labelled "clock" in FIG. 6D) and as the ramping reference voltage ramps up (or down). The comparator output trips when the ramping reference voltage meets the analog voltage. The tripping of the comparator output can cause a count value to be stored in memory 616. The count value can represent a quantization output of the analog voltage. Referring back to FIG. 6C, the count value stored in memory 616 can be read out as pixel value 608.

In FIG. 6A and FIG. 6C, pixel cell 601 is illustrated as including processing circuits 614 (including charge measurement circuit 612 and quantizer 607) and memory 616. In some examples, processing circuits 614 and memory 616 can be external to pixel cell 601. For example, a block of pixel cells can share and take turn in accessing processing circuits 614 and memory 616 to quantize the charge generated by the photodiode(s) of each pixel cell and to store the quantization result.

Figure 6E:
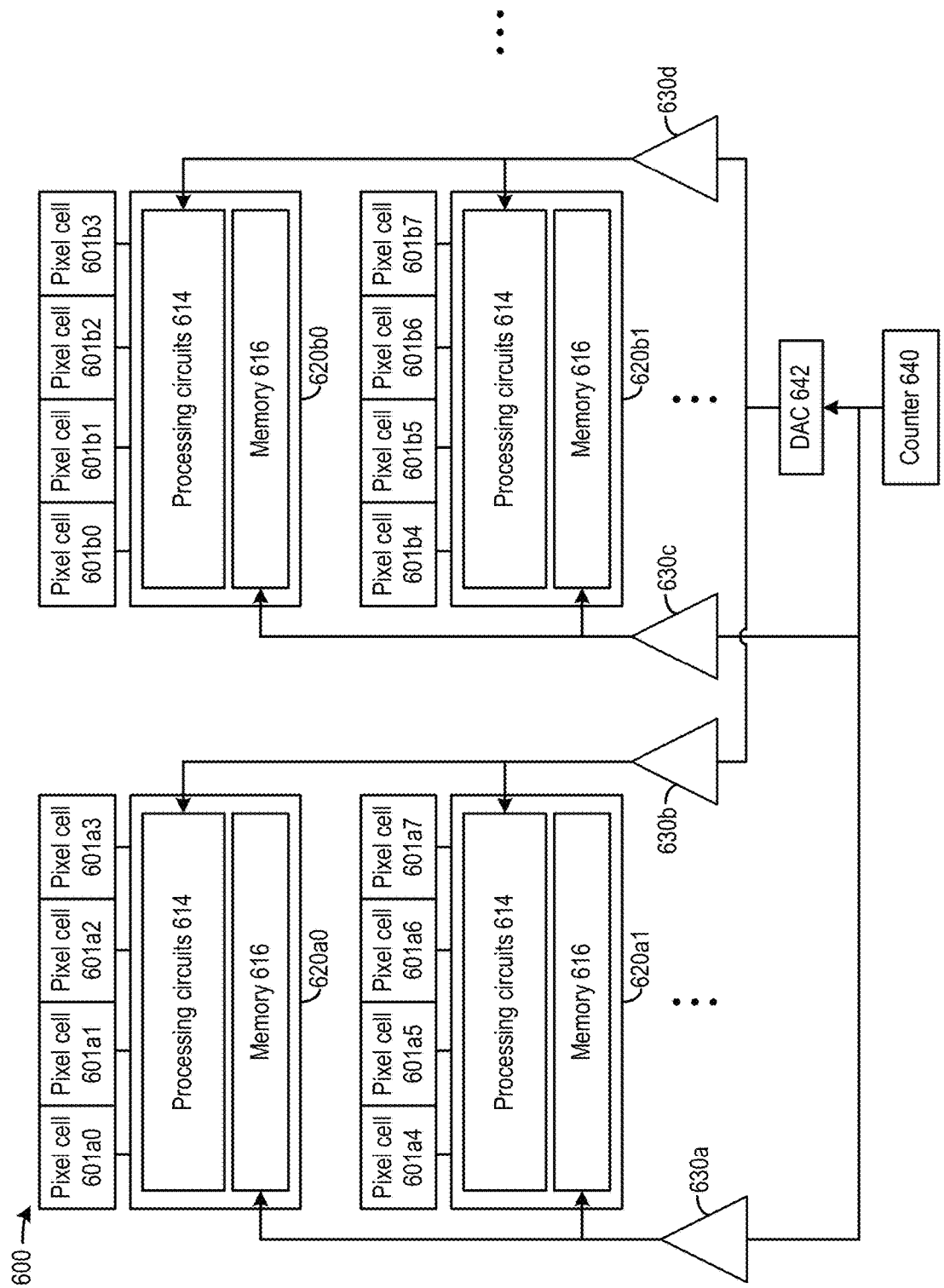
Figure 6F:
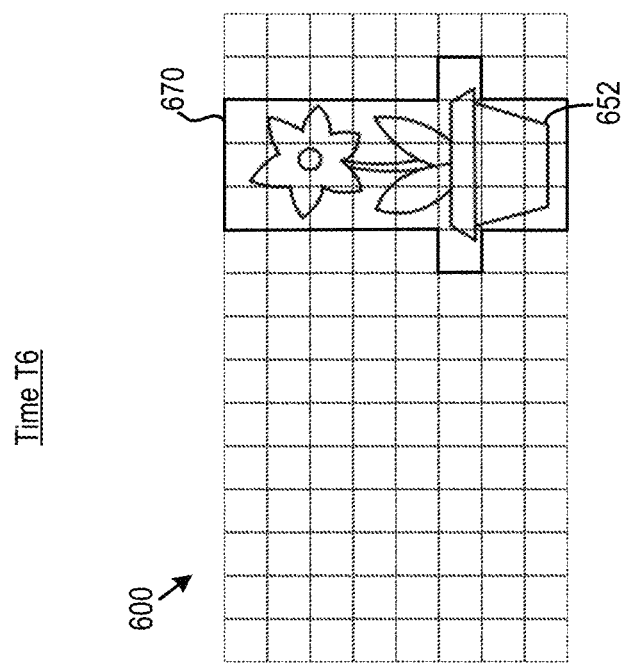
Figure 6F:
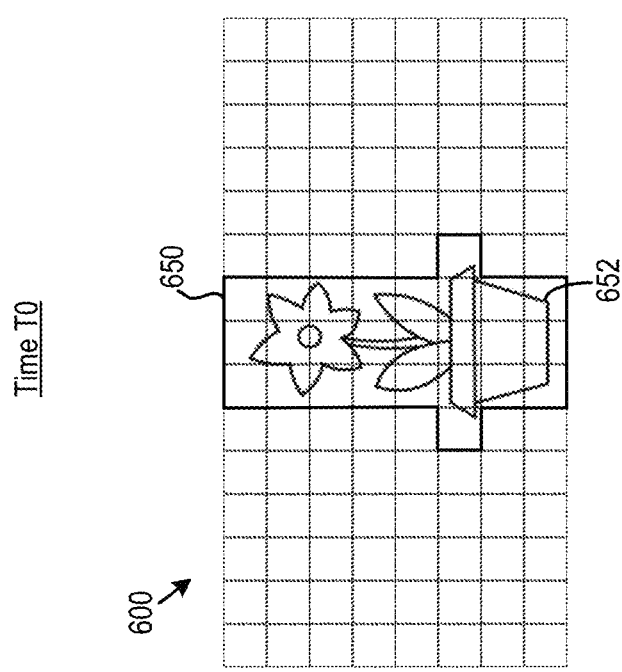

FIG. 6E illustrates additional components of image sensor 600. As shown in FIG. 6E, image sensor 600 includes pixel cells 601 arranged in rows and columns, such as pixel cells 601a0-a3, 601a4-a7, 601b0-b3, or 601b4-b7. Each pixel cell may include one or more photodiodes 602. Image sensor 600 further includes quantization circuits 620 (e.g., quantization circuit 620a0, a1, b0, b1) comprising processing circuits 614 (e.g., charge measurement circuit 612 and comparator/quantizer 607) and memory 616. In the example of FIG. 6E, a block of four pixel cells may share a block-level quantization circuit 620, which can include a block-level ADC (e.g., comparator/quantizer 607) and a block-level memory 616 via a multiplexor (not shown in FIG. 6E), where each pixel cell takes turn in accessing quantization circuit 620 to quantize the charge. For example, pixel cells 601a0-a3 share quantization circuit 620a0, pixel cells 601a4-a7 share quantization circuit 621a1, pixel cells 601b0-b3 share quantization circuit 620b0, whereas pixel cells 601b4-b7 share quantization circuit 620b1. In some examples, each pixel cell may include or has its dedicated quantization circuit.

In addition, image sensor 600 further includes other circuits, such as a counter 640 and a digital-to-analog converter (DAC) 642. Counter 640 can be configured as a digital ramp circuit to supply count values to memory 616. The count values can also be supplied to DAC 642 to generate an analog ramp, such as VREF of FIG. 6C and FIG. 6D, which can be supplied to quantizer 607 to perform the quantization operation. Image sensor 600 further includes a buffer network 630 including buffers 630a, 630b, 630c, 630d, etc. to distribute the digital ramp signals representing the counter values, and the analog ramp signal, to processing circuits 614 of different blocks of pixel cells, such that at any given time each processing circuit 614 receives the same analog ramp voltage and the same digital ramp counter value. This is to ensure that any difference in the digital values output by different pixel cells is due to differences in the intensity of light received by the pixel cells, not due to mismatches in the digital ramp signals/counter values and analog ramp signals received by the pixel cells.

The image data from image sensor 600 can be transmitted to host processor (not shown in FIG. 6A-FIG. 6E) to support different applications, such as identifying and tracking object 652 or performing depth sensing of object 652 with respect to image sensor 600. For all these applications, only a subset of pixel cells provide relevant information (e.g., pixel data of object 652), whereas the rest of pixel cells do not provide relevant information. For example, referring to FIG. 6F, at time T0 a group of pixel cells 650 of image sensor 600 receive light reflected by object 652, whereas time T6, object 652 may have shifted (e.g., due to a movement of object 652, a movement of image sensor 600, or both), and a group of pixel cells 670 of image sensor 600 receive light reflected by object 652. At both times T0 and T6, image sensor 600 can transmit only the pixel data from group of pixel cells 660 and 670, as a sparse image frame, to the host processor to reduce the volume of pixel data being transmitted. Such arrangements can allow transmission of higher resolution images at a higher frame rate. For example, a larger pixel cell array including more pixel cells can be used to image object 652 to improve image resolution, while the bandwidth and power required to provide the improved image resolution can be reduced when only a subset of the pixel cells, including the pixel cells that provide pixel data of object 652, transmit the pixel data to the host processor. Similarly, image sensor 600 can be operated to generate images at a higher frame rate, but the increases in bandwidth and power can be reduced when each image only includes pixel values output by the subset of the pixel cells. Similar techniques can be employed by image sensor 600 in the case of 3D sensing.

Figure 7A:
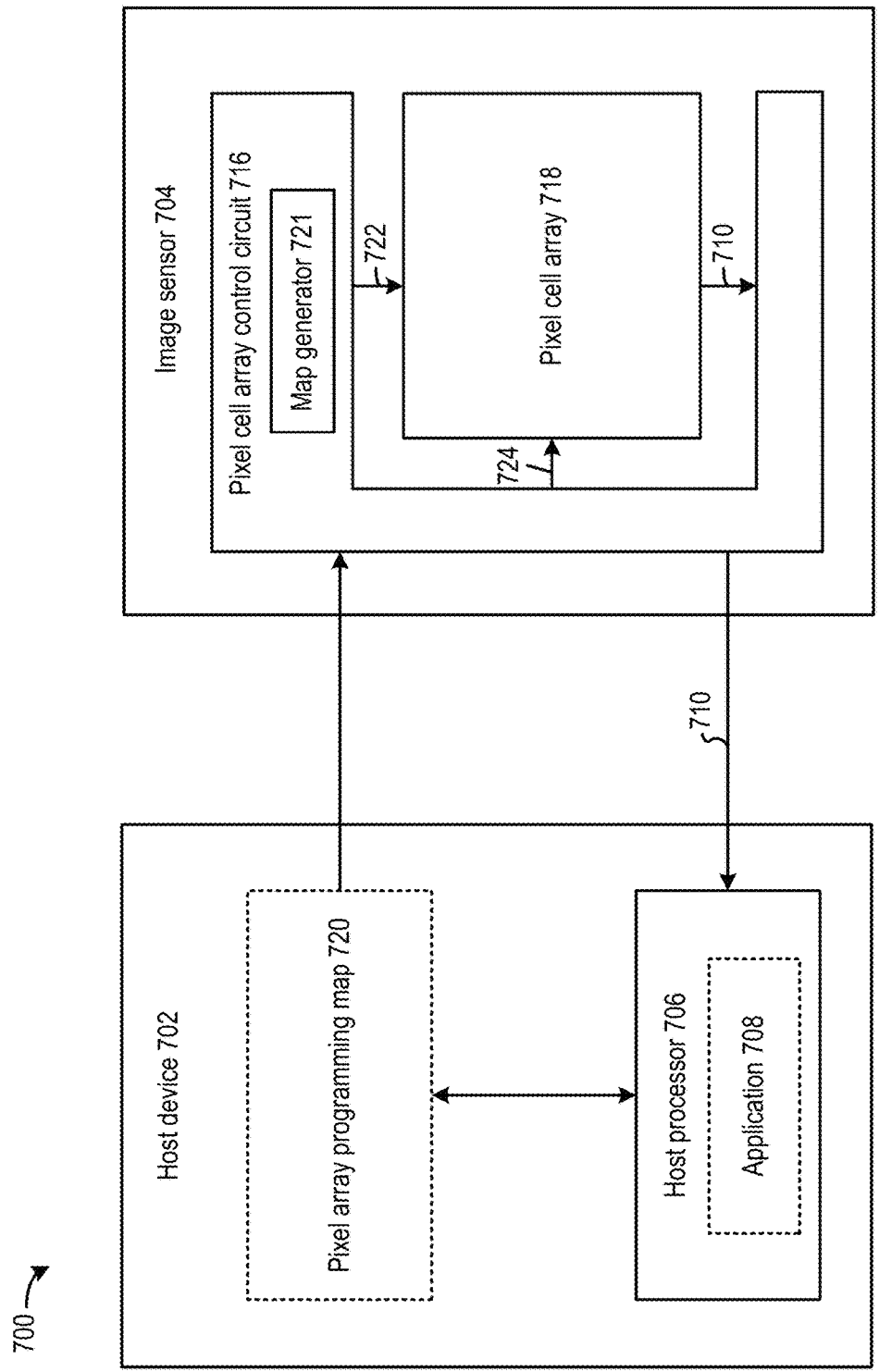
FIG. 7A, FIG. 7B, and FIG. 7C illustrate examples of an image processing system and its operations.
Figure 7B:
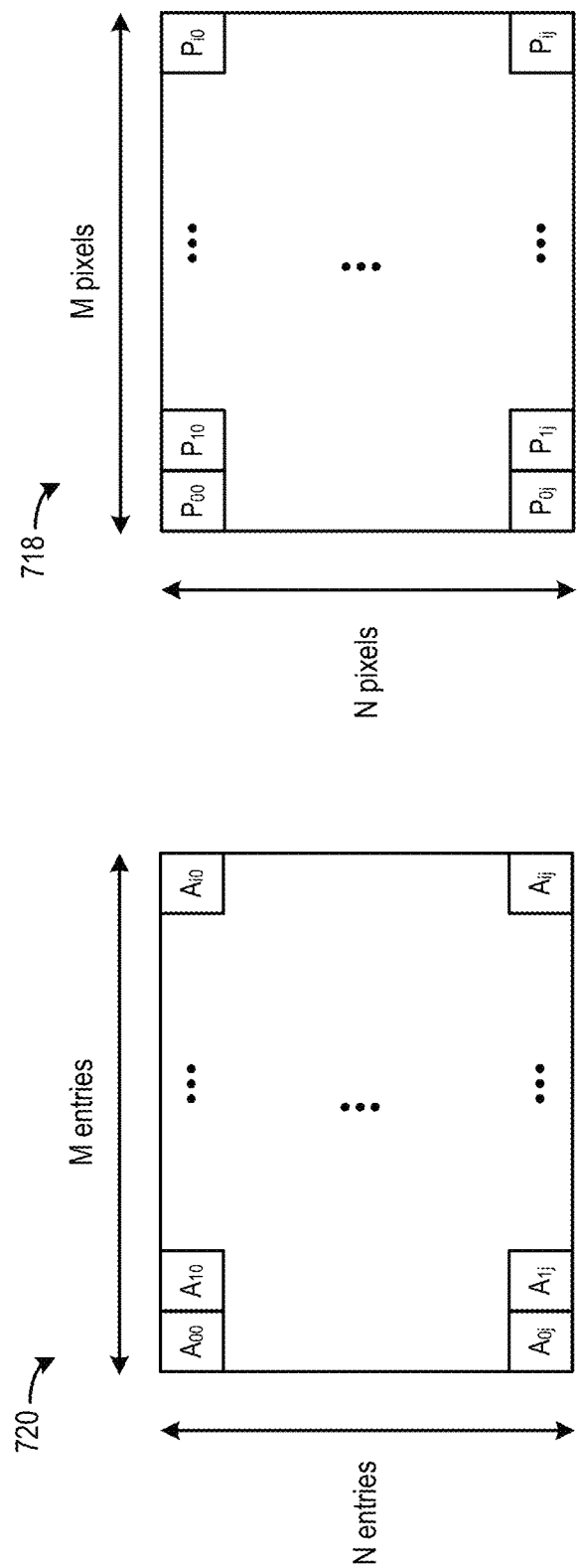
Figure 7C:
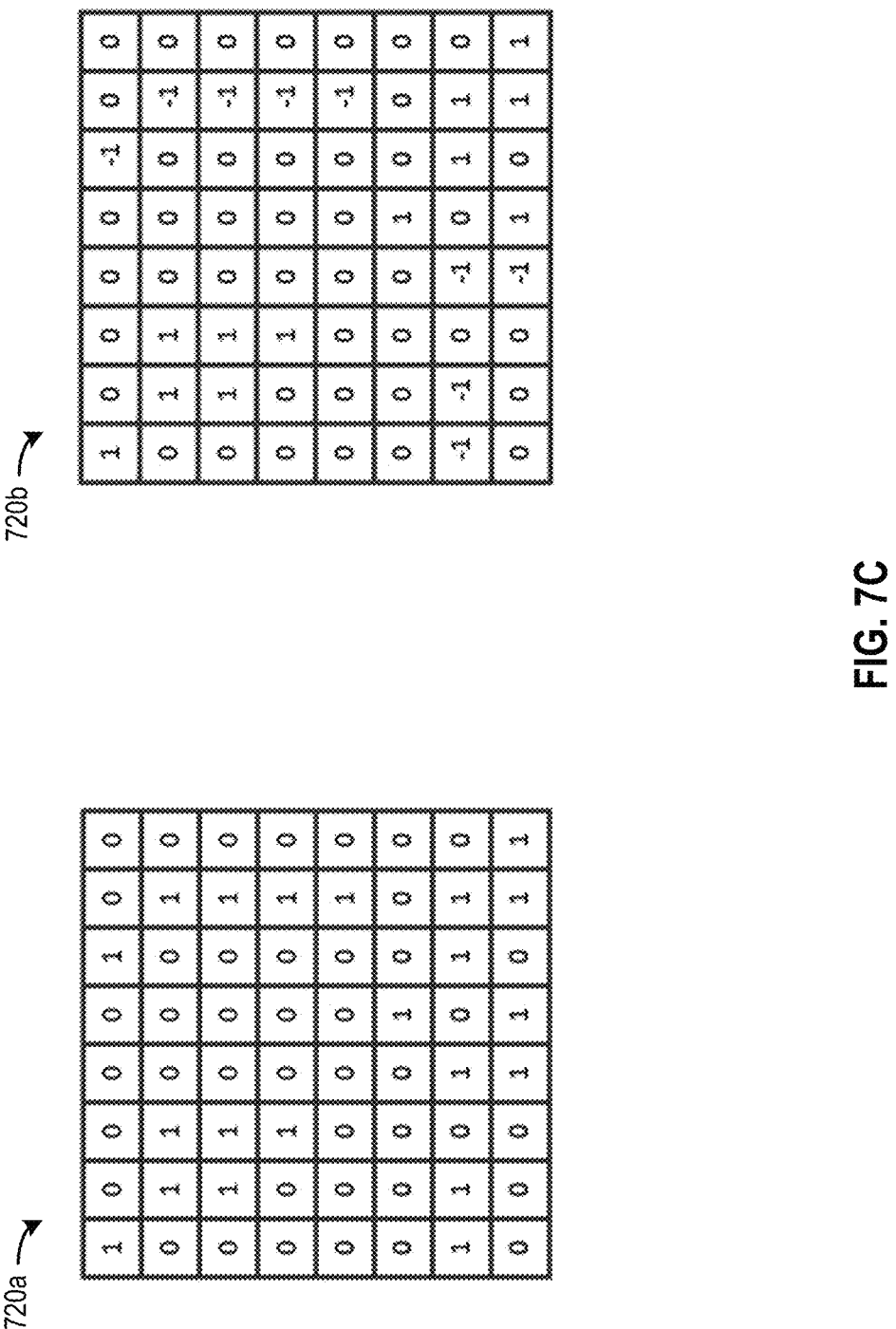

FIG. 7A, FIG. 7B, and FIG. 7C illustrate examples of an image processing system 700 and its operations. Image processing system 700 includes a host device 702 and an image sensor 704. Host device 702 can include a host processor 706 which operates an application 708 which can perform operations including, for example, fusion of 2D and 3D sensing, object recognition and tracking, or location tracking, on image 710 generated by image sensor 704. In some examples, image processing system 700 can be in a wearable device. In some examples, processing system 700 can be split into multiple separate devices. For example, host device 702 can be a personal computer (PC), a smart phone, a camera base station, or an integrated circuit such as a central processing unit (CPU), a field-programmable switch array (FPGA), or a micro controller unit (MCU). Host device 702 and image sensor 704 can be electrically connected via an interconnect (not shown in FIG. 7A), such as an interconnect compatible with the Mobile Industry Processor Interface (MIPI) standard.

Referring to FIG. 7A, image sensor 704 includes a pixel cell array control circuit 716 and a pixel cell array 718. Each pixel cell of pixel cell array 718 can include similar components as pixel cell 601 of FIG. 6A and FIG. 6C such as photodiode 602, electronic shutter switch 603, transfer switch 604, processing circuits 614, and memory 616, to perform a light measurement operation to generate pixel data. Blocks of pixel cells can also share quantization circuits 620 comprising processing circuits 614 and memory 616 as shown in FIG. 6E. Image sensor 704 further includes other circuits, such as counters 640 and DAC 642 shown in FIG. 6E. In some examples, pixel cell array 718 and pixel cell array control circuit 716 can form a stack structure to maximize the light receiving surface of image sensor 704, which allows pixel cell array 718 to include more pixel cells to improve resolution.

Each pixel cell in pixel cell array 718 may include a configuration memory, which can be part of or external to the pixel cell, to store programming data for configuring/programming the light measurement operation at the each pixel cell, or at blocks of pixel cells. The configuration memory of each pixel cell can be individually addressable, which allows the light measurement operation at each pixel cell, or a block of pixel cells, to be individually programmed by pixel cell array control circuit 716 based on a pixel array programming map 720. In some examples, pixel array programming map 720 can be generated by host processor 706 as a result of the object tracking operation on image 710. In some examples, pixel cell array control circuit 716 may also include a programming map generator 721 to generate pixel array programming map 720 based on image 710. Pixel cell array control circuit 716 can extract programming data from pixel array programming map 720 and transmit the programming data in the form of control signals 722 and 724 to pixel cell array 718. Programming data can be read out from the configuration memory to configure the light measurement operation.

As to be described in details below, the configuration of the light measurement operation at a pixel cell can include, for example, setting a power state of the different circuit components accessed/associated by the pixel cell, such as quantization circuit 620. The configuration may also include other aspects of the light measurement operation, such as setting an exposure period for the light measurement operation or setting the quantization resolution/bit depth.

Pixel array programming map 720 can include programming data targeted at each pixel cell of the array of pixel cells. FIG. 7B illustrates an example of pixel array programming map 720. As shown in FIG. 7B, pixel array programming map 720 can be include a 2D array of programming data, with each entry of programming data of the two-dimensional array targeted at a pixel cell of pixel cell array 718. For example, in a case where pixel cell array 718 has a width of M pixels (e.g., M columns of pixels) and a height of N pixels (e.g., N rows of pixels), pixel array programming map 720 also has a width of M entries (e.g., M columns of entries) and a height of N entries (e.g., N rows of entries). The programming data $A_{00}$ at entry (0, 0) of pixel array programming map 720 is targeted at pixel cell Poo at pixel location (0, 0) of pixel cell array 718, whereas the programming data $A_{01}$ at entry (0, 1) of pixel array programming map 720 is targeted at pixel cell Poi at pixel location (0, 1) of pixel cell array 718. In some examples, the programming data of each entry of pixel array programming map 720 can be transmitted sequentially following a pre-determined scanning pattern, such as traversing a row from left to right (e.g., $A_{00}, A_{01}, \ldots A_{0i}$), followed by the next row from left to right (e.g., $A_{10}, A_{11}, \ldots A_{1i}$), to form a stream of serial data. The programming data for each entry can be extracted and identified from the stream of serial data based on the scanning pattern and the order by which the entries are received. In some examples, pixel array programming map 720 can be sent only when certain programming data need to be updated between frames, and only the programming data that need to be updated are included in pixel array programming map 720. In some examples, each entry of pixel array programming map 720 can also target at a block of pixel cells (e.g., a 2×2 array of pixel cells, a 4×4 array of pixel cells).

Depending on the configuration operation, each entry of pixel array programming map 720 can either include binary programming data or non-binary programming data. FIG. 7C illustrates examples of pixel array programming maps 720a and 720b. As shown in FIG. 7C, pixel array programming map 720a includes binary programming data 0 and 1. In some examples, the binary programming data at each entry of pixel array programming map 720a can enable (e.g., with programming data set to 1) or disable (e.g., with programming data set to 0) the generation of pixel data at the pixel cell corresponding to the entry. The binary programming data can also set a power state of the quantization circuit 620 used by the pixel cell. For example, if the programming data indicates that the pixel cell is not to generate pixel data, the processing circuits and memory included in the quantization circuit used by the pixel cell can be powered down.

In addition, pixel array programming map 720b may include non-binary programming data such as −1, 0, 1, or other values. The non-binary programming data of pixel array programming map 720b, as shown in FIG. 7C, can be used to, for example, set an exposure period or set a quantization resolution. For example, a programming value of −1 can indicate the pixel cell and the quantization circuit being disabled during a frame period, a programming value of 0 can indicate the pixel cell and the quantization circuit operating in a low resolution mode, whereas a programming value 1 can indicate the pixel cell and the quantization circuit operating in the full resolution mode. The pixel cell can then set the power state of the processing circuits and the memory of the quantization circuit accordingly.

In some examples, pixel array programming map 720a/b can be generated by the application (e.g., application 708) operating at host device 702, or map generator 721 of pixel cell array control circuit 716, that consumes the pixel data from pixel cell array 718. For example, application 708/map generator 721 may identify, from an image, pixels that contain relevant information, and determine a region of interest (ROI) comprising the pixels. Pixel cells that generate pixel data corresponding to the ROI can then be identified. As an illustrative example, referring back to the example of FIG. 6F, application 708/map generator 721 may identify an ROI including the group of pixel cells 650 as providing relevant information (e.g., pixel data of object 652) in an image at time T0. Application 708/map generator 721 can then predict the change in the ROI between times T0 and T6 based on, for example, a direction and a speed of movement of object 652 with respect to image sensor 600. Application 708/map generator 721 can then predict the new image location of the ROI at time T6, which includes the group of pixel cells 670, based on the image location of the group of pixel cells 650 at time T0 and the predicted change. Based on the image location of the group of pixel cells 670 at time T6, application 708/map generator 721 can generate pixel array programming map 720a by setting the programming data of the entries corresponding to the group of pixel cells 670 to one, while setting the programming data of the rest of the entries to zero, so that only the group of pixel cells 670 transmits pixel data to host device 702. In some examples, the ROIs can also be used to set a non-uniform spatial sampling rate such that each pixel cell corresponding to the ROIs transmits pixel data, whereas outside the ROI, a sparsely distributed set of pixel cells is selected to transmit pixel data. The selection of which pixel cells to transmit pixel data can be encoded in pixel array programming map 720a.

In some examples, application 708/map generator 721 may maintain a model of an environment in which an object being tracked is located based on prior images, and predict the pixel cells that are likely to provide the pixel data of the object in a current image based on an environment model. In some examples, image sensor 704, or other processing circuits that is part of the same chip as image sensor 704, may also compute fixed primitives (e.g. temporal or spatial contrast) and estimate where relevant information is occurring based on those primitives, and generate pixel array programming map 720a based on the estimation.

Figure 8A:
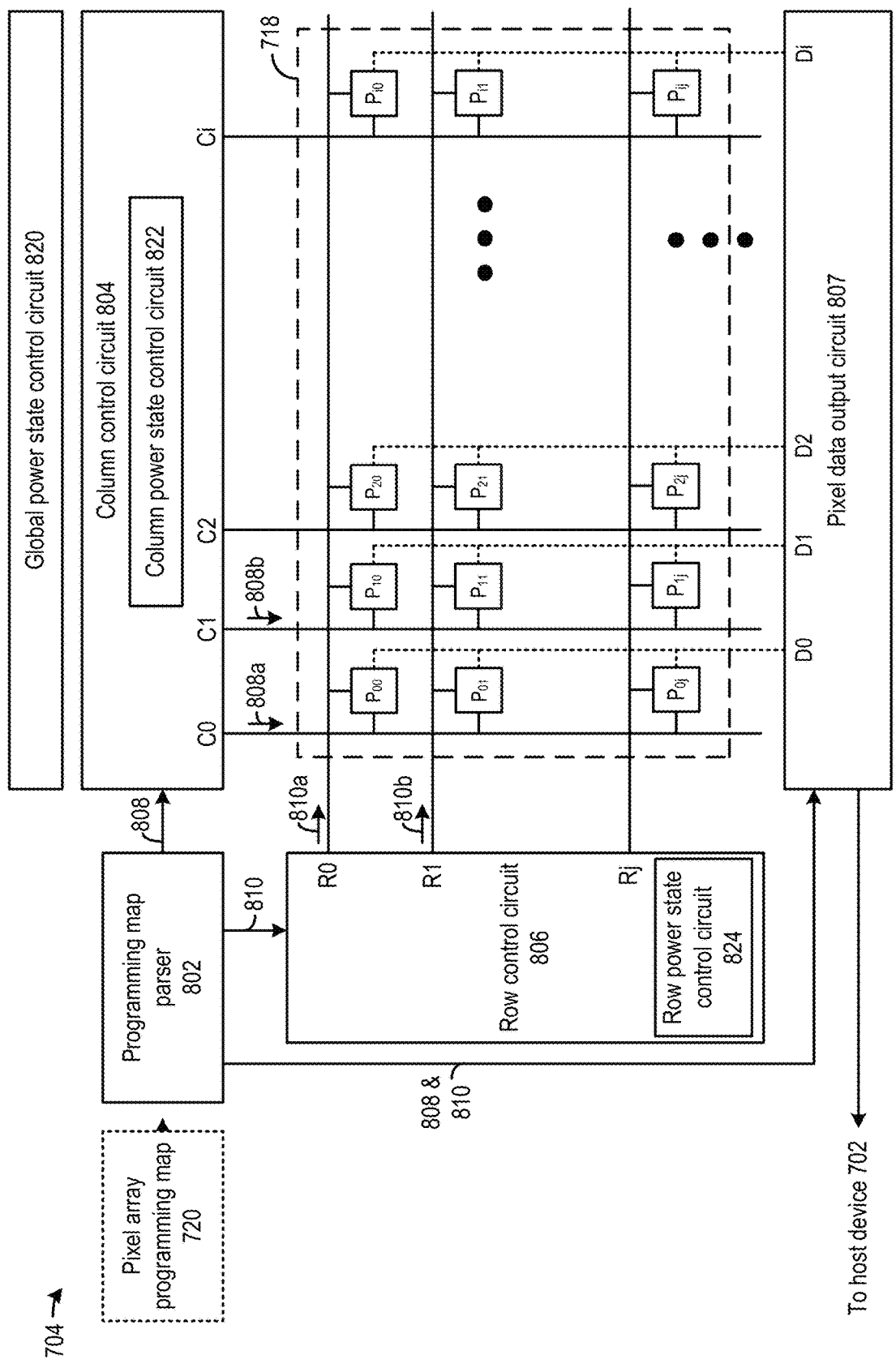
FIG. 8A, FIG. 8B, and FIG. 8C illustrate example components of the image processing system of FIGS. 7A-7C.
Figure 8B:
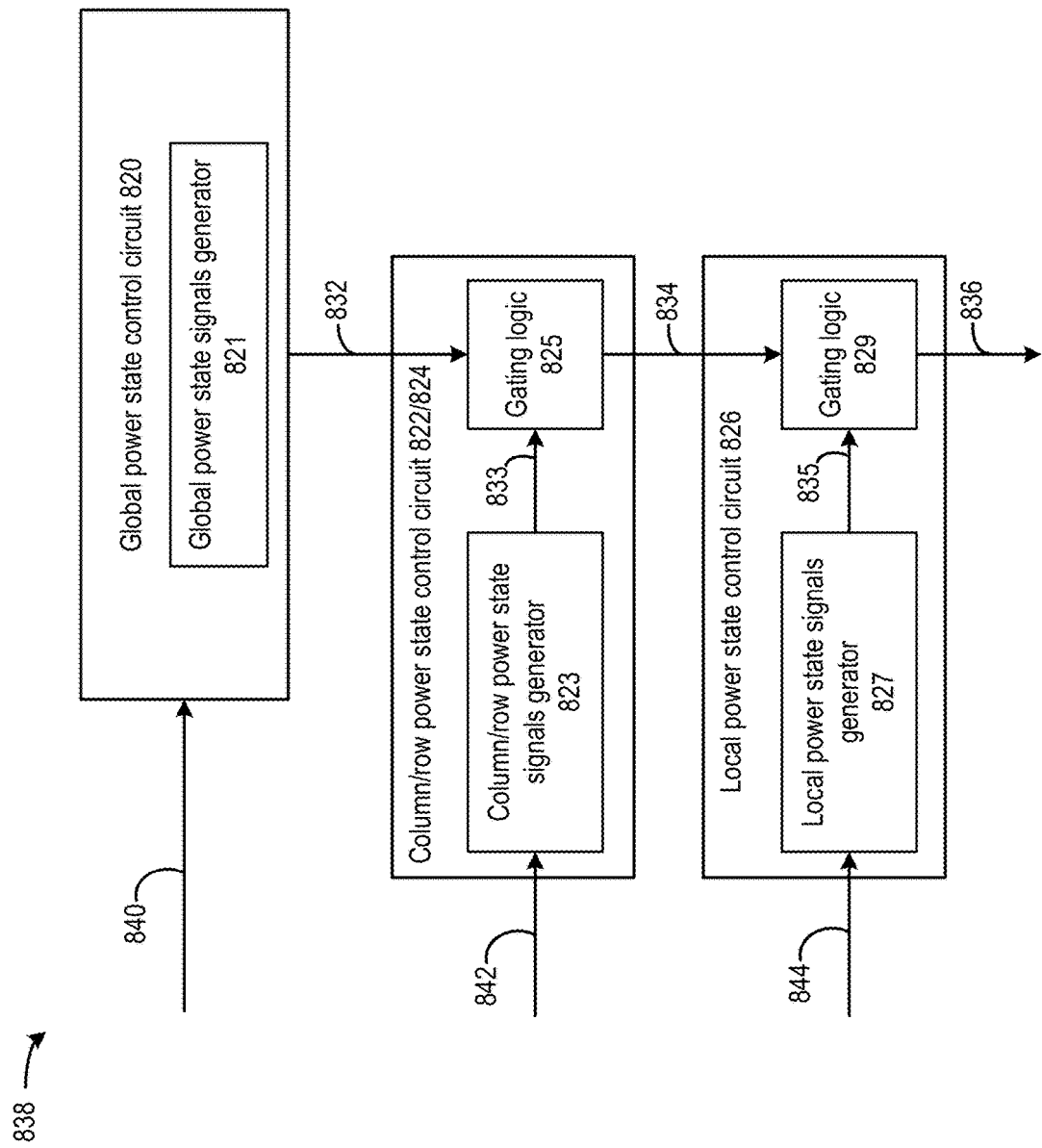
Figure 8C:
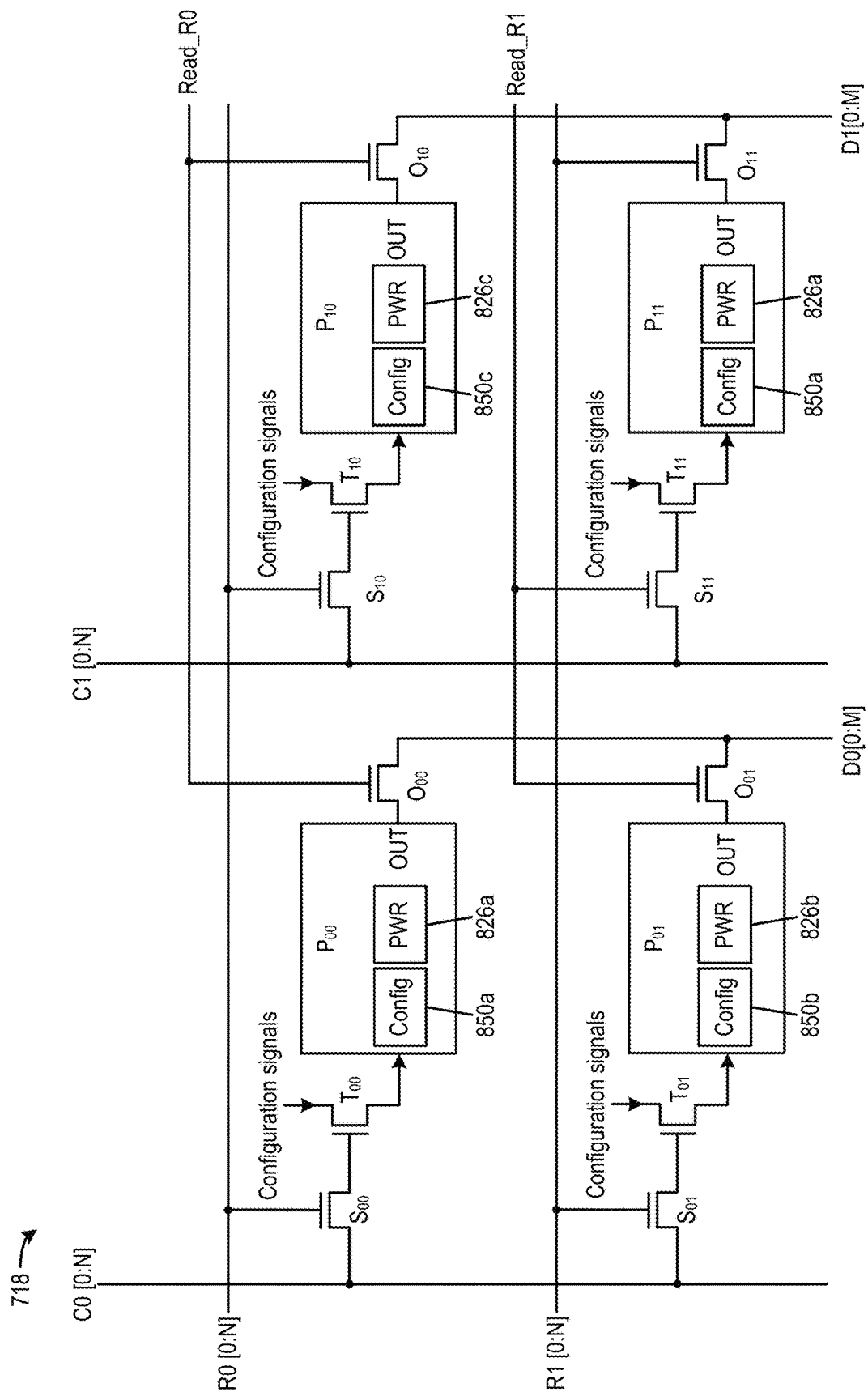

FIG. 8A, FIG. 8B, and FIG. 8C illustrate example components of pixel cell array control circuit 716 and pixel cell array 718 of image sensor 704. As shown in FIG. 8A, pixel cell array control circuit 716 can include a programming map parser 802, a column control circuit 804, a row control circuit 806, and a pixel data output circuit 807. Programming map parser 802 can parse pixel array programming map 720, which can be in a serial data stream, to identify the programming data for each pixel cell (or block of pixel cells). The identification of the programming data can be based on, for example, a pre-determined scanning pattern by which the two-dimensional pixel array programming map is converted into the serial format, as well as the order by which the programming data is received by programming map parser 802 from the serial data stream. Programming map parser 802 can create a mapping among the row addresses of the pixel cells, the column addresses of the pixel cells, and one or more configuration signals based on the programming data targeted at the pixel cells. Based on the mapping, programming map parser 802 can transmit control signals 808 including the column addresses and the configuration signals to column control circuit 804, as well as control signals 810 including the row addresses mapped to the column addresses and the configuration signals to row control circuit 806. In some examples, the configuration signals can also be split between control signals 808 and control signals 810, or sent as part of control signals 810 to row control circuit 806.

Column control circuit 804 and row control circuit 806 are configured to forward the configuration signals received from programming map parser 802 to the configuration memory of each pixel cell of pixel cell array 718. In FIG. 8A, each box labelled $P_{ij}$ (e.g., $P_{00}$, $P_{01}$, $P_{10}$, $P_{11}$) can represent a pixel cell or a block of pixel cells (e.g., a 2×2 array of pixel cells, a 4×4 array of pixel cells) and can include or can be associated with a quantization circuit 620 of FIG. 6E comprising processing circuits 614 and memory 616. As shown in FIG. 8A, column control circuit 804 drives a plurality of sets of column buses C0, C1, . . . Ci. Each set of column buses includes one or more buses and can be used to transmit control signals 722 of FIG. 7A, which can include a column selection signal and/or other configuration signals, to a column of pixel cells. For example, column bus(es) C0 can transmit a column selection signal 808a to select a column of pixel cells (or a column of blocks of pixel cells) $p_{00}, p_{01}, \ldots p_{0j}$, column bus(es) C1 can transmit a column selection signal 808b to select a column of pixel cells (or blocks of pixel cells) $p_{10}, p_{11}, \ldots p_{1j}$, etc.

Further, row control circuit 806 drives a plurality of sets of row buses labelled R0, R1, . . . Rj. Each set of row buses also includes one or more buses and can be used to transmit control signals 724 of FIG. 7A, which can include a row selection signal and/or other configuration signals, to a row of pixel cells, or a row of blocks of pixel cells. For example, row bus(es) R0 can transmit a row selection signal 810a to select a row of pixel cells (or blocks of pixel cells) $p_{00}, p_{10}, \ldots p_{i0}$, row bus(es) R1 can transmit a row selection signal 810b to select a row of pixel cells (or blocks of pixel cells) $p_{01}, p_{11}, \ldots p_{1i}$, etc. Any pixel cell (or block of pixel cells) within pixel cell array 718 can be selected based on a combination of the row selection signal and the column signal to receive the configuration signals. The row selection signals, column selection signals, and the configuration signals (if any) are synchronized based on control signals 808 and 810 from programming map parser 802, as described above. Each column of pixel cells can share a set of output buses to transmit pixel data to pixel data output module 807. For example, column of pixel cells (or blocks of pixel cells) $p_{00}, p_{01}, \ldots p_{0j}$ can share output buses $D_0$, column of pixel cells (or blocks of pixel cells) $p_{10}, p_{11}, \ldots p_{1j}$ can share output buses $D_1$, etc.

Pixel data output module 807 can receive the pixel data from the buses, convert the pixel data into one or more serial data streams (e.g., using a shift register), and transmit the data streams to host device 702 under a pre-determined protocol such as MIPI. The data stream can come from a quantization circuit 620 (e.g., processing circuits 614 and memory 616) associated with each pixel cell (or block of pixel cells) as part of a sparse image frame. In addition, pixel data output module 807 can also receive control signals 808 and 810 from programming map parser 802 to determine, for example, which pixel cell does not output pixel data or the bit width of pixel data output by each pixel cell, and then adjust the generation of serial data streams accordingly. For example, pixel data output module 807 can control the shift register to skip a number of bits in generating the serial data streams to account for, for example, variable bit widths of output pixel data among the pixel cells or the disabling of pixel data output at certain pixel cells.

In addition, pixel cell array control circuit 716 further includes a global power state control circuit 820, a column power state control circuit 822, a row power state control circuit 824, and a local power state control circuit 826 at each pixel cell or each block of pixel cells (not shown in FIG. 8A) forming hierarchical power state control circuits. Global power state control circuit 820 can be of the highest level in the hierarchy, followed by row/column power state control circuit 822/824, with local power state control circuit 826 at the lowest level in the hierarchy.

The hierarchical power state control circuits can provide different granularities in controlling the power state of image sensor 704. For example, global power state control circuit 820 can control a global power state of all circuits of image sensor 704, including processing circuits 614 and memory 616 of all pixel cells, DAC 642 and counter 640 of FIG. 6E, etc. Row power state control circuit 822 can control the power state of processing circuits 614 and memory 616 of each row of pixel cells (or blocks of pixel cells) separately, whereas column power state control circuit 824 can control the power state of processing circuits 614 and memory 616 of each column of pixel cells (or blocks of pixel cells) separately. Some examples may include row power state control circuit 822 but not column power state control circuit 824, or vice versa. In addition, local power state control circuit 826 can be part of a pixel cell or a block of pixel cells, and can control the power state of processing circuits 614 and memory 616 of the pixel cell or the block of pixel cells.

FIG. 8B illustrates examples of internal components of hierarchical power state control circuits and their operations. Specifically, global power state control circuit 820 can output a global power state signal 832, which can be in the form of a bias voltage, a bias current, a supply voltage, or programming data, that sets a global power state of image sensor 704. Moreover, column power state control circuit 822 (or row power state control circuit 824) can output a column/row power state signal 834 that sets a power state of a column/row of pixel cells (or blocks of pixel cells) of image sensor 704. Column/row power state signal 834 can be transmitted as row signals 810 and column signals 808 to the pixel cells. Further, local power state control circuit 826 can output a local power state signal 836 that sets a power state of the pixel cell (or a block of pixel cells), including the associated processing circuits 614 and memory 616. Local power state signal 836 can be output to processing circuits 614 and memory 616 of the pixel cells to control their power state.

In hierarchical power state control circuits 838, an upper-level power state signal can set an upper bound for a lower-level power state signal. For example, global power state signal 832 can be an upper level power state signal for column/row power state signal 834 and set an upper bound for column/row power state signal 834. Moreover, column/row power state signal 834 can be an upper level power state signal for local power state signal 836 and set an upper bound for local power state signal 836. For example, if global power state signal 832 indicates a low power state, column/row power state signal 834 and local power state signal 836 may also indicate a low power state.

Each of global power state control circuit 820, column/row power state control circuit 822/824, and local power state control circuit 826 can include a power state signal generator, whereas column/row power state control circuit 822/824, and local power state control circuit 826 can include a gating logic to enforce the upper bound imposed by an upper-level power state signal. Specifically, global power state control circuit 820 can include a global power state signals generator 821 to generate global power state signal 832. Global power state signals generator 821 can generate global power state signal 832 based on, for example, an external configuration signal 840 (e.g., from host device 702) or a pre-determined temporal sequences of global power states.

In addition, column/row power state control circuit 822/824 can include a column/row power state signals generator 823 and a gating logic 825. Column/row power state signals generator 823 can generate an intermediate an column/row power state signal 833 based on, for example, an external configuration signal 842 (e.g., from host device 702) or a predetermined temporal sequences of row/column power states. Gating logic 825 can select one of global power state signal 832 or intermediate column/row power state signal 833 representing the lower power state as column/row power state signal 834.

Further, local power state control circuit 826 can include a local power state signals generator 827 and a gating logic 829. Low power state signals generator 827 an intermediate local power state signal 835 based on, for example, an external configuration signal 844, which can be from a pixel array programming map, a pre-determined temporal sequences of row/column power states, etc. Gating logic 829 can select one of intermediate local power state signal 835 or column/row power state signal 834 representing the lower power state as local power state signal 836.

FIG. 8C illustrates additional details of pixel cell array 718, including local power state control circuit 826 (e.g., 826a, 826b, 826c, and 826d, labelled as "PWR" in FIG. 8C) and configuration memory 850 (e.g., 850a, 850b, 850c, and 850d, labelled as "Config" in FIG. 8C) of each pixel cell (or each block of pixel cells). Configuration memory 850 can store first programming data to control a light measurement operation (e.g., exposure period duration, quantization resolution) of a pixel cell (or a block of pixel cells). In addition, configuration memory 850 can also store second programming data that can be used by local power state control circuit 826 to set the power states of processing circuits 614 and memory 616. Configuration memory 850 can be implemented as a static random-access memory (SRAM). Although FIG. 8C shows that local power state control circuit 826 and configuration memory 850 are internal to each pixel cell, it is understood that configuration memory 850 can also be external to each pixel cell, such as when local power state control circuit 826 and configuration memory 850 are for a block of pixel cells.

As shown in FIG. 8C, the configuration memory 850 of each pixel cell is coupled with column buses C and row buses R via transistors S, such as $S_{00}$, $S_{10}$, $S_{10}$, $S_{11}$, etc. In some examples, each set of column buses (e.g., C0, C1) and row buses (e.g., R0, R1) can include multiple bits. For example, in FIG. 8C, each set of column buses and row buses can carry N+1 bits. It is understood that in some examples each set of column buses and row buses can also carry a single data bit. Each pixel cell is also electrically connected with transistors T, such as $T_{00}$, $T_{10}$, $T_{10}$, or $T_{11}$, to control the transmission of configuration signals to the pixel cell (or block of pixel cells). Transistor(s) S of each pixel cell can be driven by the row and column select signals to enable (or disable) the corresponding transistors T to transmit configuration signals to the pixel cell. In some examples, column control circuit 804 and row control circuit 806 can be programmed by a single write instruction (e.g., from host device 702) to write to configuration memory 850 of multiple pixel cells simultaneously. Column control circuit 804 and row control circuit 806 can then control the row buses and column buses to write to the configuration memory of the pixel cells.

In some examples, local power state control circuit 826 can also receive configuration signal directly from transistors T without storing the configuration signals in configuration memory 850. For example, as described above, local power state control circuit 826 can receive row/column power state signal 834, which can be an analog signal such as a voltage bias signal or a supply voltage, to control the power state of the pixel cell and the processing circuits and/or memory used by the pixel cell.

In addition, each pixel cell also includes transistors O, such as $O_{00}$, $O_{10}$, $O_{10}$, or $O_{11}$, to control the sharing of the output bus D among a column of pixel cells. The transistors O of each row can be controlled by a read signal (e.g., read_R0, read_R1) to enable a row-by-row read out of the pixel data, such that one row of pixel cells output pixel data through output buses D0, D1, ... Di, followed by the next row of pixel cells.

In some examples, the circuit components of pixel cell array 718, including processing circuits 614 and memory 616, counter 640, DAC 642, buffer network including buffers 630, etc., can be organized into a hierarchical power domain managed by hierarchical power state control circuits 838. The hierarchical power domain may include a hierarchy of multiple power domains and power sub-domains. The hierarchical power state control circuits can individually set a power state of each power domain, and each power sub-domain under each power domain. Such arrangements allow fine grain control of the power consumption by image sensor 704 and support various spatial and temporal power state control operations to further improve the power efficiency of image sensor 704.

While a sparse-image sensing operation can reduce the power and bandwidth requirement, having pixel-level ADCs (e.g., as shown in FIG. 6C) or block-level ADCs (e.g., as shown in FIG. 6E) to perform the quantization operations for the sparse-image sensing operation can still lead to inefficient use of power. Specifically, while some of the pixel-level or block-level ADCs are disabled, high speed control signals, such as clocks, analog ramp signals, or digital ramp signals, may still be transmitted to each pixel-level or block-level ADCs via buffer network 630, which can consume a substantial amount of power and increase the average power consumption for generation of each pixel. The inefficiency can be further exacerbated when the sparsity of the image frame increases (e.g., containing fewer pixels), but the high speed control signals are still transmitted to each pixel cell, such that the power consumption in transmitting the high speed control signals remains the same and the average power consumption for generation of each pixel increases due to fewer pixels being generated.

Figure 9A:
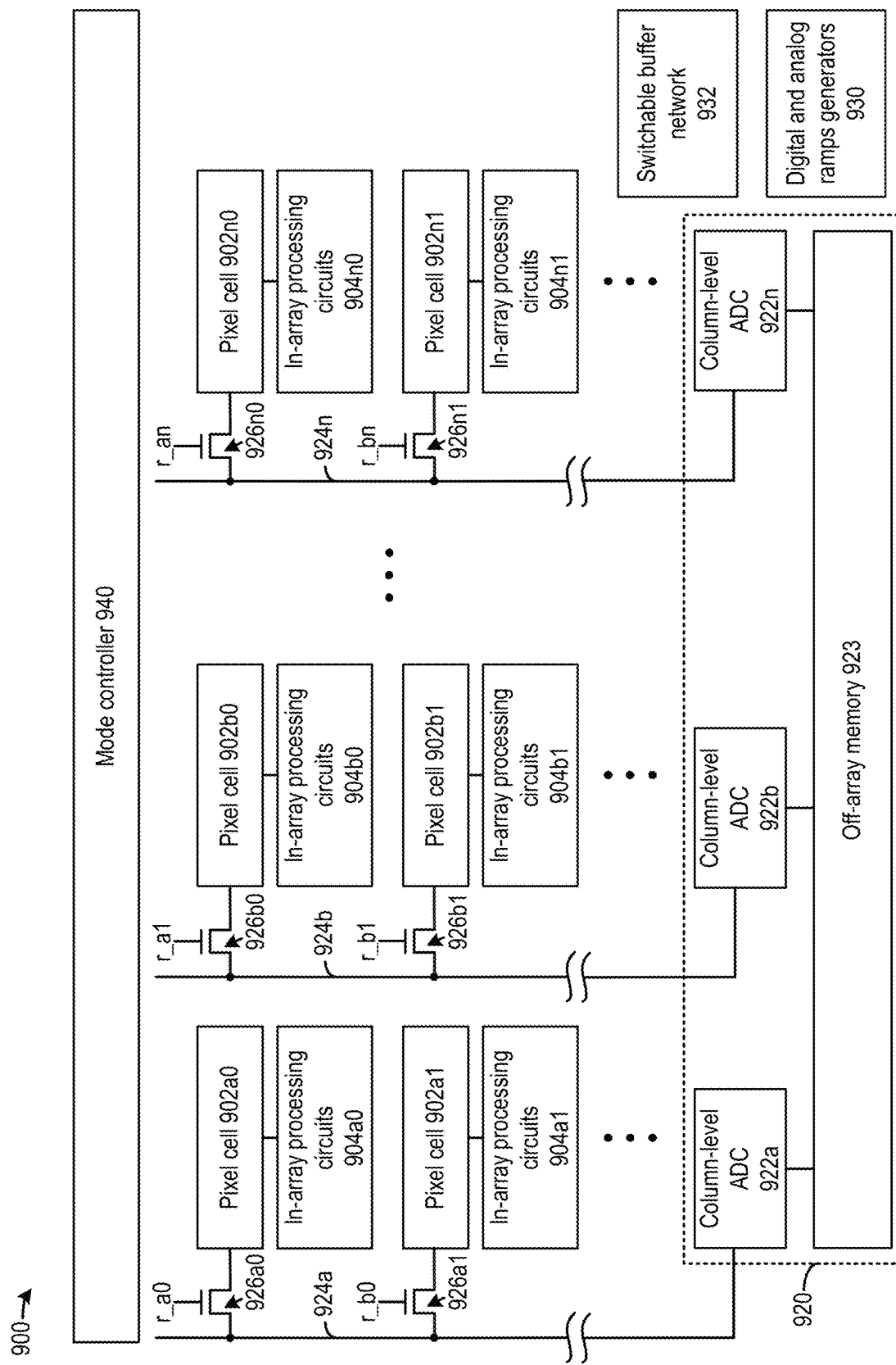
FIG. 9A and FIG. 9B illustrate examples of a multi-mode image sensor that can be part of FIGS. 7A-7C.
Figure 9B:
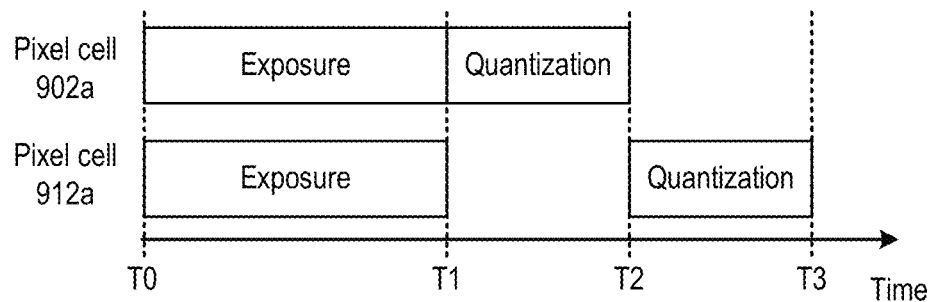
Figure 9B:
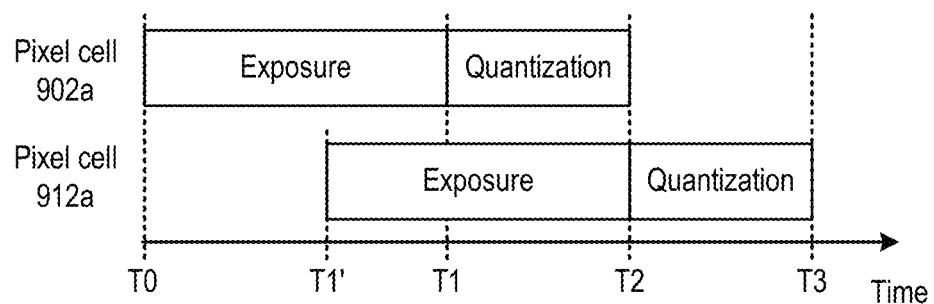

FIG. 9A and FIG. 9B illustrate examples of a multi-mode image sensor 900 that can address at least some of the issues described above. As shown in FIG. 9A, image sensor 900 include an array of pixel cells 902 arranged in rows and columns, such as pixel cells 902a0, 902b0, or 902n0, in a first row, and pixel cells 902a1, 902b1, 902n1, etc., in a second row. Each pixel cell can include components of pixel cell 601 of FIG. 6A such as one or more photodiodes 602, electronic shutter switch 603, transfer switch 604, reset switch 605, charge measurement circuit 612 including charge storage device 606 and source follower 610, etc. In addition, pixel cells 902a0 and 902a1 are in a first column, pixel cells 902b0 and 902b1 are in a second column, whereas pixel cells 902n0 and 902n1 are in an $n^{th}$ column. Each pixel cell has access to an in-array processing circuit, which includes a pixel-level or a block-level ADC and memory, such as memory 616. For example, pixel cells 902a0, 902b0, 902n0, 902a1, 902b1, and 902n1 have access to, respectively, in-array processing circuits 904a0, 904b0, 904n0, 904a1, 904b1, and 904n1. Image sensor 900 can also include other components of image sensor 704 shown in FIG. 7A-FIG. 8C, such as column control circuit 804, row control circuit 806, row and column buses to transmit row and column signals to individually configure each pixel cell (or block of pixel cells), pixel data output circuit 807 to read out memory 616 of in-array processing circuits 904a-n, and power state control circuits 820, 822, and/or 824.

In addition, image sensor 900 can include a set of off-array processing circuits 920, which can include a set of column-level ADCs 922, an off-array memory 923 to store the outputs of column-level ADCs 922, as well as read out circuits (not shown in the figures). Each column-level ADC 922 can include, for example, a column-level ADC associated with a column of pixel cells. For example, column-level ADC 922a is associated with a first column of pixel cells 902a0 and 902a1, column-level ADC 922b is associated with a second column of pixel cells 902b0 and 902b1, whereas column-level ADC 922n is associated with an $n^{th}$ column of pixel cells 902n0 and 902n1. Each column of pixel cells is further selectively connected via row selection switches with a column signal line that provides an input to the column-level ADC. For example, pixel cells 902a0 and 902a1 are connected to a column signal line 924a via, respectively, row selection switches 926a0 and 926a1. Pixel cells 902b1 and 902b1 are connected to a column signal line 924b via, respectively, row selection switches 926b0 and 926b1. Further, pixel cells 902n0 and 902n1 are connected to a column signal line 924n via, respectively, row selection switches 926n0 and 926n1. Each row selection switch can receive a row selection signal, such as r_a0 for row selection switch 926a, r_a1 for row selection switch 926b, r_an for row selection switch 926n, r_b0 for row selection switch 928a, r_b1 for row selection switch 928b, and r_bn for row selections switch 928n.

In some examples, the in-array ADCs of in-array processing circuits 904 and off-array ADCs of off-array processing circuits 920 can be ramp-based ADCs that perform quantization operations using an analog ramp and a digital ramp. As described above, an analog ramp can include a varying voltage that increases or decreases with time, whereas a digital ramp can include a counter value that increases or decreases with time. The ramp-based ADC can include a comparator to continuously compare the voltage output by a pixel cell with the analog ramp to generate a comparator output. At the time when the output intersects the analog ramp, the comparator output can switch, which causes a counter value of the digital ramp to be stored in an in-array memory or an off-array memory. The counter value stored in the memory can represent a result of the quantization operation.

Image sensor 900 can include support circuits to provide the analog ramp and digital ramp signals. For example, image sensor 900 can include digital and analog ramps generators 930, which can include counter 640 and DAC 642 of FIG. 6E, to generate the digital ramp and analog ramp. Moreover, image sensor 900 can include switchable buffer network 932 to distribute the digital ramp and analog ramp to each in-array processing circuit 904 and 914, such that each in-array processing circuits 904 can receive the same digital ramp counter value and the same analog ramp voltage at any given time. Each in-array processing circuits 904 can include memory 616, which can include a bank of SRAM memory devices controlled by comparator 607 of in-array processing circuits 904 to store a digital ramp counter value received from buffer network 932. In some examples, off-array memory 923 can be in the form of counters, and off-array ADCs can be counter-based ADCs.

In addition, image sensor 900 further includes a mode controller 940. Controller 940 can operate array of pixel cells 902, in-array processing circuits (e.g., in-array processing circuits 904, 914), off-array processing circuits 920, and the support circuits (e.g., digital and analog ramps generators 930, switchable buffer network 932) to operate in one of an analog mode or a digital mode. Specifically, in the analog mode, the controller can disable all in-array processing circuits as well as buffer network 932 that distributes the analog and digital ramps to the in-array processing circuits. Controller 940 can control each pixel cell in a column to take turn in accessing an off-array ADC to perform quantization operations, and to store the quantization results at the off-array memory, by transmitting a sequence of row selection signals. For example, controller 940 can transmit a sequence of r00 and r10 signals to enable pixel cells 902a and 912a to take turn in accessing column signal line 924a and column-level ADC 922a, a sequence of r01 and r11 signals to enable pixel cells 902b and 912b to take turn in accessing column signal line 924b and column ADC 922b, and a sequence of r0n and r1n signals to enable pixel cells 902n and 912n to take turn in accessing column signal line 924n and column-level ADC 922n. In some examples, controller 940 can enable one row of pixel cells to perform quantization operations with column ADCs 922 in parallel, and store the quantization results at off-array memory 923 in parallel. In some examples, mode controller 940 can be part of pixel cell array control circuit 716 of FIG. 7A. As to be described below, mode controller 940 can determine between the analog mode and the digital mode based on the outputs of other components of pixel cell array control circuit 716, such as map generator 721.

In the analog mode, controller 940 can control the pixel cells in a column to operate in a global shutter operation or in a rolling shutter operation. FIG. 9B illustrates examples of global shutter operation and rolling shutter operation of pixel cells 902a and 912a of the same column in the analog mode. Chart 942 illustrates an example of a global shutter operation. Referring to chart 942, the exposure periods for both pixel cells 902a and 912a span between times T0 and T1. Between times T1 and T2, controller 940 can enable pixel cell 902a to access column-level ADC 922a to perform a quantization operation, while pixel cell 912a is idle and the charge remains stored in the charge storage device 606 of pixel cell 912a. Between times T2 and T3, after the quantization operation for pixel cell 902a completes, controller 940 can enable pixel cell 912a to access column-level ADC 922a to perform a quantization operation.

Chart 944 illustrates an example of a rolling shutter operation. Referring to chart 944, the exposure period for pixel cell 902a starts at time T0 and ends at time T1, followed by a quantization operation for pixel cell 902a between times T1 and T2. Meanwhile, the exposure period for pixel cell 912a starts at a time T0' after time T0, and ends at time T2, followed by a quantization operation for pixel cell 912a between times T2 and T3. With such arrangements, each pixel cell can wait for a minimum time (or the same amount of time) after exposure period ends to start the quantization operation, which can reduce the effect of unequal charge leakage from charge storage device 606 of different pixel cells on the quantization results.

On the other hand, in the digital mode, controller 940 can disable off-array processing circuits 920 and transmit row selection signals to row selection switches 926 and 928 to disconnect the pixel cells of each column from the associated column signal lines and the associated column-level ADC. For example, pixel cells 902a0 and 902a1 can be disconnected from column signal line 924a and column-level ADC 922a, pixel cells 902b0 and 902b1 can be disconnected from column signal line 924b and column-level ADC 922b, whereas pixel cells 902n0 and 902n1 can be disconnected from column signal line 924n and column-level ADC 922n. In addition, controller 940 can enable in-array processing circuits 914 as well as buffer network 932 that distributes the analog and digital ramps to the in-array processing circuits. A global shutter operation can be performed, in which each pixel cell of the array of pixel cells is exposed to incident light to generate charge simultaneously within the same global shutter period, similar to as shown in chart 942 of FIG. 9B. After the global shutter period ends, controller 940 can enable in-array processing circuits 904 to perform quantization operations on the voltages output by the array of pixel cells in parallel.

In some examples, a low power analog mode may be implemented if high frequency clocks and readout are not required for the operation. Low power analog processing elements may be implemented on-chip to enable low-power sensing and minimize sensor readout. In some examples, to support a low power analog mode operation, off-array processing circuits 920 can be implemented using a low power and low leakage analog process to enable low-power sensing and to minimize sensor readout.

Figure 10A:
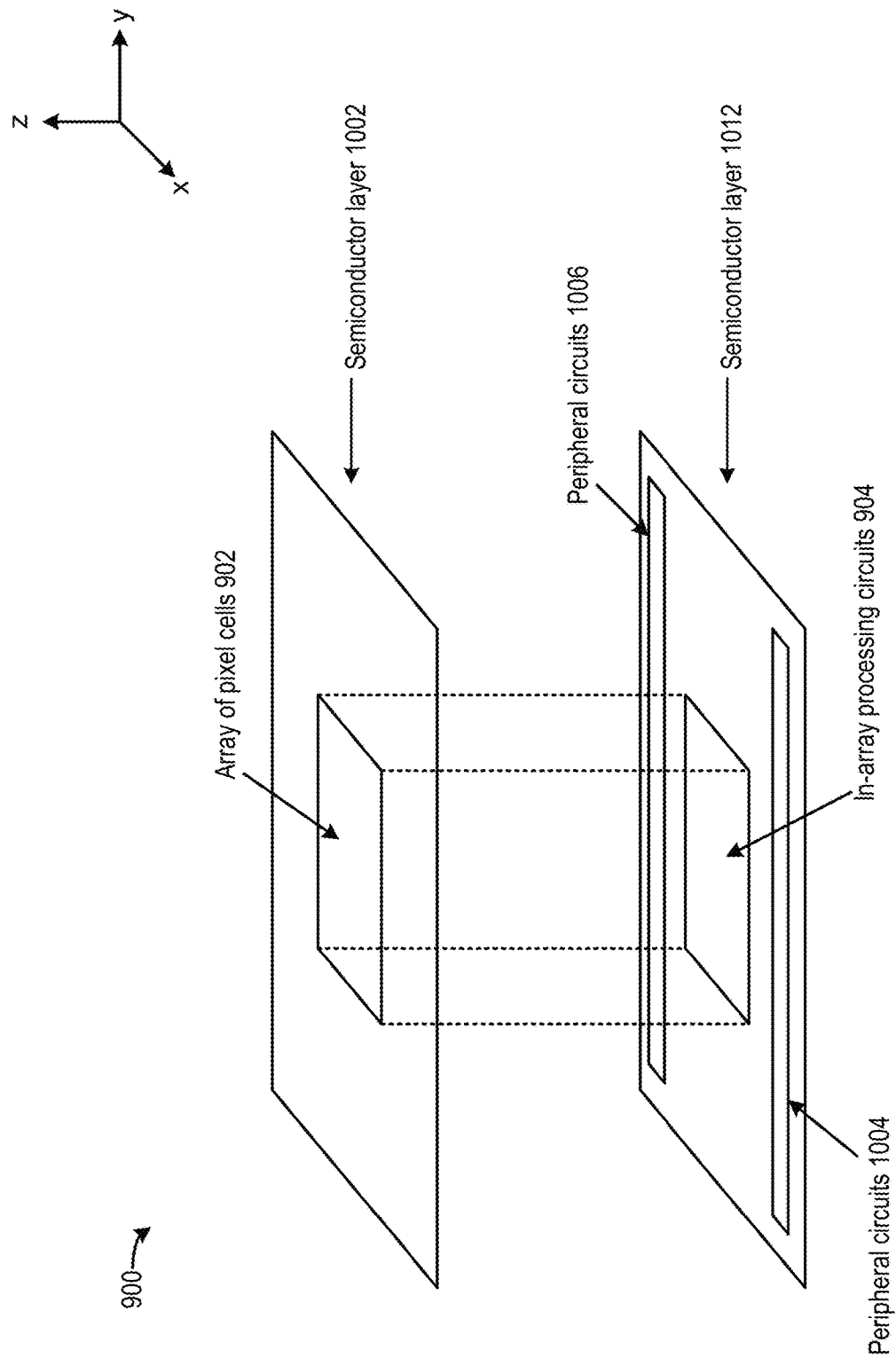
FIG. 10A and FIG. 10B illustrate examples of physical structures of the multi-mode image sensor of FIG. 9A and FIG. 9B.
Figure 10B:
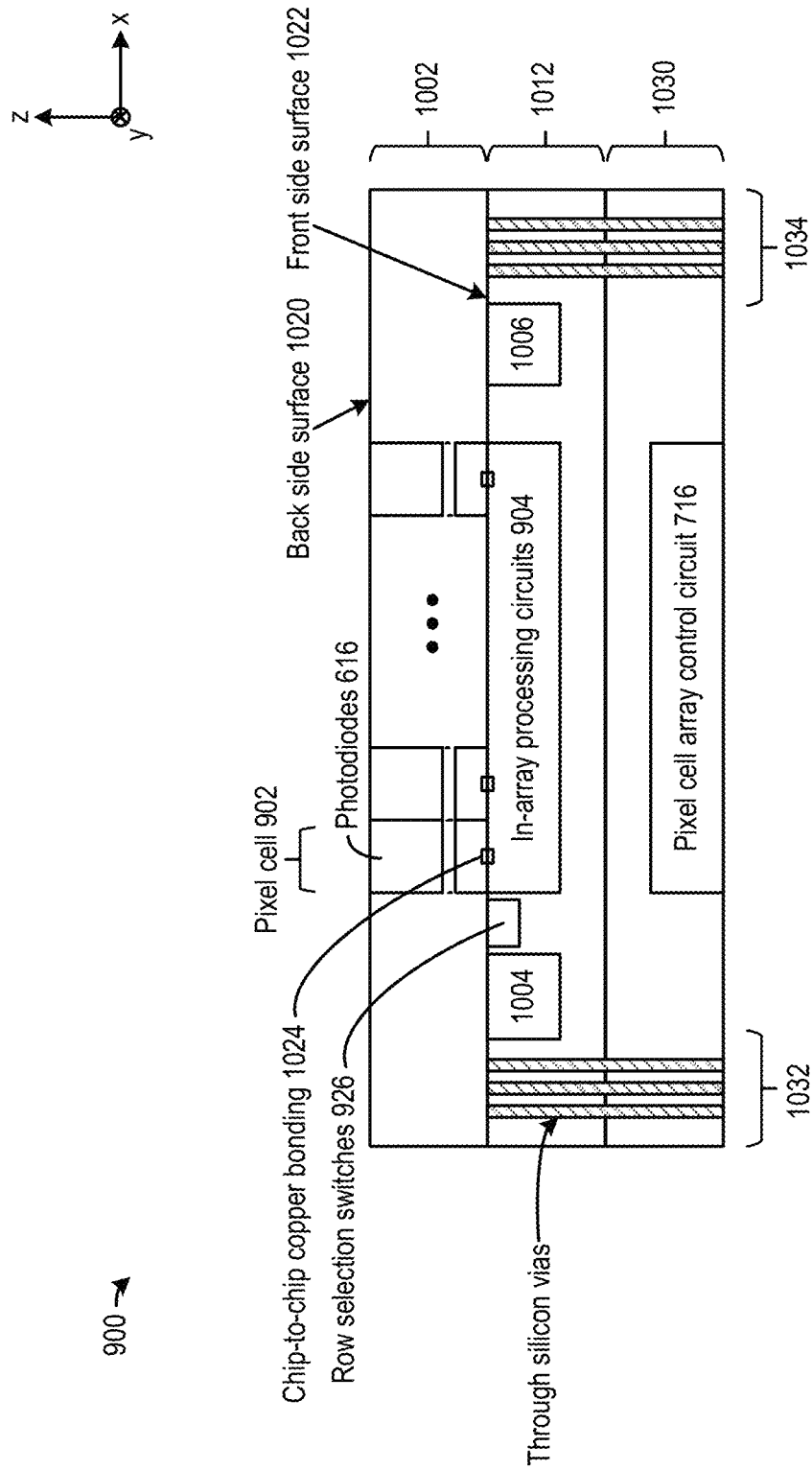

FIG. 10A and FIG. 10B illustrate examples of physical structures of image sensor 900. As shown in FIG. 10A, array of pixel cells 902, including photodiodes, charge storage devices, source followers, etc. can be formed in a first semiconductor layer 1002. First semiconductor layer 1002 can be a CMOS image sensor (CIS) process. Moreover, row selection switches, row/column signal buses, in-array processing circuits 904 (including pixel-level or block-level ADCs and memory), as well as peripheral circuits 1004 and 1006 can be formed in a second semiconductor layer 1012 that forms a stack with first semiconductor layer 1002 (e.g., along the z axis). Peripheral circuit 1004 can include off-array processing circuits 920 including, for example, column-level ADCs 922, off-array memory 923, and read out circuits of off-array memory 923. Moreover, peripheral circuit 1006 can include read out circuits of the pixel-level or block-level memory of in-array processing circuits 904, such as pixel data output circuit 807. In some examples, as shown in FIG. 10A, in-array processing circuits 904 can be directly below and within a footprint (e.g., along the x/y axes) of array of pixel cells 902, to reduce the length of interconnects between array of pixel cells 902 and in-array processing circuits 904, which in turn can reduce the parasitic capacitance and increase the bandwidth of the signal path from array of pixel cells 902 to in-array processing circuits 904. Moreover, peripheral circuits 1004 and 1006 can be outside the footprint of array of pixel cells 902. In some examples, peripheral circuits 1006 and 1006 can also be formed in a third semiconductor layer (not shown in FIG. 10A) that stacks below first semiconductor layer 1002 and second semiconductor layer 1012.

FIG. 10B illustrates additional details of the physical arrangements of image sensor 900. As shown in FIG. 10B, first semiconductor substrate 1002 may include a back side surface 1020 configured as a light receiving surface and includes photodiodes of each pixel cell, and a front side surface 1022 on which transfer transistor 604 and charge storage device 606 (e.g., a floating diffusion of transfer transistor 604) are implemented, whereas in-array processing circuits 904, peripheral circuits 1004 and 1006, and row selection switches 926 are implemented in second semiconductor substrate 1012 below array of pixel cells 902. In-array processing circuits 904 can be connected to array of pixel cells 902 by vertical interconnects including, for example, chip-to-chip copper bonding 1024. The chip-to-chip copper bonding can provide pixel interconnects between, for example, charge measurement circuits 612 and comparators/quantizers 607 of in-array processing circuits 904. In addition, row selection switches and row/column signal buses can also be connected to peripheral circuits 1004 and 1006 via chip-to-chip copper bonding.

In addition, image sensor 900 may further include a third semiconductor layer 1030 that can include, for example, pixel cell array control circuit 716, such as programming map parser 802, column control circuit 804, row control circuit 806, global power state control circuit 820, column power state control circuit 822, or row power state control circuit 824. In some examples, third semiconductor layer 1030 can also include an image processor to provide on-chip compute. In some examples, image sensor 900 includes vertical interconnects, such as through silicon vias (TSV) 1032 and 1034, to provide connections for signals between peripheral circuits 1004 and 1006 and pixel cell array control circuit 716. The TSVs can be configured to transmit, for example, pixel array programming map and image frames.

Implementing off-array processing circuits 920 as part of peripheral circuits 1004 can offer various advantages. As described above, to support a low power analog mode operation, off-array processing circuits 920 can be implemented using a low power and low leakage analog process to enable low-power sensing and to minimize sensor readout. Off-array processing circuits 920 implemented using the low power and low leakage analog process typically have a larger footprint (e.g., having a longer channel length) than in-array processing circuits 904, which can be implemented using a different process (e.g., a process that provides a reduced channel length) to reduce their footprints so that they can be positioned directly below array of pixel cells 902. Implementing off-array processing circuits 920 as part of peripheral circuits 1004 can alleviate the spatial constraint on off-array processing circuits 920, and allow off-array processing circuits 920 to be implemented using larger devices. In addition, the reduced spatial constraint also allows column-level ADCs 922 of off-array processing circuits 920 to include large capacitors for sample-and-hold operations to further reduce noise.

Figure 11A:
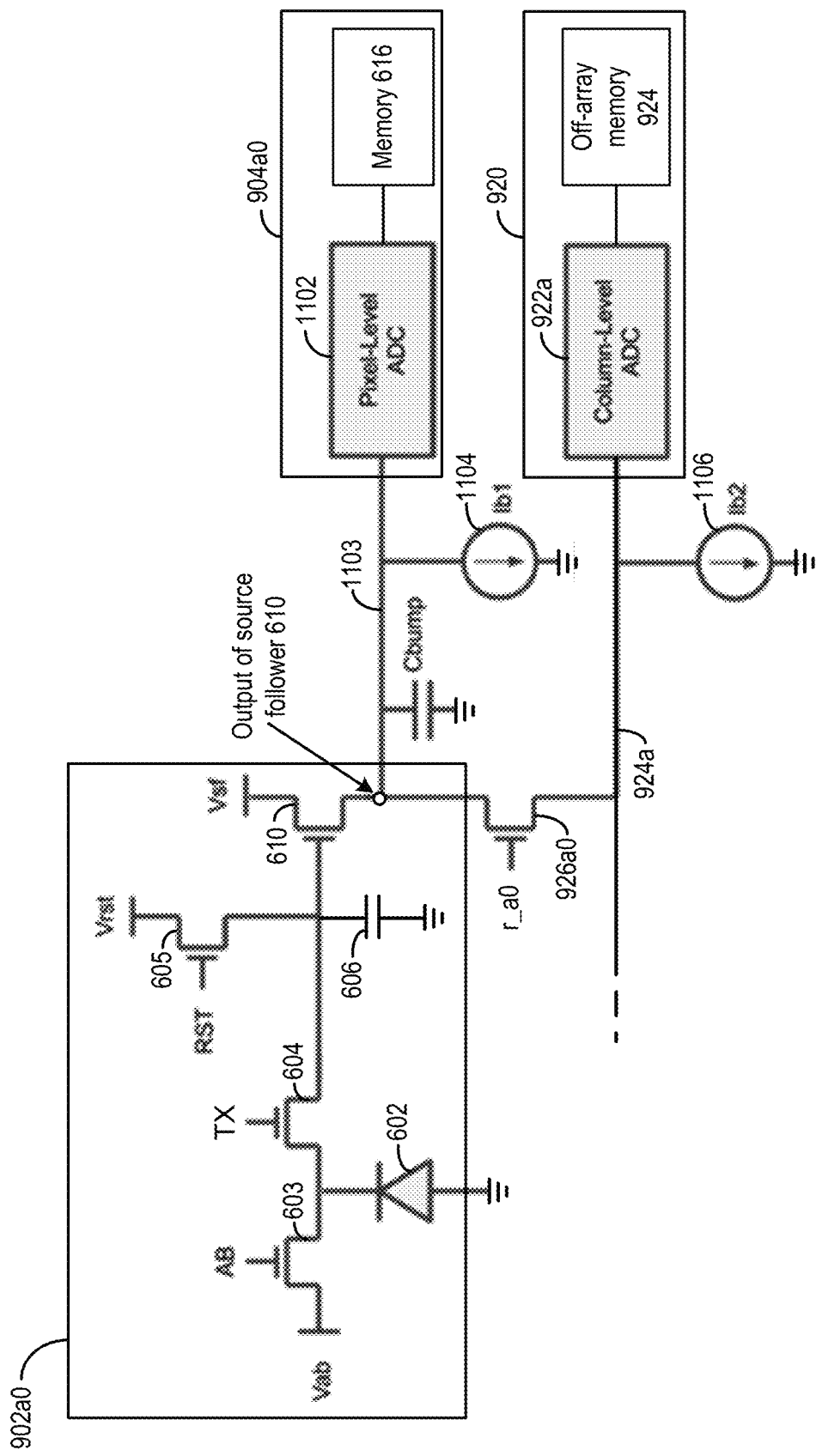
FIG. 11A, FIG. 11B, and FIG. 11C illustrate examples of internal components of the multi-mode image sensor of FIG. 9A and FIG. 9B.
Figure 11B:
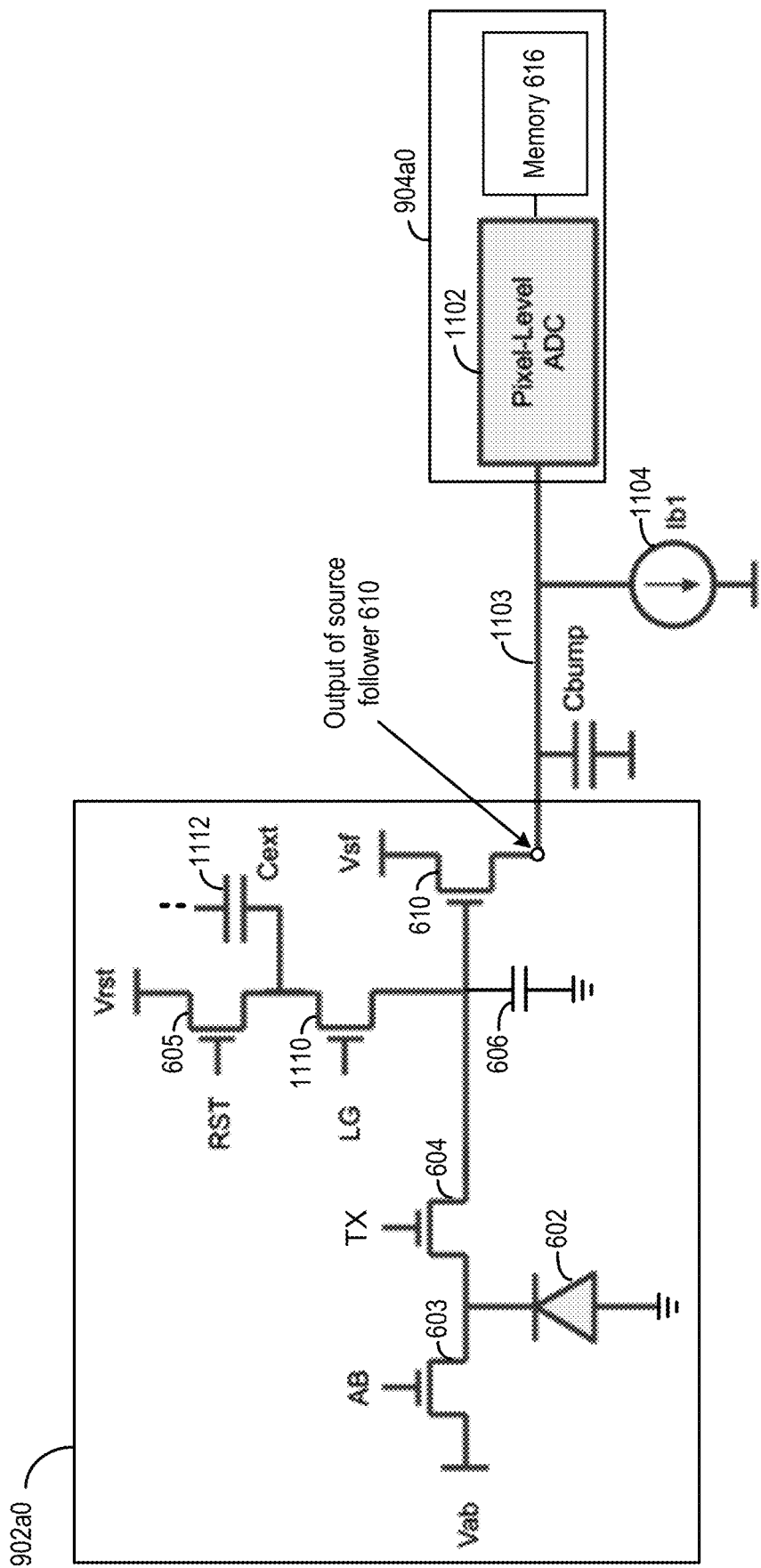
Figure 11C:
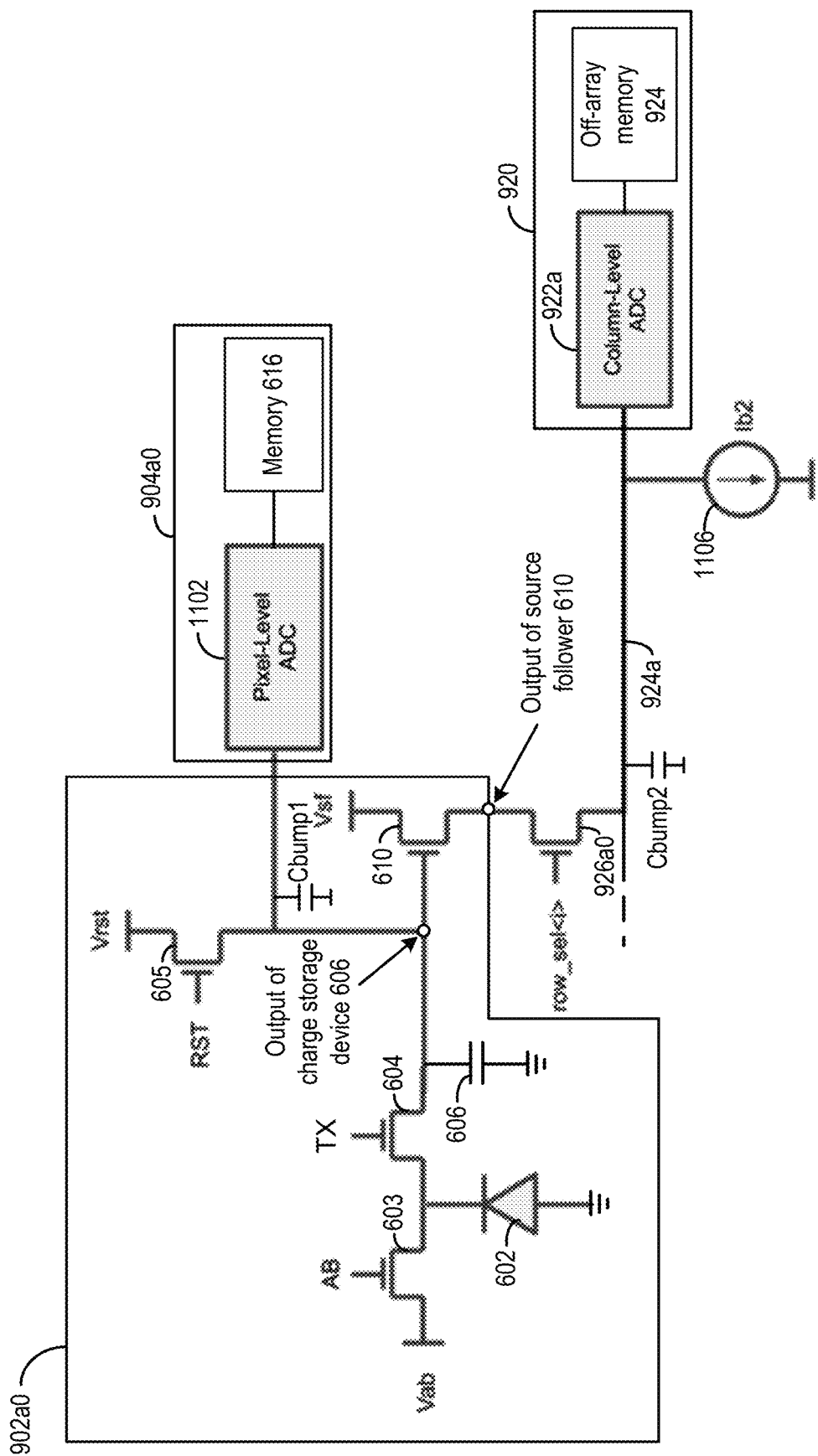

FIG. 11A, FIG. 11B, and FIG. 11C illustrate additional examples of internal components of image sensor 900 in which in-array processing circuits 904 include pixel-level ADCs each associated with a pixel cell. As shown in FIG. 11A, pixel cell 902, such as pixel cell 902a0, can include similar components as pixel cell 601 of FIG. 6C such as one or more photodiodes 602, electronic shutter switch 603, transfer switch 604, reset switch 605, charge storage device 606, and source follower 610. The output of source follower 610 is connected to pixel-level ADC 1102, which can be part of in-array processing circuits 904, via a vertical interconnect 1103. Vertical interconnect 1103 can be part of chip-to-chip copper bonding 1024 between semiconductor layers 1002 and 1012 as shown in FIG. 10B. In FIG. 11A, the parasitic capacitance of vertical interconnect 1103 is represented by a capacitor labelled "Cbump."

In addition, output of source follower 610 is also connected to column signal line 924a via row selection switch 926a0, which can be controlled by row selection signal r_a0. Column signal line 924a and row selection switch 926a0 can be in second semiconductor layer 1012, and row selection switch 926a0 can be connected to vertical interconnect 1103. Column signal line 924a is connected to column-level ADC 922a to allow source follower 610 to drive column-level ADC 922a during the analog mode.

In the example of FIG. 11A, image sensor 900 further includes a switchable pixel-level current source 1104 (labelled "Ib1") connected to the input of pixel-level ADC 1102, and a column-level current source 1106 (labelled "Ib2") connected to column signal line 924a and to the input of column-level ADC 922a. Current source 1104 can provide a bias current to source follower 610 when it drives pixel-level ADC 1102 in the digital mode, whereas current source 1106 can provide a bias current to source follower 610 when it drives column-level ADC 922a in the analog mode.

When operating in-array processing circuits 904 in the digital mode, in addition to disabling/powering off the column-level ADCs, controller 940 can transmit the row selection signals to disable each row selection switch, including row selection switch 926a0, to disconnect the source follower output of each pixel cell of each column from the associated column signal line including column signal line 924a. Moreover controller 940 can disable the column-level current source connected to each column signal line, including column-level current source 1106, and enable the pixel-level current source of each pixel cell, including pixel-level current source 1104, to enable the source follower of each pixel cell to drive the pixel-level ADC.

On the other hand, when operating off-array processing circuits 920 in the analog mode, controller 940 can transmit a sequence of row selection signals to sequentially connect pixel cells of different rows within the same column to the associated column signal line and to the column-level ADC. In addition, controller 940 can also enable the column-level current source of the column signal line, including column-level current source 1106 for column signal line 924a, to enable the source followers of the pixel cells to drive (at different times) the column-level ADC. The controller can also disable the pixel-level ADC (e.g., pixel-level ADC 1102) and pixel-level current source (e.g., pixel-level current source 1104) of each pixel cell as they are not used for quantization operations in the analog mode.

FIG. 11B illustrates another example of pixel cell 902. Compared with FIG. 11A, in FIG. 11B, off-array processing circuits 920, column-level current source 1106, row selection switch 926a0, and column signal line 924a are omitted. As shown in FIG. 11B, pixel cell 902 may include a switch 1110 between reset switch 605 and charge storage device 606. Switch 1110 can connect or disconnect, based on an LG signal, an external capacitor Cext to or from charge storage device 606. In some examples, the external capacitor Cext can be an auxiliary capacitor of pixel cell 902 to expand the total charge storage capacity for storing the charge generated by photodiode 602. Such arrangements can increase the maximum intensity of light sensed by image sensor 900 without saturating charge storage device 606. In some examples, the external capacitor Cext can be another charge storage device 606 of another pixel cell, to enable an analog binning operation.

FIG. 11C illustrates another example of pixel cell 902. Comparing with the example of FIG. 11A, the output of charge storage device 606 (e.g., a floating diffusion) can be connected directly to pixel-level ADC 1102 without being buffered by source follower 610. Such arrangements can reduce the electronic noise (e.g., thermal noise) that could have been introduced by source follower 610 to pixel-level ADC 1102. Pixel-level ADC 1102 can be connected to the output of charge storage device 606 via a first chip-to-chip copper bonding represented by a parasitic capacitance Cbump1. Meanwhile, the output of charge storage device 606 can be connected to the input of source follower 610, whereas the output of source follower 610 can be connected to column signal line 924a and off-array processing circuits 920 via row selection switch 926a0, and column-level current source 1106 can be connected to column signal line 924a to provide the bias current to source follower 610 when it drives column signal line 924a. A source follower can be used to drive column signal line 924a, which can be part of a second chip-to-chip copper bonding represented by a parasitic capacitance Cbump2, to improve the driving strength of the input to column-level ADC 922a which typically is larger than pixel-level ADC 1102 as described above.

Figure 12A:
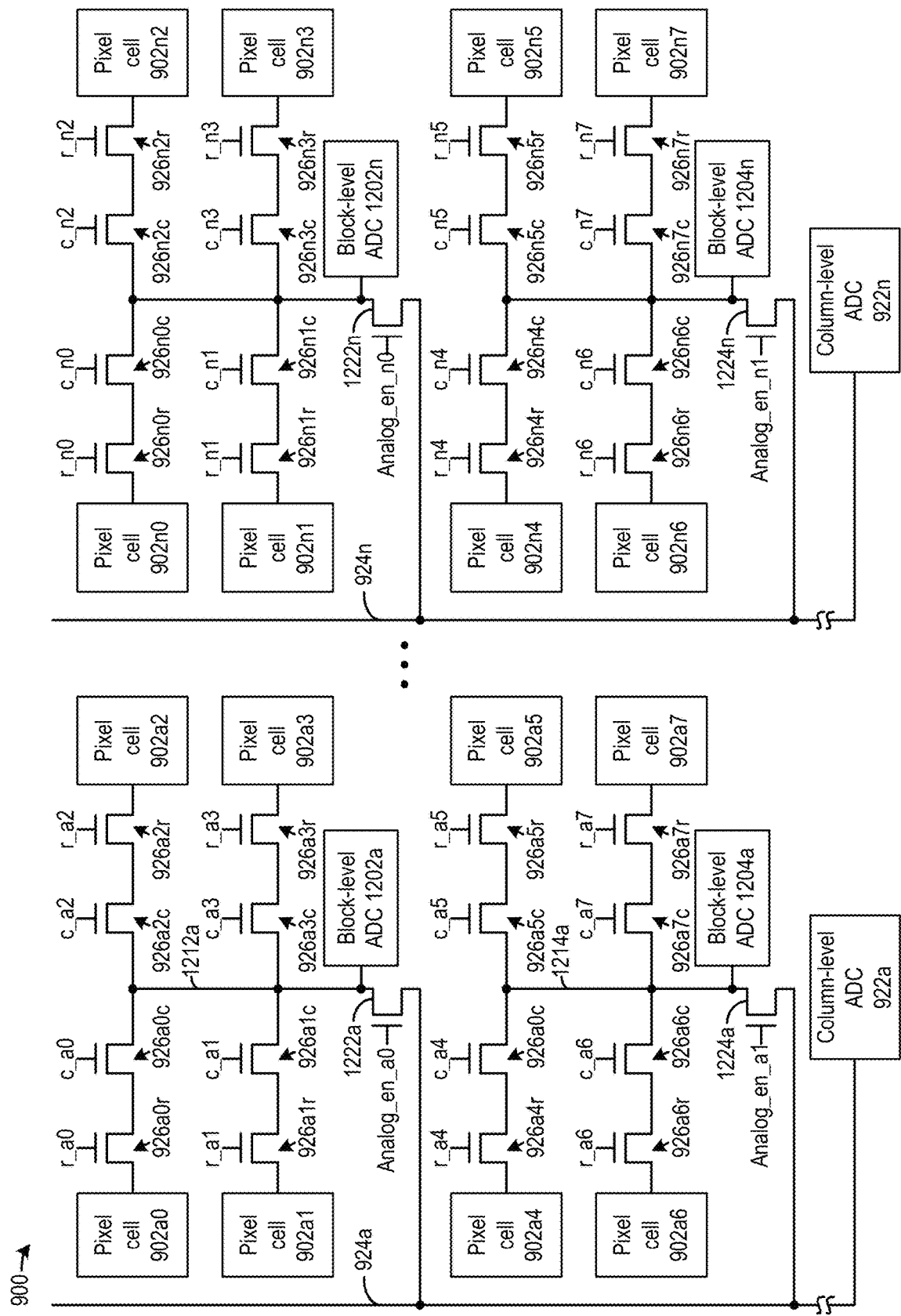
FIG. 12A and FIG. 12B illustrate additional examples of multi-mode image sensor that can be part of FIGS. 7A-7C.
Figure 12B:
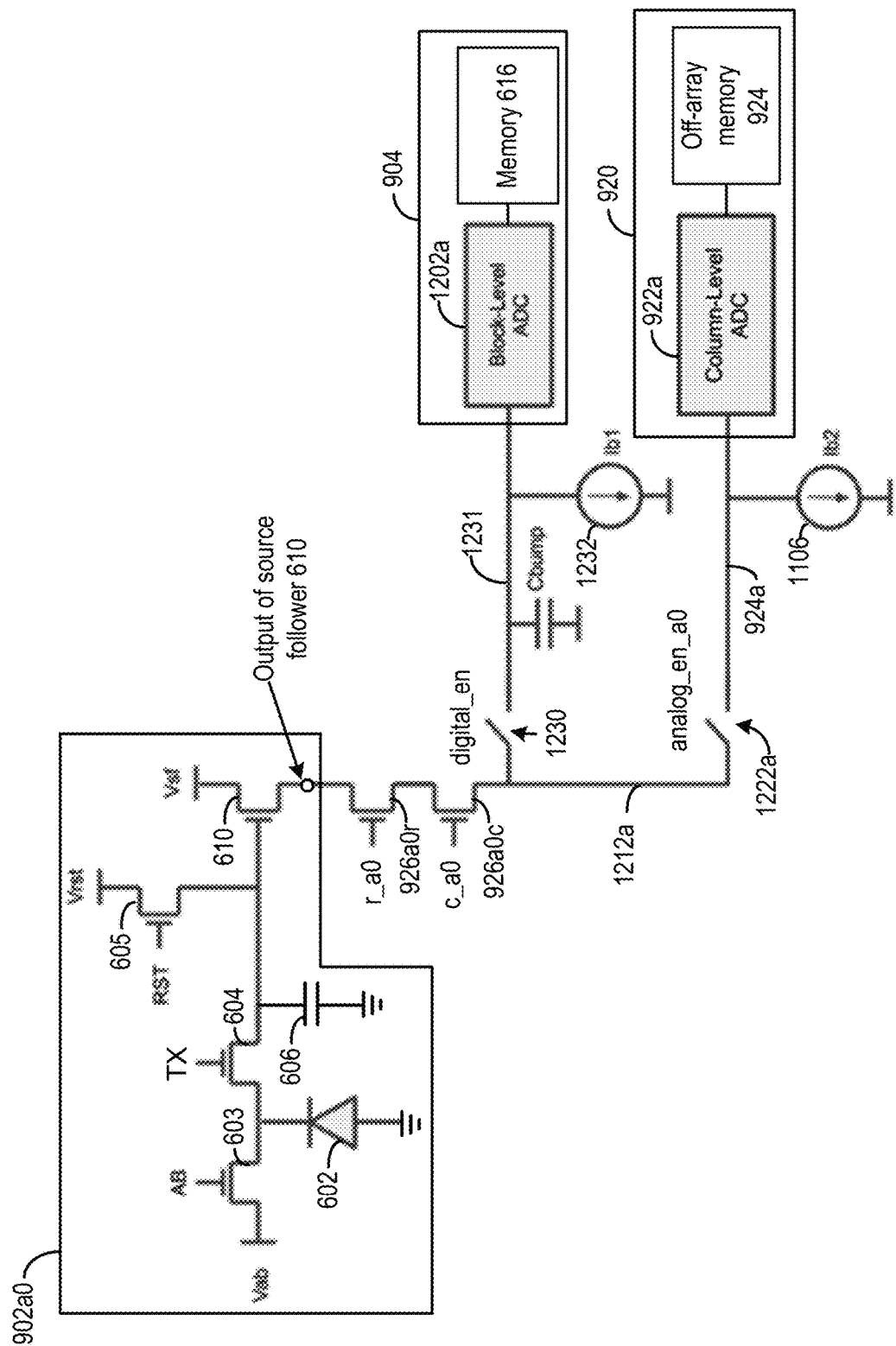

FIG. 12A and FIG. 12B illustrate additional examples of internal components of image sensor 900 in which in-array processing circuits 904 include block-level ADCs each associated with a block of pixel cells. Referring to FIG. 12A, a 2×2 block of pixel cells 902a0, 902a1, 902a2, and 902a3 can share a block-level ADC 1202a, a 2×2 block of pixel cells 902a4, 902a1, 902a2, and 902a3 can share a block-level ADC 1204a, a 2×2 block of pixel cells 902n0, 902n1, 902n2, and 902n3 can share a block-level ADC 1202n, whereas a 2×2 block of pixel cells 902n4, 902n1, 902n2, and 902n3 can share a block-level ADC 1204n. Each block-level ADC can be part of, for example, processing circuits 614 of FIG. 6E.

Within each block of pixel cells, each pixel cell can be connected to a block signal line via a pair of row selection switch and column selection switch forming serial switches. Controller 940 (not shown in FIG. 12A) can transmit a sequence of row selection signals and column selection signals to the pair of row selection switch and column selection switch of each pixel cell of a block to control a sequence of accesses of the block-level ADC by each pixel cell in the block. For example, pixel cells 902a0, 902a1, 902a2, and 902a3 are connected to a block signal line 1212a via, respectively, a pair of row selection switch 926a0r and column selection switch 926a0c controlled by row selection signal r_a0 and column selection signal c_a0, a pair of row selection switch 926a1r and column selection switch 926a1c controlled by row selection signal r_a1 and column selection signal c_a1, a pair of row selection switch 926a2r and column selection switch 926a2c controlled by row selection signal r_a2 and column selection signal c_a2, and a pair of row selection switch 926a3r and column selection switch 926a3c controlled by row selection signal r_a3 and column selection signal c_a3. In addition, pixel cells 902a4, 902a5, 902a6, and 902a7 are connected to a block signal line 1214a via, respectively, a pair of row selection switch 926a4r and column selection switch 926a4c controlled by row selection signal r_a4 and column selection signal c_a4, a pair of row selection switch 926a5r and column selection switch 926a5c controlled by row selection signal r_a5 and column selection signal c_a5, a pair of row selection switch 926a6r and column selection switch 926a6c controlled by row selection signal r_a6 and column selection signal c_a6, and a pair of row selection switch 926a7r and column selection switch 926a7c controlled by row selection signal r_a7 and column selection signal c_a7.

Moreover, pixel cells 902n0, 902n1, 902n2, and 902n3 are connected to a block signal line 1212n via, respectively, a pair of row selection switch 926n0r and column selection switch 926n0c controlled by row selection signal r_n0 and column selection signal c_n0, a pair of row selection switch 926n1r and column selection switch 926n1c controlled by row selection signal r_n1 and column selection signal c_n1, a pair of row selection switch 926n2r and column selection switch 926n2c controlled by row selection signal r_n2 and column selection signal c_n2, and a pair of row selection switch 926n3r and column selection switch 926n3c controlled by row selection signal r_n3 and column selection signal c_n3. Further, pixel cells 902n4, 902n5, 902n6, and 902n7 are connected to a block signal line 1214n via, respectively, a pair of row selection switch 926n4r and column selection switch 926n4c controlled by row selection signal r_n4 and column selection signal c_n4, a pair of row selection switch 926n5r and column selection switch 926n5c controlled by row selection signal r_n5 and column selection signal c_n5, a pair of row selection switch 926n6r and column selection switch 926n6c controlled by row selection signal r_n6 and column selection signal c_n6, and a pair of row selection switch 926n7r and column selection switch 926n7c controlled by row selection signal r_n7 and column selection signal c_n7.

Moreover, blocks of pixel cells can form a column and can be connected to a column signal line via block selection switches. For example, block of pixel cells 902a0, 902a1, 902a2, and 902a3 and block of pixel cells 902a4, 902a5, 902a6, and 902a7 can form a column and share column signal line 924a and column-level ADC 922a. Block of pixel cells 902a0, 902a1, 902a2, and 902a3 can be connected to column signal line 924a via an analog mode enable switch 1222a controlled by an analog mode enable signal analog_en_a0, whereas block of pixel cells 902a4, 902a5, 902a6, and 902a7 can be connected to column signal line 924a via an analog mode enable switch 1224a controlled by an analog mode enable signal analog_en_a1. Moreover, block of pixel cells 902n0, 902n1, 902n2, and 902n3 can be connected to column signal line 924n via an analog mode enable switch 1222n controlled by an analog mode enable signal analog_en_n0, whereas block of pixel cells 902n4, 902n5, 902n6, and 902n7 can be connected to column signal line 924n via an analog mode enable switch 1224n controlled by the analog mode enable signal analog_en_n1.

When operating in digital mode, mode controller 940 can transmit de-asserted analog mode enable signals to disable all analog mode enable switches and to disconnect all blocks of pixel cells from the column signal lines and column-level ADCs. Mode controller 940 can also transmit a sequence of row selection signals and column selection signals to the pair of row selection switch and column selection switch of each pixel cell of a block to control a sequence of accesses of the block-level ADC by each pixel cell in the block as described above. In some examples, the same sequence of row selection signals and column selection signals can be transmitted to each block of pixel cells (e.g., via a shared row selection signal line, a shared column selection signal line) such that corresponding pixel cells (e.g., pixel cells of the same row and column position) of each block can be selected to access the block-level ADCs in parallel. For example, mode controller 940 can transmit the same sequence of row selection signals and column selection signals to 2×2 block of pixel cells 902a0-902a3, 2×2 block of pixel cells 902a4-902a7, 2×2 block of pixel cells 902n0-902n3, and 2×2 block of pixel cells 902n4-902n7 such that pixel cells 902a0, 902a4, 902n0, and 902n4 (corresponding to row and column positions of (0,0)) are selected to access, respectively, block-level ADCs 1202a, 1204a, 1202n, and 1204n in parallel, followed by pixel cells 902a1, 902a6, 902n1, and 902n6 (corresponding to row and column positions of (1,0)), followed by pixel cells 902a2, 902a5, 902n2, and 902n5 (corresponding to row and column positions of (0,1)), and then followed by pixel cells 902a3, 902a7, 902n3, and 902n7 (corresponding to row and column positions of (1,1)).

In some examples, mode controller 940 can also transmit different sequences of row selection signals and column selection signals to the 2×2 blocks of pixel cells, if the row selection switches and column selection switches are connected to dedicated row and column signal lines rather than shared signal lines, such that pixel cells of different row/column positions in each block can be selected to access the block-level ADCs in parallel. For examples, mode controller 940 can select pixel cell 902a0, pixel cell 902a2, pixel cell 902n1, and pixel cell 902n7 to access, respectively, block-level ADCs 1202a, 1204a, 1202n, and 1204n in parallel.

On the other hand, when operating in the analog mode, mode controller 940 can transmit asserted analog mode enable signals to enable each block of pixel cells within a column to access the column-level ADC of the column sequentially. Mode controller 940 can also transmit a sequence of row and column selection signals to control the sequence of access of the column-level ADC by the pixel cells within the block. For example, mode controller 940 can first transmit asserted analog_en_a0 and analog_en_n0 signals to enable analog mode enable switches 1222a and 1222n to enable pixel cells 902a0-a3 and 902n0-n3 to access, respectively, column-level ADCs 922a and 922n. Mode controller 940 can then transmit the sequence of row and column selection signals to, for example, enable pixel cells 902a0 and 902n0 to access, respectively, column-level ADCs 922a and 922n, followed by pixel cells 902a1 and 902n1, pixel cells 902a2 and 902n2, and pixel cells 902a3 and 902n3. Mode controller 940 can then disable analog mode enable switches 1222a and 1222n and enable analog mode enable switches 1224a and 1224n, and enable pixel cells 902a4-a7 and 902n4-n7 to access, respectively, column-level ADCs 922a and 922n sequentially.

FIG. 12B illustrates additional examples of components that connect a pixel cell, such as pixel cell 902a0, to in-array processing circuits 904 and off-array processing circuits 920. As shown in FIG. 12B, the output of source follower 610 can be connected to block signal line 1212a via a pair of row selection switch 926a0r and column selection switch 926a0c controlled by row selection signal r_a0 and column selection signal c_a0, as described above. Other pixel cells (now shown in FIG. 12B) can also be connected to block signal line 1212a via pairs of row selection switch and column selection switch.

In some examples, image sensor 900 can further include a digital mode switch 1230 that can be controlled by a digital mode enable (digital_en) signal. Controller 940 can control digital mode switch 1230 to connect a block of pixel cells to block-level ADC 1202a during the digital mode, and to disconnect the block of pixel cells from block-level ADC 1202a during the analog mode. In the example of FIG. 12B, row selection switch 926a0r, column selection switch 926a0c, and digital mode enable switch 1230 can be in first semiconductor layer 1002, whereas block-level ADC 1202a can be in second semiconductor layer 1012, and digital mode enable switch 1230 can be connected to block-level ADC 1202a via a vertical interconnect 1231 such as chip-to-chip copper bonding 1024 between semiconductor layers 1002 and 1012 as shown in FIG. 10B. Such arrangements can reduce the loading of source follower 610 by the parasitic capacitance Cbump of vertical interconnect 1231 during the analog mode when block-level ADC 1202a is not used. Block signal line 1212a is further connected to column signal line 924a via analog mode enable switch 1222a controlled by the analog_en signal, to connect the block of pixel cells to column-level ADC 922a during the analog mode and to disconnect the block of pixel cells from column-level ADC 922a during the digital mode, as described above.

Referring back to FIG. 11A, in some examples, an analog mode enable switch can be interposed between pixel-level ADC and output of source follower 610, and a digital mode enable switch can be interposed between column-level ADC and a row selection switch (e.g., row selection switch 926a0), in a similar fashion as FIG. 12B. The analog mode enable switch can disconnect the output of source follower 610 from the pixel-level ADC during the analog mode, whereas the digital mode enable switch can disconnect the row selection switch (and source follower 610 output) from the column-level ADC during the digital mode. Such arrangements can reduce the loading of source follower 610 by the pixel-level ADC during the analog mode and the loading of source follower 610 by the column-level ADC during the digital mode.

In the examples shown in FIG. 9A-FIG. 12B, controller 940 can turn on/turn off various components of image sensor 900 (e.g., pixel-level/block-level current sources and ADCs, column-level current sources and ADCs) using a combination of global power state control circuit 820, column/row power state control circuit 822/824, and local power state control circuit 826 of FIG. 8B. Referring back to FIG. 8B, in both analog mode and digital mode, controller 940 can cause global power state control circuit 820 to transmit a global power state signal 832 to column/row power state control circuits 822/824 to turn on all circuit components of image sensor 900. In analog mode, controller 940 can transmit configuration signals 842 to turn on all columns of pixel cells and column-level current sources and ADCs, and transmit a sequence of configuration signals 844, which matches a sequence of row selection signals, to sequentially enable each pixel cell in a column of pixel cells to access the column-level ADC of the column. Controller 940 can also control local power state control circuit 826 to disable the pixel-level or block-level current sources and ADCs. On the other hand, in digital mode, controller 940 can transmit configuration signals 842 to turn off column-level current sources and ADCs. Controller 940 can also store an enable signal in configuration memory 850 of each pixel cell (or block of pixel cells) of FIG. 8C, to cause local power state control circuit 826 to enable the pixel-level or block-level current sources and ADCs.

Image sensor 900 can also support a sparse image sensing operation in both the analog mode and the digital mode.

Specifically, controller 940 can receive a pixel array programming map, such as a pixel array programming map 720 that identifies the row and column positions of a subset of array of pixel cells 902 to be enabled, and enable the subset of pixel cells based on pixel array programming map 720. In the analog mode, controller 940 can determine which column(s) of pixel cells are to be enabled, and within each column, which row(s) of pixel cells are to be enabled. Controller 940 can enable the column-level ADCs and memory for the enabled columns, and transmit row selection signals to the row selection switches to enable one or more row of pixels for in each enabled column. Controller 940 can also transmit configuration signals 842 to column/row power state control circuits 822/824 to enable the column-level ADCs and memory for the enabled columns. On the other hand, in the digital mode, controller 940 can individually store an enable/disable signal in configuration memory 850 of each pixel cell (or block of pixel cells) based on pixel array programming map 720, to individually enable/disable pixel-level/block-level ADCs by local power state control circuit 826 to support the sparse image sensing operation.

Figure 13A:
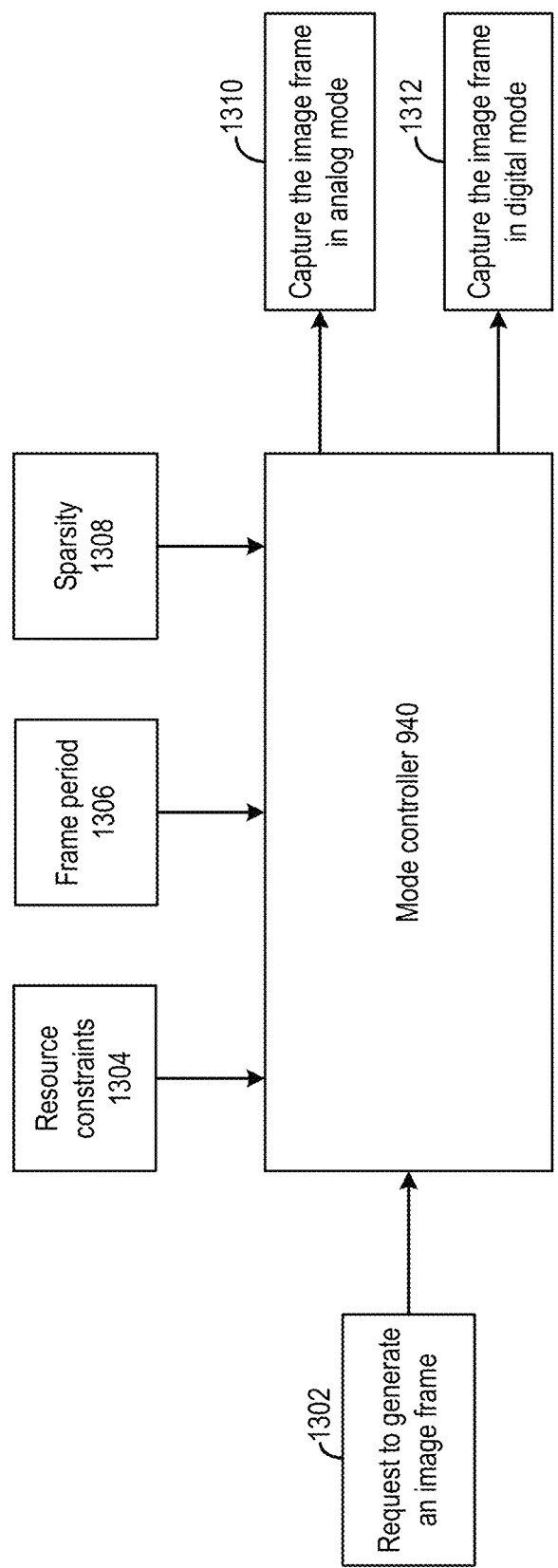
FIG. 13A and FIG. 13B illustrate example mode switching operations of the examples of multi-mode image sensor of FIGS. 9A-12B.
Figure 13B:
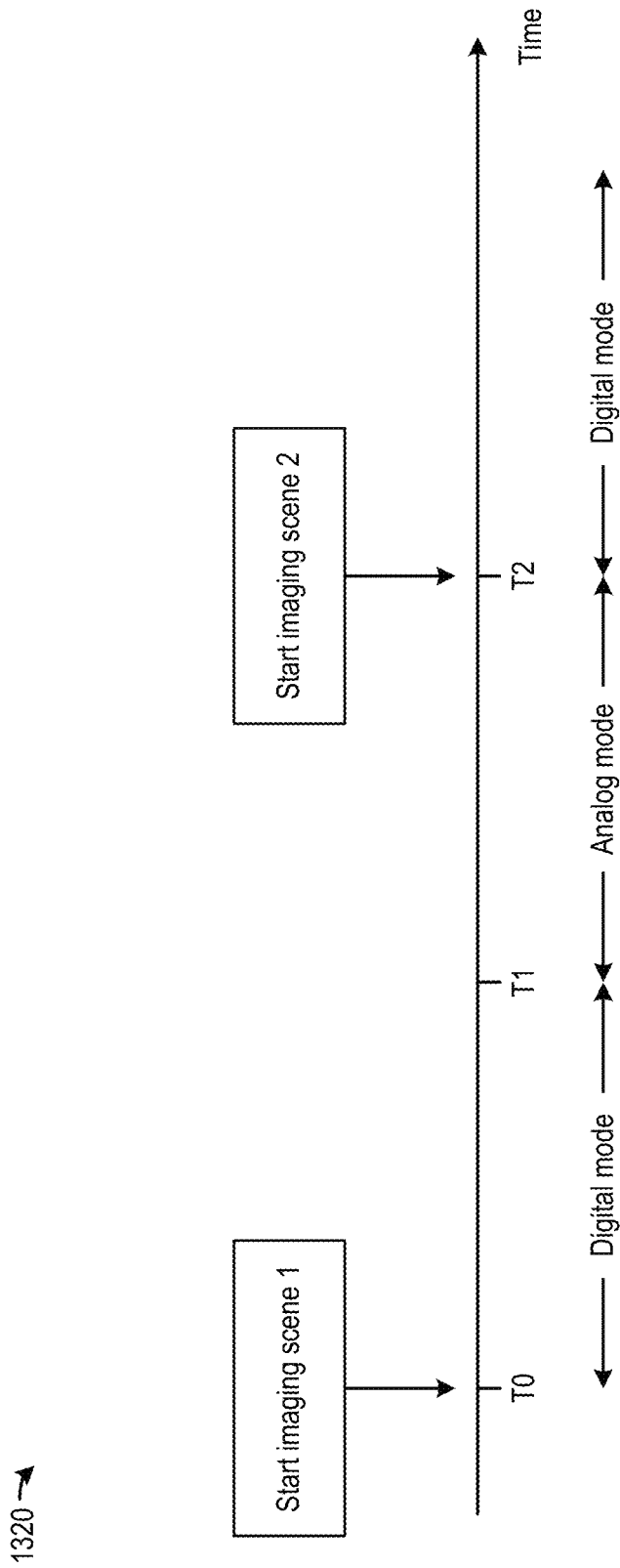

In some examples, controller 940 can select between capturing a frame in the digital mode and capturing a frame in the analog mode based on an operation condition of image sensor 900. FIG. 13A and FIG. 13B illustrate examples of operations of controller 940 in selecting between the analog mode and the digital mode. As shown in FIG. 13A, controller 940 can receive a request 1302 to generate an image frame. Based on information about the operation condition of image sensor 900, such as resource constraints 1304, frame period 1306, and sparsity 1308, controller 940 can output a decision 1310 to capture the image frame in the analog mode, or a decision 1312 to capture the image frame in the digital mode, and operate in-array processing circuits 904 and off-array processing circuits 920 based on the decision.

Specifically, in a case where a full frame image is to be generated, or a sparse-image sensing operation having at least certain percentage of pixel cells being enabled, the controller may select digital mode, to maintain a low average power consumption for generation of each pixel. On the other hand, in a case where the degree of sparsity is high, such that a relatively low percentage of pixel cells is enabled, the controller may select analog mode as it is more efficient and can keep the average power consumption for generation of each pixel at a low value.

As another example, controller 940 may receive a request to generate an image frame within a certain frame period. Based on the sparsity of the image frame as well as the requested frame period, controller 940 may determine the off-array processing circuits 920 cannot generate the image frame within the requested frame period in the analog mode, and switch to the digital mode. As described above, in the analog mode each pixel cell in a column takes turn in accessing the column-level ADC of the column to perform the quantization operation, which typically leads to a lower frame rate and a larger frame period, especially if a full image frame is to be generated. On the other hand, if a sparse image frame is to be generated such that only a subset of pixel cells in each column access the column-level ADC of the column, the total time required to complete the quantization operations for the subset of pixel cells may be less than the requested frame period. In such a case, controller 940 may generate the image frame in the analog mode.

As yet another example, controller 940 can determine that the digital mode, which typically uses more resources, cannot satisfy the resource constraints specified in resource constraints 1304, and switch to the analog mode as a result. Resource constraints 1304 may include, for example, constraints on the total power consumption of image sensor 900, rate of transmission of pixel data via, for example, a MIPI interconnect between the host device (e.g., host device 702) and image sensor 900. For example, as the digital mode include multiple pixel-level or block-level ADCs operating in parallel, the digital mode may consume a higher power than the analog mode, especially if a full image frame is captured. As another example, as it takes more time to complete generation and storage of an image frame in the memory in the analog mode, the time provided for transmission of pixel data to the host device may be less in the analog mode than in the digital mode, which may require a higher rate of pixel data transmission in the analog mode than in the digital mode. If the requested rate of pixel data transmission is above a threshold rate of transmission of pixel data, controller 940 may operate in the digital mode instead to complete generation and storage of an image frame within a shorter time, so as to provide more time for transmission of pixel data within the frame period.

In some examples, controller may dynamically switch between the digital mode and the analog mode when imaging the same scene. FIG. 13B illustrates an example of dynamical switching operation 1320. As shown in FIG. 13B, image sensor 900 is positioned in front of a first scene and starts imaging the first scene at time T0. Between times T0 and T1, image sensor 900 may operate in the digital mode to capture full image frames. Starting from time T1, image sensor 900 may switch to a sparse image sensing operation to capture only portions of the scene that experience change with time. At time T2, image sensor 900 is positioned in front of a second scene due to, for example, a movement of the wearable device that houses the image sensor, and image sensor 900 may switch back to the digital mode to capture full image frames.

Figure 14:
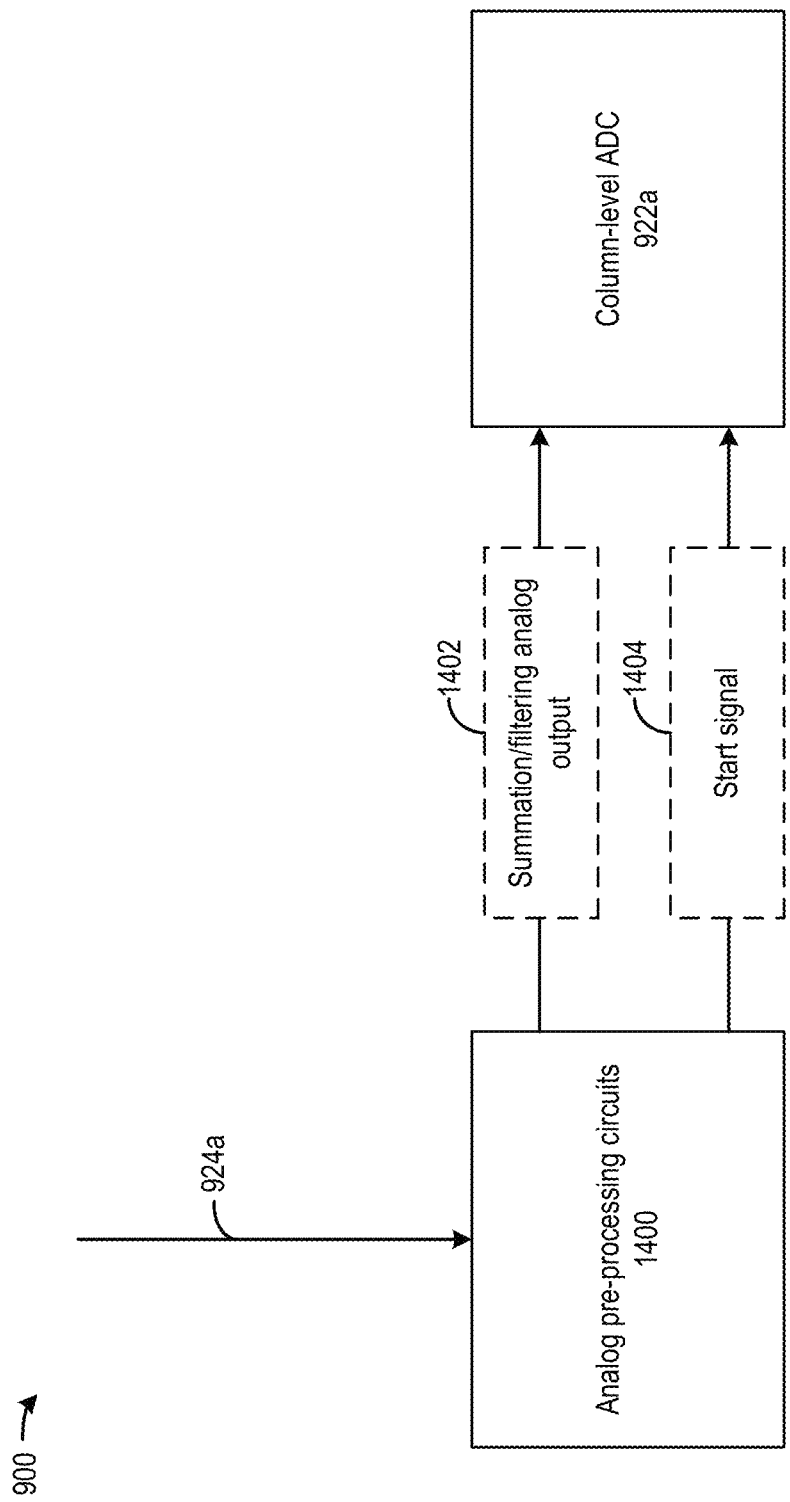
FIG. 14 illustrates an example of analog pre-processing circuit that can be part of the examples of multi-mode image sensor of FIGS. 9A-12B.

In some examples, image sensor 900 can include analog pre-processing circuits to perform pre-processing of the analog output from the pixel cells prior to forwarding the analog outputs to the column-level ADCs. FIG. 14 illustrates an example arrangement of analog pre-processing circuits 1400. As shown in FIG. 14, analog pre-processing circuits 1400 can be interposed between column signal line 924a and column-level ADC 922a. In some examples, analog pre-processing circuits 1400 can perform an analog summation and/or filtering operation to generate a summation/filtering analog output 1402, and forward the analog output 1402 to column-level ADC 922a to perform quantization operations. As another example, analog pre-processing circuits 1400 can support various types of processing, such as compressive sensing, high-speed tracking, or motion estimation, to generate a start signal 1404. Start signal 1404 can be used to enable column-level ADC 922a as part of compressive sensing. For example, analog pre-processing circuits 1400 can detect whether there are changes in the pixel cells outputs with respect to time based on the analog outputs from column signal line 924a, and control column-level ADC 922a to quantize the analog outputs of the pixel cells only when certain degree of changes is detected. In both examples, the analog pre-processing circuits 1400 can perform the pre-processing operations to reduce power consumption and downstream processing of the images.

Figure 15:
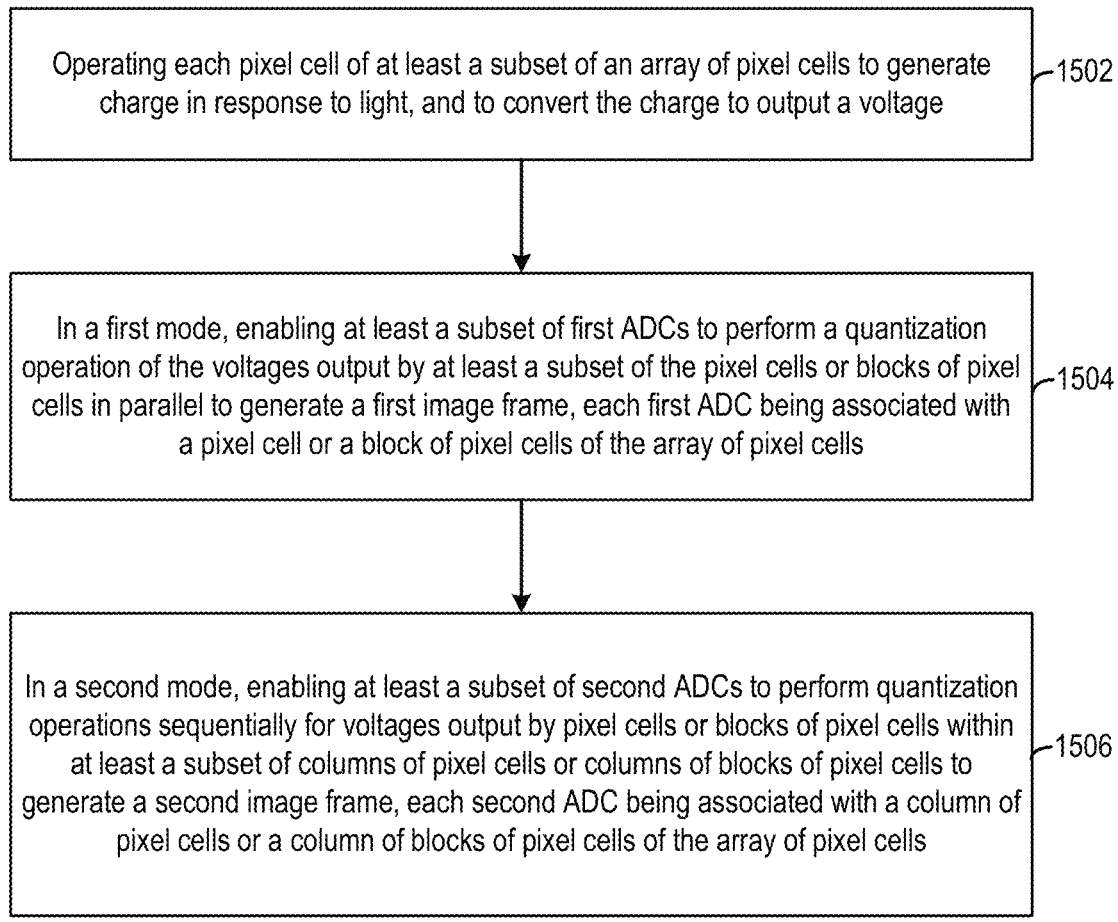
FIG. 15 illustrates an example of operating a multi-mode image sensor.

FIG. 15 illustrates a flowchart of a method 1500 of operating a multi-mode image sensor, such as image sensor 900 of FIG. 9A-FIG. 14. Image sensor 900 may include an array of pixel cells 902 arranged in rows and columns, a set of in-array processing circuits 904, a set of off-array processing circuits 920 and controller 940. Each pixel cell can include one or more photodiodes to detect light and convert the light to a charge, as well as charge measurement circuits including a charge storage device (e.g., a floating diffusion, an auxiliary capacitor) to convert the charge to a voltage, and a source follower to buffer the voltage. The set of in-array processing circuits can include first ADCs, such as pixel-level ADCs 1102 each being associated with a pixel cell or block-level ADCs 1202 each being associated with a block of pixel cells. The set of off-array processing circuits can include, for example, column-level ADCs 922 each associated with and to be shared by a column of pixel cells, or a column of blocks of pixel cells. Method 1500 can be performed by controller 940 in conjunction with the rest of image sensor 900.

In step 1502, controller 940 can operate each pixel cell of at least a subset of array of pixel cells 902 to generate charge in response to light and to convert the charge to output a voltage. In some examples, each pixel cell can include one or more photodiodes to generate the charge in response to light, and a charge storage device (e.g., a floating diffusion) to convert the charge to a voltage. Each pixel cell may also include a source follower to buffer the voltage. Controller 940 can enable a subset of the array of pixel cells 902 to perform a sparse image sensing operation, where the subset of the array of pixel cells 902 can be selected based on a pixel array programming map, such as pixel array programming map 720, that specifies rows and columns positions of the pixel cells to be enabled.

In step 1504, controller 940 can operate in a first mode (e.g., a digital mode), in which the controller enables at least a subset of first ADCs to perform a quantization operation of the voltages output by at least a subset of the associated pixel cells or the associated blocks of pixel cells in parallel to generate a first image frame, each first ADC being associated with a pixel cell or a block of pixel cells of the array of pixel cells. The first ADCs can include, for example, pixel-level ADCs 1102 or block-level ADCs 1202.

Specifically, in the digital mode, controller 940 can disconnect the pixel cells from the column signal lines and disable the column-level ADCs. Controller 940 can also disable the column-level current sources connected to the column signal lines. In a case where the first ADCs are pixel-level ADCs, controller 940 can enable at least the subset of pixel cells, based on storing an enable signal at configuration memory of those pixel cells, to perform quantization operations using the associated pixel-level ADCs. In a case where the first ADCs are block-level ADCs, controller 940 can transmit a sequence of row selection signals and column selection signals to enable each pixel cell within a block of pixel cells to access the block-level ADCs sequentially. Controller 940 can transmit the same sequence or different sequences of row selection signals and column selection signals to each block of pixel cells, so that the pixel cells of each block can access the block-level ADC following the same or different row/column positions sequences.

In step 1506, controller 940 can operate in a second mode (e.g., an analog mode), in which the controller enables at least a subset of second ADCs to perform quantization operations sequentially for voltages output by pixel cells or blocks of pixel cells within at least a subset of the associated columns of pixel cells or the associated columns of blocks of pixel cells to generate a second image frame, each second ADC being associated with a column of pixel cells or a column of blocks of pixel cells of the array of pixel cells.

Specifically, in the analog mode, controller 940 can connect the pixel cells of a column to the column signal lines sequentially to the column-level ADC of the column, and enable the column-level ADCs. Controller 940 can also disable the pixel-level/block-level current sources connected to the pixel-level/block-level ADCs, and may disconnect the pixel-level/block-level ADCs from the pixel cells. In some examples, controller 940 can transmit row selection signals and/or column selection signals to select one row of pixel cells in each column to access column-level ADCs, followed by another row of pixel cells. Controller 940 can select the columns of pixel cells, and the pixel cells within the selected columns, based on transmitting column/row power state signals 834. In some examples, in the analog mode, controller 940 may use analog pre-processing circuits, such as analog pre-processing circuits 1400 of FIG. 14, to perform analog pre-processing of the analog outputs on the column signal lines prior to quantization operation by the column-level ADCs.

In some examples, controller 940 can select between the digital mode and analog mode based on an operation condition of the image sensor. The operation condition may include, for example, a degree of sparsity of the sparse image sensing operation to be performed by the image sensor, frame rate, power constraint, etc. For example, if the sparsity of image frame to be generated by image sensor 900 exceeds a certain threshold, controller 940 may operate in the analog mode to capture the sparse image. As another example, controller 940 may operate in the analog mode to reduce power, and in the digital mode to generate the image frame within a certain frame period.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer-readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
    an array of pixel cells, each pixel cell of the array of pixel cells including one or more photodiodes configured to generate charge in response to light, and a charge storage device to convert the charge to output a voltage;
    first analog-to-digital converters (ADCs), each first ADC being associated with a pixel cell or a block of pixel cells of the array of pixel cells;
    second ADCs, each second ADC being associated with a column of pixel cells or a column of blocks of pixel cells of the array of pixel cells; and
    a controller configured to:
        in a first mode, enable at least a subset of the first ADCs to perform a quantization operation of the voltages output by at least a subset of the pixel cells or the blocks of pixel cells associated with the at least the subset of the first ADCs in parallel to generate a first image frame;
        in a second mode, enable at least a subset of the second ADCs to perform quantization operations sequentially of the voltages output by pixel cells or blocks of pixel cells within at least a subset of the columns of pixel cells or the columns of blocks of pixel cells associated with the at least the subset of the second ADCs to generate a second image frame; and
    wherein the controller is configured to switch between the first mode and the second mode based on one or more operation conditions, the one or more operation conditions comprising at least one of: a sparsity of an image frame to be generated, a frame period in which the image frame is to be generated, or a constraint for resources to be used in generating and transmitting the image frame.

2. The apparatus of claim 1, wherein the controller is configured to enable a subset of the array of pixel cells to generate voltages, and to enable a subset of the first ADCs or the second ADCs to generate the first image frame or the second image frame as a sparse image frame.

3. The apparatus of claim 1, wherein the array of pixel cells are formed in a first semiconductor layer;
    wherein the first ADCs are formed in a second semiconductor layer;
    wherein the first semiconductor layer and the second semiconductor layer form a stack; and
    wherein the first ADCs are positioned directly below the array of pixel cells.

4. The apparatus of claim 3, wherein the first ADCs are connected to the array of pixel cells via vertical interconnects.

5. The apparatus of claim 4, wherein the second ADCs are formed in the second semiconductor layer and on a periphery of the first ADCs.

6. The apparatus of claim 1, further comprising:
   column signal lines, each column signal line being connected to a second ADC of the second ADCs and associated with a column of pixel cells or a column of blocks of pixel cells; and
   row selection switches, wherein each row selection switch connects between a column signal line and a pixel cell of the column of pixel cells associated with the column signal line.

7. The apparatus of claim 6, wherein the controller is configured to, in the second mode, transmit row selection signals to the row selection switches to select one pixel cell from each of the at least a subset of the columns of pixel cells to access one second ADC of the at least a subset of the second ADCs.

8. The apparatus of claim 7, wherein the controller is configured to, in the second mode, transmit the row selection signals to the row selection switches to select one row of pixel cells from the at least the subset of the columns of pixel cells to access the at least a subset of the second ADCs in parallel.

9. The apparatus of claim 6, further comprising column selection switches forming pairs of serial switches with row selection switches; and
   wherein a pair of a row selection switch and a column selection switch connects between a column signal line and a pixel cell of a block of pixel cells.

10. The apparatus of claim 9, wherein the controller is configured to:
   in the first mode, transmit a first sequence of row selection signals and column selection signals to the pairs of serial switches to enable each pixel cell within a block of pixel cells to sequentially access the first ADC associated with the block of pixel cells; and
   in the second mode, transmit a second sequence of row selection signals and column selection signals to the pairs of serial switches to enable pixel cells within the at least the subset of the columns of blocks of pixel cells to sequentially access the second ADCs associated with the subset of the columns of blocks of pixel cells.

11. The apparatus of claim 9, further comprising:
   first switches controllable by the controller to connect the first ADCs to the pairs of serial switches in the first mode and to disconnect the first ADCs from the pairs of serial switches in the second mode; and
   second switches controllable by the controller to connect the second ADCs to the pairs of serial switches in the second mode and to disconnect the second ADCs from the pairs of serial switches in the first mode.

12. The apparatus of claim 6, further comprising analog pre-processing circuits, each analog pre-processing circuit being interposed between a column signal line and a second ADC.

13. The apparatus of claim 12, wherein each analog pre-processing circuit is configured to perform at least one of: a summation or filtering of analog outputs received from the column signal line, or a detection of changes in the analog outputs received from the column signal line between image frames.

14. The apparatus of claim 13, wherein each analog pre-processing circuit is configured to transmit a start signal to the second ADC to start a quantization operation of the analog outputs based on the detected changes exceeding a threshold.

15. The apparatus of claim 1, wherein the controller is configured to operate in the second mode based on the sparsity of the image frame exceeding a threshold.

16. The apparatus of claim 1, wherein the controller is configured to operate in the second mode such that a power consumption of the apparatus is within the constraint.

17. The apparatus of claim 1, wherein the controller is configured to operate in the first mode based on a frame period being below a threshold.

18. A method comprising:
   operating each pixel cell of at least a subset of an array of pixel cells to generate charge in response to light, and to convert the charge to output a voltage;
   in a first mode, enabling at least a subset of first ADCs to perform a quantization operation of the voltages output by at least the subset of the pixel cells or blocks of pixel cells in parallel to generate a first image frame, each first ADC being associated with a pixel cell or a block of pixel cells of the array of pixel cells;
   in a second mode, enabling at least a subset of second ADCs to perform quantization operations sequentially for voltages output by pixel cells or blocks of pixel cells within at least a subset of columns of pixel cells or columns of blocks of pixel cells to generate a second image frame, each second ADC being associated with a column of pixel cells or a column of blocks of pixel cells of the array of pixel cells; and
   switching between the first mode and the second mode based on one or more operation conditions, the one or more operation conditions comprising at least one of: a sparsity of an image frame to be generated, a frame period in which the image frame is to be generated, or a constraint for resources to be used in generating and transmitting the image frame.

* * * * *